United States Patent
Itami et al.

(10) Patent No.: US 9,527,737 B2
(45) Date of Patent: Dec. 27, 2016

(54) CARBON NANOTUBE MANUFACTURING METHOD

(75) Inventors: Kenichiro Itami, Nagoya (JP); Yasutomo Segawa, Nagoya (JP); Hisanori Shinohara, Nagoya (JP); Ryo Kitaura, Nagoya (JP)

(73) Assignee: National University Corporation Nagoya University, Nagoya-shi (JP)

( * ) Notice: Subject to any disclaimer, the term of this patent is extended or adjusted under 35 U.S.C. 154(b) by 2 days.

(21) Appl. No.: 14/003,289

(22) PCT Filed: Mar. 8, 2012

(86) PCT No.: PCT/JP2012/056033
§ 371 (c)(1),
(2), (4) Date: Oct. 21, 2013

(87) PCT Pub. No.: WO2012/121354
PCT Pub. Date: Sep. 13, 2012

(65) Prior Publication Data
US 2014/0030183 A1  Jan. 30, 2014

(30) Foreign Application Priority Data
Mar. 8, 2011 (JP) ................... 2011-050398

(51) Int. Cl.
*C01B 31/02* (2006.01)
*B82Y 40/00* (2011.01)
*B82Y 30/00* (2011.01)

(52) U.S. Cl.
CPC ............ *C01B 31/0226* (2013.01); *B82Y 30/00* (2013.01); *B82Y 40/00* (2013.01); *C01B 2202/02* (2013.01); *Y10S 977/75* (2013.01); *Y10S 977/843* (2013.01)

(58) Field of Classification Search
CPC .............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 40/00; B82Y 99/00; D01F 9/10; D01F 9/1271; D01F 9/1272; D01F 9/1273; D01F 9/1274; D01F 9/1275; D01F 9/1276; D01F 9/1277; D01F 9/1278; D01F 9/127; Y10S 977/843; Y10S 977/75

(Continued)

(56) References Cited

U.S. PATENT DOCUMENTS

| | | |
|---|---|---|
| 2005/0061249 A1 | 3/2005 | Miyahara et al. |
| 2010/0222432 A1 | 9/2010 | Hua |

FOREIGN PATENT DOCUMENTS

| | | |
|---|---|---|
| JP | 2005-097014 A | 4/2005 |
| JP | 2009-538809 A | 11/2009 |

(Continued)

OTHER PUBLICATIONS

Wang, et al., Continued Growth of Single-Walled carbon Nanotubes, Nano Letters 2005; 6(5): 997-1002.*

(Continued)

*Primary Examiner* — Daniel C McCracken
(74) *Attorney, Agent, or Firm* — Locke Lord LLP; James E. Armstrong, IV; Nicholas J. DiCeglie, Jr.

(57) ABSTRACT

Carbon nanotubes (CNTs) having a desired diameter are selectively produced by reacting a carbon source with a cyclic compound in which multiple aromatic rings are continuously bonded. The reaction is preferably performed by supplying a gaseous carbon source under reduced pressure and heating. The cyclic compound in which multiple aromatic rings are continuously bonded is preferably a cyclic compound in which bivalent aromatic hydrocarbon groups are continuously bonded, or a modified cycloparaphenylene compound in which a cycloparaphenylene compound or at least one phenylene group of the cycloparaphenylene compound is substituted with a condensed cyclic group such as a naphthylene group.

6 Claims, 5 Drawing Sheets

(58) Field of Classification Search
USPC ........ 423/447.1–447.3, 445 B; 977/742–754, 977/842–848
See application file for complete search history.

(56) References Cited

FOREIGN PATENT DOCUMENTS

| | | |
|---|---|---|
| JP | 2009-280450 A | 12/2009 |
| WO | WO-2008/057620 A2 | 5/2008 |

OTHER PUBLICATIONS

Smalley, et al., Single Wall Carbon Nanotube Amplification: En route to a Type-Specific Growth Mechanism, J. Am. Chem. Soc. 128: 15824-15829.*

Ogrin, et al., Amplification of Single-Walled Carbon Nanotubes from Designed Seeds: Separation of Nucleation and Growth, J. Phys. Chem. C 2007; 111: 17804-17806.*

Li, et al., Effect of gas pressure on the growth and structure of carbon nanotubes by chemical vapor deposition, Appl. Phys. A 2001; 73: 259-264.*

Brian D. Steinberg et al., "New Strategies for Synthesizing Short Sections of Carbon Nanotubes" Angew. Chem. Int. Ed., 2009, vol. 48, pp. 5400-5402 and a cover page.

Kentaro Sato, "Graphene kara Nanotube made Kagaku Gosei de Shin Tanso Zairyo ni Idomu", Gendai Kagaku, Aug. 1, 2009, No. 461, pp. 16 to 20 and partial translation thereof.

Ramesh Jasti et al., "Synthesis, Characterization, and Theory of [9]-, [12]-, and [18]Cycloparaphenylene: Carbon Nanohoop Structures," J. Am. Chem. Soc., 2008, vol. 130. No. 52, pp. 17646-17647.

Hiroko Takaba et al., "Selective Synthesis of [12]Cycloparaphenylene" Angew.Chem.Int. Ed., 2009, vol. 48, pp. 6112-6116.

Haruka Omachi et al. "A Modular and Size-Selective Synthesis of [$n$]Cycloparaphenylenes: A Step toward the Selective Synthesis of [$n,n$] Single-Walled Carbon Nanotubes" Angew.Chem.Int. Ed., 2010, vol. 49, pp. 10202-10205.

Shigeru Yamago et al., "Synthesis of [8]Cycloparaphenylene from a Square-Shaped Tetranuclear Platinum Complex" Angew.Chem. Int. Ed., 2010, vol. 49, pp. 757-759.

International Search Report dated May 29, 2012, issued for PCT/JP2012/056033.

Ramesh Jasti et al., "Progress and challenges for the bottom-up synthesis of carbon nanotubes with discrete chirality", Chemical Physics Letters, vol. 494, No. 1-3, Jul. 9, 2010, pp. 1-7.

Hiroki Ago et al.,"CVD Growth of Single-Walled Carbon Nanotubes with Narrow Diameter Distribution over Fe/MgO Catalyst and Their Fluorescence Spectroscopy", The Journal of Physical Chemistry B, vol. 109, No. 20, May 1, 2005, pp. 10035-10041.

Gang Gu et al., "Growth of Single-Walled Carbon Nanotubes From Microcontact-Printed Catalyst Patterns on Thin $Sl_3N_4$ Membranes", Advanced Functional Materials, vol. 11, No. 4, Aug. 1, 2001, pp. 295-298.

Supplementary European Search Report dated Aug. 6, 2014 for EP Patent Application No. 12755349.3.

* cited by examiner

[n]CPP     [n,n]SWNT

CARBON NANOTUBE MANUFACTURING METHOD

TECHNICAL FIELD

The present invention relates to a method for producing a carbon nanotube (CNT) using, as a template, a cyclic compound having a π-electron conjugated system with continuously bonded multiple aromatic rings.

BACKGROUND ART

Hitherto-known nanostructures containing carbon atoms include carbon nanotubes made of a cylindrically rolled two-dimensional graphene sheet.

Carbon nanotubes have high electrical conductivity, high mechanical strength, superior elasticity, heat resistance, and are lightweight. With these advantageous properties, carbon nanotubes are expected to be applied to various fields, including chemistry, electronics, and life science.

Carbon nanotubes can be produced through arc discharge, laser furnaces, chemical vapor deposition (CVD), and the like. However, these methods have a disadvantage in that they can only produce mixtures of carbon nanotubes of various lengths and diameters. The carbon nanotubes for the above usages are expected to be uniform in property; therefore, a method for selectively producing a carbon nanotube having a desired chemical structure has been strongly desired.

Recent studies reported research on a cycloparaphenylene compound, which is the smallest unit for making a carbon nanotube.

For example, Non-Patent Document 1 discloses a method for producing a cycloparaphenylene compound as a mixture having a cyclic structure composed of 9, 12, or 18 continuously bonded benzene rings, using 1,4-diiodobenzene and benzoquinone as materials.

Non-Patent Documents 2 and 3 disclose a method for producing a cycloparaphenylene compound having a cyclic structure in which 12 benzene rings are regularly bonded, using 1,4-cyclohexanedione and 1,4-diiodobenzene.

Non-Patent Document 4 discloses a method for producing a cycloparaphenylene compound in which 8 benzene rings are regularly bonded by reductive elimination of a biphenylene platinum square complex with bromine.

The cycloparaphenylene compounds disclosed in the above Non-Patent Documents have a cyclic chemical structure in which multiple phenylene groups are singly bonded. This structure has an interesting property as the smallest unit for making an armchair single-walled carbon nanotube (CNT).

CITATION LIST

Non-Patent Document

Non-Patent Document 1: Jasti, R. et al., J. Am. Chem. Soc., 2008, 130(52), 17646

Non-Patent Document 2: Itami, K. et al., Angew. Chem. Int. Ed., 2009, 48, 6112

Non-Patent Document 3: Itami, K. et al., Angew. Chem. Int. Ed., 2010, 49, 10202

Non-Patent Document 4: Yamago, S. et al., Angew. Chem. Int. Ed., 2009, 49, 757

SUMMARY OF INVENTION

Technical Problem

An object of the present invention is to provide a method for selectively producing a carbon nanotube (hereinafter referred to as "CNT") having a desired diameter.

Solution to Problem

The inventors of the present invention conducted extensive research to attain the above objective, and found that, by heating a cyclic compound, which serves as a template, having a π-electron conjugated system with continuously bonded multiple aromatic rings together with a carbon source such as ethanol, it is possible to produce a single-walled carbon nanotube (SWCNT) with a diameter directly derived from the template.

A typical template is a cyclic compound in which bivalent aromatic hydrocarbon groups are continuously bonded. Such a template is hereinafter referred to as a "carbon nanoring." Examples of carbon nanorings include a "cycloparaphenylene compound" (see Non-Patent Documents 1 to 4), which is the shortest skeleton of an armchair single-walled carbon nanotube, and a "modified cycloparaphenylene compound" in which at least one phenylene group of a cycloparaphenylene compound is substituted with a bivalent condensed polycyclic aromatic hydrocarbon group (such as 2,6-naphthylene group).

The method for producing CNT according to the present invention uses the above-described template (cyclic compound) and causes a carbon source to act on the template, thus growing a graphene sheet along the central axis direction of the cyclic compound. In this manner, it is possible to selectively produce CNT in which the diameter of the cyclic compound is substantially maintained. As such, the method of the present invention is capable of selectively producing CNT with substantially uniform diameters, and therefore is significantly remarkable. For example, the schematic diagram in FIG. 1 shows a growth of an armchair single-walled carbon nanotube by reacting a cycloparaphenylene compound ([n]CPP) in which n para-phenylenes are continuously bonded with a carbon source.

The present invention was completed after further studies based on these findings.

Specifically, the present invention provides the following carbon nanotube (CNT) production methods and carbon nanotubes (CNT).

Item 1. A method for producing a carbon nanotube, comprising reacting a carbon source with a cyclic compound in which multiple aromatic rings are continuously bonded.

Item 2. The method according to Item 1, wherein the reaction is performed by supplying a gaseous carbon source under reduced pressure and heating.

Item 3. The method according to Item 1 or 2, wherein the cyclic compound in which multiple aromatic rings are continuously bonded is a cyclic compound (carbon nanoring) in which multiple bivalent aromatic hydrocarbon groups are continuously bonded.

Item 4. The method according to Item 3, wherein the cyclic compound (carbon nanoring) in which multiple bivalent aromatic hydrocarbon groups are continuously bonded is a cycloparaphenylene compound or a modified cycloparaphenylene compound in which at least one phenylene group of the cycloparaphenylene compound is substituted with a bivalent condensed polycyclic aromatic hydrocarbon group.

Item 5. The method according to Item 4, wherein the cyclic compound (carbon nanoring) in which multiple bivalent aromatic hydrocarbon groups are continuously bonded is a cycloparaphenylene compound represented by Formula (1):

[Chem. 1]

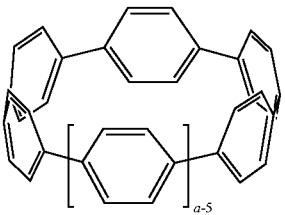

(1)

wherein a is an integer of 6 or more, or a modified cycloparaphenylene compound in which at least one phenylene group of the cycloparaphenylene compound represented by Formula (1) is substituted with a group represented by Formula (2).

[Chem. 2]

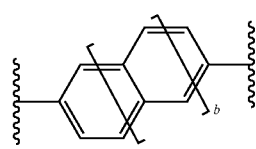

(2)

Item 6. The method according to Item 5, wherein the cycloparaphenylene compound is a compound represented by Formula (1) wherein a is an integer of 6 to 100.

Item 7. The method according to Item 5 or 6, wherein the cyclic compound (carbon nanoring) in which multiple bivalent aromatic hydrocarbon groups are continuously bonded is the cycloparaphenylene compound represented by Formula (1).

Item 8. The method according to Item 3, wherein the cyclic compound (carbon nanoring) in which multiple bivalent aromatic hydrocarbon groups are continuously bonded is a cyclic compound represented by Formula (3):

[Chem. 3]

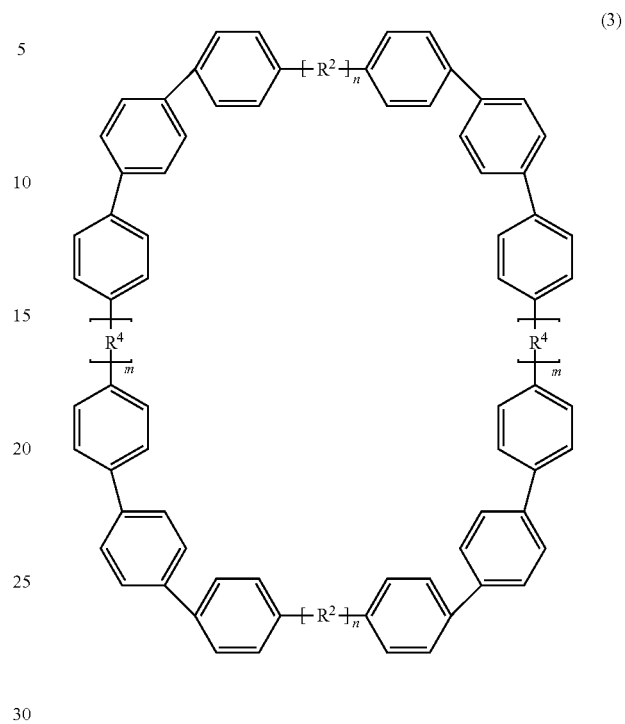

(3)

wherein $R^2$ is the same or different, and each represents a phenylene group or a bivalent condensed polycyclic aromatic hydrocarbon group; $R^4$ is the same or different, and each represents a phenylene group or a bivalent condensed polycyclic aromatic hydrocarbon group; m is the same or different, and each represents an integer of 0 or more; and n is the same or different, and each represents an integer of 1 or more, a cyclic compound represented by Formula (4):

[Chem. 4]

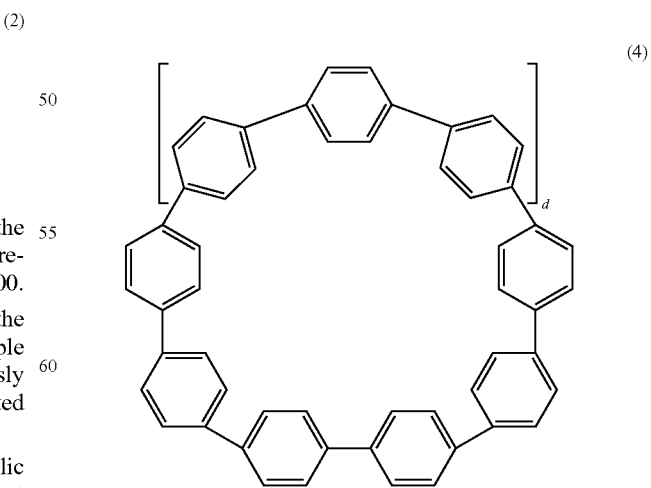

(4)

wherein d is an integer of 1 or more, or a cyclic compound represented by Formula (13):

[Chem. 5]

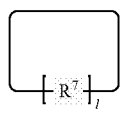

(13)

wherein $R^7$ is the same or different, and each represents a phenylene group or a bivalent condensed polycyclic aromatic hydrocarbon group; and l is 10, 11 or 13.

Item 9. The method according to any one of Items 1 to 8 wherein the carbon source is at least one member selected from the group consisting of hydrocarbon compounds, alcohol compounds, ether compounds, and ester compounds.

Item 10. The method according to any one of Items 1 to 9, wherein the reaction is performed by supplying a gaseous carbon source under a pressure of $10^{-4}$ to $10^5$ Pa with heating at 400 to 1200° C.

Item 11. A carbon nanotube obtained by reacting a carbon source with a cyclic compound in which multiple aromatic rings are continuously bonded.

Item 12. The carbon nanotube according to Item 11, wherein the reaction is performed by supplying a gaseous carbon source under reduced pressure and heating.

Item 13. The carbon nanotube according to Item 11 or 12, wherein the carbon nanotube is a single-walled carbon nanotube.

Effects of Invention

The method of the present invention produces a single-walled carbon nanotube (SWCNT) in which the diameter of the ring of the template is maintained, by using, as a template, a cyclic compound having a π-electron conjugated system with continuously bonded multiple aromatic rings.

Examples of templates include cyclic compounds (carbon nanoring) in which multiple bivalent aromatic hydrocarbon groups, such as cycloparaphenylene compounds or modified cycloparaphenylene compounds, are continuously bonded. The template may be selected from various compounds, and can be easily produced through hitherto-known methods or the methods disclosed herein.

The production method of the present invention enables production of various kinds of CNT such as armchair-type CNT or chiral CNT based on the structure of the template. For example, by using a cycloparaphenylene compound as a template, it is possible to selectively produce an armchair-type CNT having a predetermined diameter. Further, by using a modified cycloparaphenylene compound as a template, it is possible to selectively produce a chiral CNT having a predetermined diameter.

Unlike hitherto-known CNT production methods in which catalysts are indispensable, catalysts are not required in the production method of the present invention. This eliminates the need for the separation of the resulting CNT from the catalyst after the reaction. Further, although many impurities derived from the catalyst, etc., are produced by hitherto-known methods, the present invention enables production of CNT having high purity. Additionally, the heating step in the production method of the present invention can be performed at a relatively low temperature. This elimi-nates restrictions in selecting the production apparatus, thereby decreasing the production cost.

As such, the method of the present invention is a significantly remarkable method capable of selectively and efficiently producing CNT with desired diameters.

DESCRIPTION OF EMBODIMENTS

Figure 1:
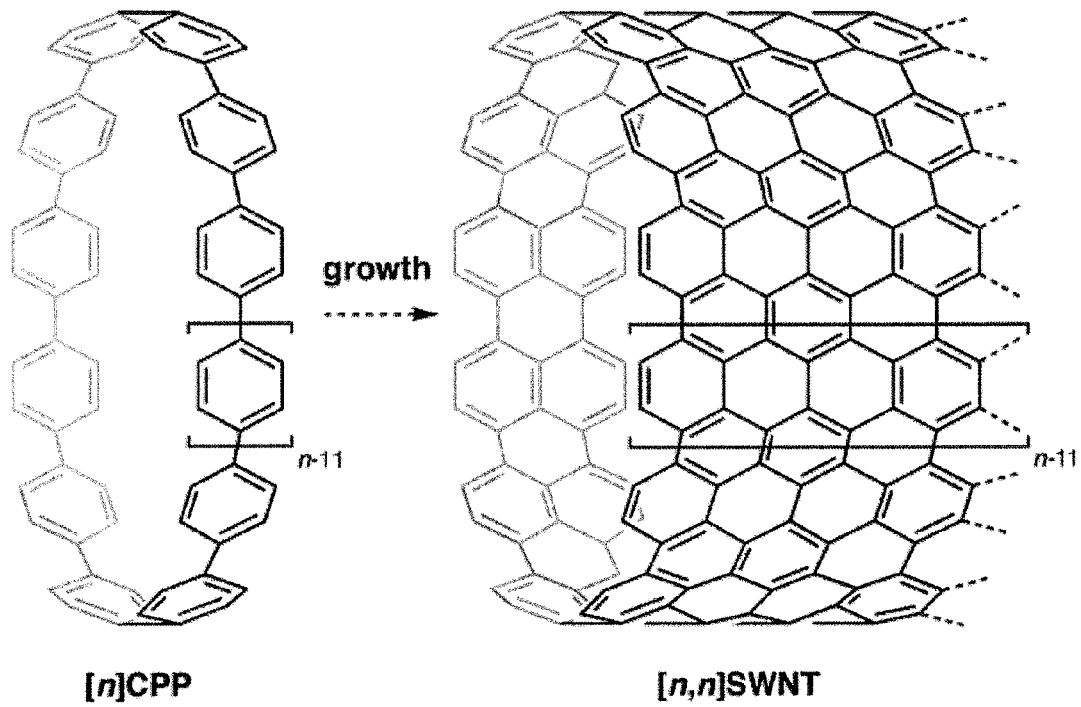
FIG. 1 is a schematic diagram showing formation of an armchair single-walled CNT from a cycloparaphenylene compound having continuously bonded n para-phenylenes ([n]CPP).

The method for producing CNT according to the present invention is characterized by reacting a cyclic compound in which multiple aromatic rings are continuously bonded with a carbon source.

1. Cyclic Compound in which Multiple Aromatic Rings are Continuously Bonded (Template)

The method for producing CNT of the present invention allows for the use of a cyclic compound in which multiple aromatic rings are continuously bonded as a material. In other words, the cyclic compound may be used as a template of CNT.

The cyclic compound in which multiple aromatic rings are continuously bonded refers to a compound in which multiple aromatic rings are circularly bonded as a π-electron conjugated system. Examples of the cyclic compound in which multiple aromatic rings are continuously bonded include a cyclic compound in which multiple bivalent aromatic hydrocarbon groups are continuously bonded (carbon nanoring).

The cyclic compound in which multiple bivalent aromatic hydrocarbon groups are continuously bonded (carbon nanoring) may be a cycloparaphenylene compound or a modified cycloparaphenylene compound in which at least one phenylene group of the cycloparaphenylene compound is substituted with a bivalent condensed polycyclic aromatic hydrocarbon group.

Examples of the cycloparaphenylene compound include a cycloparaphenylene compound having 6 or more phenylene groups. More specifically, examples of the cycloparaphenylene compound include a compound represented by Formula (1):

[Chem. 6]

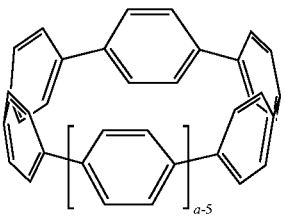

(1)

wherein a is an integer of 6 or more.

a is an integer of preferably 6 to 100, more preferably 8 to 50, further preferably 8 to 30, further preferably 9 to 20, particularly preferably 10 to 18. More specifically, a is an integer of 6, 7, 8, 9, 10, 11, 12, 13, 14, 15, 16, 17, 18, 19, or 20, particularly preferably 9, 10, 11, 12, 13, 14, 15, 16, 17, or 18.

The diameter of the ring of the compound represented by Formula (1) is about 1.2 to 1.7 nm when a is an integer of 9 to 12, about 1.8 to 2.4 nm when a is an integer of 13 to 16, and is about 1.8 to 2.5 nm when a is an integer of 13 to 18.

According to the method for producing CNT of the present invention, the diameter of the cyclic compound as a starting material is substantially maintained in the diameter of resulting CNT. Therefore, the method of the present invention enables production of CNT having a substantially uniform diameter.

The modified cycloparaphenylene compound is a compound in which at least one (preferably 1 to 4, more preferably 1 to 2, particularly preferably 1) phenylene group of the cycloparaphenylene compound is substituted with a bivalent condensed polycyclic aromatic hydrocarbon group.

Examples of bivalent condensed polycyclic aromatic hydrocarbon group include various bivalent groups obtained by removing two hydrogen atoms from a hydrocarbon resulting from condensation of two or more benzene rings (2 to 7, preferably 2 to 4, particularly preferably 2), such as naphthalene, anthracene, phenanthrene, naphthacene, triphenylene, pyrene, chrysene, pentacene, hexacene, or perylene. The positions of the two bonding sites of the condensed polycyclic aromatic hydrocarbon group are not limited, insofar as the modified cycloparaphenylene compound forms a ring.

Preferable examples of bivalent condensed polycyclic aromatic hydrocarbon group include a group represented by Formula (2):

[Chem. 7]

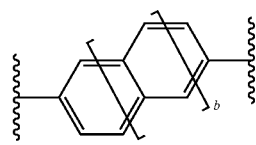

(2)

wherein b is an integer of 1 or more.

b is an integer of preferably 1 to 6, more preferably 1 to 3, further preferably 1 or 2, particularly preferably 1.

Examples of the cyclic compound in which multiple bivalent aromatic hydrocarbon groups are continuously bonded (carbon nanoring) include a cyclic compound represented by Formula (3):

[Chem. 8]

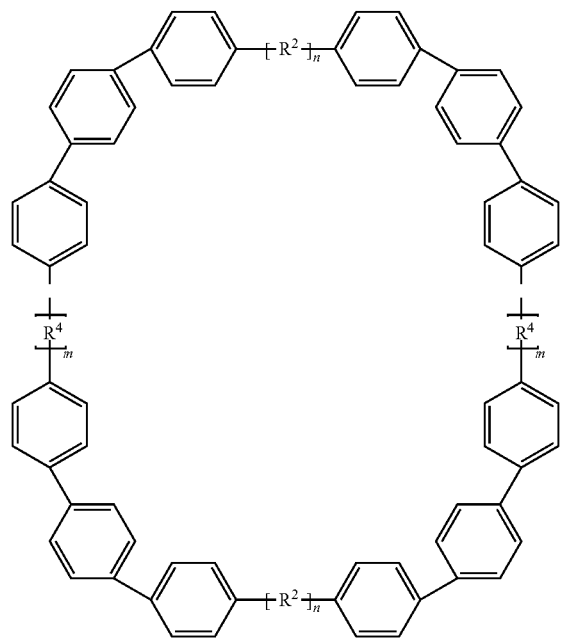

(3)

wherein $R^2$ is the same or different, and each represents a phenylene group or a bivalent condensed polycyclic aromatic hydrocarbon group; $R^4$ is the same or different, and each represents a phenylene group or a bivalent condensed polycyclic aromatic hydrocarbon group; m is the same or different, and each represents an integer of 0 or more; and n is the same or different, and each represents an integer of 1 or more; a cyclic compound represented by Formula (4):

[Chem. 9]

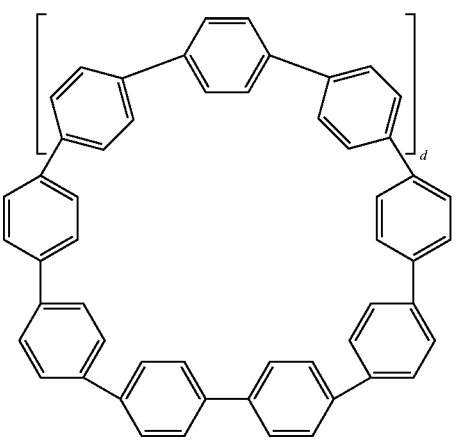

(4)

wherein d is an integer of 1 or more; or a cyclic compound represented by Formula (13):

[Chem. 10]

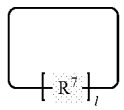

wherein $R^7$ is the same or different, and each represents a phenylene group or a bivalent condensed polycyclic aromatic hydrocarbon group; and l is 10, 11, or 13.

In Formula (3), the phenylene group represented by $R^2$ and $R^4$ may be the same or different; however, the phenylene group is preferably a 1,4-phenylene group.

In Formula (3), the bivalent condensed polycyclic aromatic hydrocarbon group represented by $R^2$ and $R^4$ may be the same or different; examples thereof include a bivalent group obtained by removing two hydrogen atoms from a hydrocarbon resulting from condensation of two or more (2 to 7, preferably 2 to 4, particularly preferably 2) benzene rings. Examples are as described above, and are preferably a group represented by Formula (2).

In Formula (3), m may be the same or different, and each represents an integer of 0 or more. Preferably, m is an integer of not more than 10, more preferably an integer of not more than 5, further preferably an integer of not more than 3, and particularly preferably an integer of 1 or 2. When m is 2 or more, the group has a structure in which multiple $R^4$ are directly bonded. In this case, $R^4$ directly bonded may be the same or different.

In Formula (3), n may be the same or different, and each represents an integer of 1 or more. Preferably, n is an integer of not more than 10, more preferably an integer of not more than 5, further preferably an integer of not more than 3, and particularly preferably an integer of 1 or 2. When n is 2 or more, the group has a structure in which multiple $R^2$ are directly bonded. In this case, $R^2$ directly bonded may be the same or different.

In Formula (3), a chiral carbon nanoring may be formed when at least one of $R^2$ and $R^4$ is a bivalent condensed polycyclic aromatic hydrocarbon group (in particular, the group represented by Formula (2)). Further, by using this carbon nanoring as a template for the later-described production method of the present invention, it is possible to produce chiral CNT with a diameter substantially derived from the diameter of the carbon nanoring.

In Formula (4), d is preferably an integer of 1 to 3, more preferably 1 or 2.

In Formula (13), the phenylene group and the bivalent condensed polycyclic aromatic hydrocarbon group represented by $R^7$ are specifically the same as the groups represented by $R^2$ and $R^4$ in Formula (3). The preferable examples thereof are also the same. l is 10, 11, or 13.

More specifically, Compound (13) is represented by the following formula.

[Chem. 11]

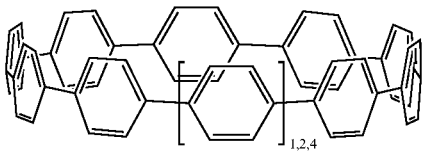

2. Carbon Source

The carbon source to be used in the production method of the present invention may be selected from various carbons or carbon-containing compounds. The carbon source is not particularly limited insofar as it is capable of growing a graphene sheet of CNT from the above template (cyclic compound) along the central axis of the ring. Examples of the carbon source include carbon, hydrocarbon compounds, alcohol compounds, ether compounds, and ester compounds. These materials may be used singly, or in a combination of two or more.

Examples of hydrocarbon compounds include saturated or unsaturated aliphatic hydrocarbon compounds and aromatic hydrocarbon compounds.

Examples of saturated aliphatic hydrocarbon compounds include $C_{1-100}$ (preferably $C_{1-10}$, more preferably $C_{1-4}$) linear, branched or cyclic alkanes, such as methane, ethane, propane, butane, pentane, hexane, and heptane.

Examples of unsaturated aliphatic hydrocarbon compounds include $C_{2-100}$ (preferably $C_{2-10}$, more preferably $C_{2-6}$) linear, branched or cyclic alkenes having 1 to 3 double bonds. Examples thereof include ethylene, propene, 1-butene, 2-butene, and butadiene. Ethylene is preferable. Examples also include $C_{2-100}$ (preferably $C_{2-10}$, more preferably $C_{2-4}$) linear, branched, or cyclic alkines having 1 to 3 triple bonds. Examples thereof include acetylene and propyne. Acetylene is preferable.

Examples of aromatic hydrocarbon compounds include monocyclic or polycyclic aromatic hydrocarbons such as benzene, toluene, xylene, naphthalene, cumene, ethyl benzene, phenanthrene, and anthracene.

Examples of alcohol compounds include $C_{1-50}$ (preferably $C_{1-10}$, more preferably $C_{1-4}$) linear, branched, or cyclic mono- or polyalcohol. Examples thereof include methanol, ethanol, n-propanol, isopropanol, n-butanol, isobutanol, sec-butanol, tert-butanol, n-pentanol, and ethylene glycol. Methanol, ethanol, and propanol are preferable.

Examples of ether compounds include $C_{2-50}$ (preferably $C_{2-10}$, more preferably $C_{2-4}$) linear, branched, or cyclic ethers. Examples thereof include dimethyl ether, diethylether, diisopropyl ether, diisobutyl ether, tetrahydrofuran, and dioxane.

Examples of ester compounds include a compound represented by the equation $R^5$—C(=O)O—$R^6$ (wherein $R^5$ represents hydrogen atom or $C_{1-10}$ alkyl group; and $R^6$ represents $C_{1-10}$ alkyl group). Examples of $C_{1-10}$ alkyl groups represented by $R^5$ and $R^6$ are the same or different, and each represents a linear or branched alkyl group such as methyl, ethyl, n-propyl, isopropyl, n-butyl, isobutyl, sec-butyl, or tert-butyl. Examples thereof include formic acid methyl, formic acid ethyl, acetic acid methyl, ethyl acetate, methyl propionate, and propionic acid ethyl.

In light of the production method of the present invention, among the above examples of carbon sources, a carbon source that can be turned into gas under reduced pressure is preferable. For example, $C_{1-6}$ linear, branched, or cyclic monoalcohols such as methanol, ethanol, or propanol; $C_{1-6}$ linear, branched or cyclic alkanes such as methane or ethane; $C_{2-4}$ alkenes such as ethylene; and $C_{2-4}$ alkines such as acetylene are preferable.

3. Production Method for CNT

The method for producing CNT of the present invention is characterized by reacting a cyclic compound (template) in which multiple aromatic rings are continuously bonded with a carbon source. More specifically, it is preferable to supply a gaseous carbon source and perform heating under reduced pressure. For example, the production method of the present invention may be performed by chemical vapor deposition (CVD) using the cyclic compound as a template in the presence of a carbon source. In typical CNT production, the template is placed on an appropriate carrier, and is subjected to chemical vapor deposition (CVD) under reduced pressure and heating, using a gas material containing a carbon source. In the production method of the present invention, CNT can be produced by extending a graphene sheet from the template (i.e., by expanding the π-electron conjugated system) without using a catalyst (metal catalyst, etc.) used in hitherto-known CVD methods (see, for example, FIG. 1). The resulting CNT is a single-walled CNT (SWCNT).

The carrier for carrying the template is not limited insofar as it is made of a material that can carry the template and insofar as it does not adversely affect the CNT production. Examples thereof include silica, alumina, magnesia, ceria, porous zeolite, and mesoporous silica. The shape of the carrier is not particularly limited; examples thereof include various shapes such as powder, particles, and plates.

Further, a substrate may be used as a carrier. Examples of the substrate include monocrystalline sapphire substrates, silicon substrates, quartz glass substrates, porous silicon substrates, and porous alumina substrates. Monocrystal line sapphire substrates are preferable. The method for placing the template on the substrate is not particularly limited; for example, it is possible to coat the substrate with a solution obtained by dissolving the template in an appropriate solvent.

The solvent is not particularly limited insofar as it dissolves the template; examples thereof include alcohols (such as methanol, ethanol, or propanol), ethers (such as diethylether, tetrahydrofuran, or dioxane), aromatic hydrocarbons (such as benzene, toluene, or xylene), and esters (such as ethyl acetate). The concentration of the solution containing the template may be appropriately changed depending on the solubility of the template, the size of the substrate, etc. Generally, the solution containing the template preferably has a low concentration so that the molecules of the template are not overlapped, i.e., they are each present as a single molecule on the substrate. For example, the concentration is 0.00001 to 0.01 wt %, preferably 0.0001 to 0.005 wt %.

The method for coating the substrate with the solution containing the template is not particularly limited; examples thereof include spin coating, spray coating, and dip coating. Spin coating is preferable. When spin coating is performed, the revolutions per minute is, for example, about 1000 to 10000 rpm, and the rotation time is about 10 to 30 seconds. Thereafter, the coating is dried to remove the solvent, thereby disposing the template on the substrate.

It is preferable to transfer a carrier with a template placed thereon to a reaction vessel, and subject the carrier to CVD with a carbon source. Generally, the reaction is performed by evacuating a reaction vessel in which the carrier is placed, and advancing the reaction after a gas containing a carbon source is supplied, or while supplying a gas containing a carbon source at an appropriate temperature under an appropriate pressure. The reaction is preferably performed under a stable temperature, a stable pressure, and a stable supply amount of carbon source.

The atmospheric gas in the reaction is not particularly limited insofar as the gas is inactive and does not react with the template or CNT under the reaction condition. Examples of atmospheric gas include helium, argon, hydrogen, nitrogen, neon, krypton, and a mixture gas thereof. Helium, argon, or the like is particularly preferable.

Generally, a gaseous carbon source is supplied as the carbon source. The amount of carbon source to be supplied is not particularly limited. When a gaseous carbon source is supplied, it is generally sufficient if the amount is 5 to 2000 mL/min. It is also possible to supply a mixture gas obtained by diluting a gaseous carbon source with the atmospheric gas.

Generally, the pressure in the reaction vessel is preferably reduced (not more than atmospheric pressure). For example, the pressure in the reaction vessel is about $10^{-4}$ to $10^5$ Pa, preferably about $10^{-3}$ to $10^5$ Pa, more preferably about $10^2$ to $10^4$ Pa.

The temperature inside the reaction vessel is generally 400 to 1200° C., preferably 450 to 700° C., more preferably 450 to 500° C. The reaction time is, for example, 5 to 30 minutes, preferably 10 to 15 minutes.

The structure of the resulting CNT may be evaluated using Raman spectroscopy and observation with a transmission electron microscope (TEM).

Figure 4:
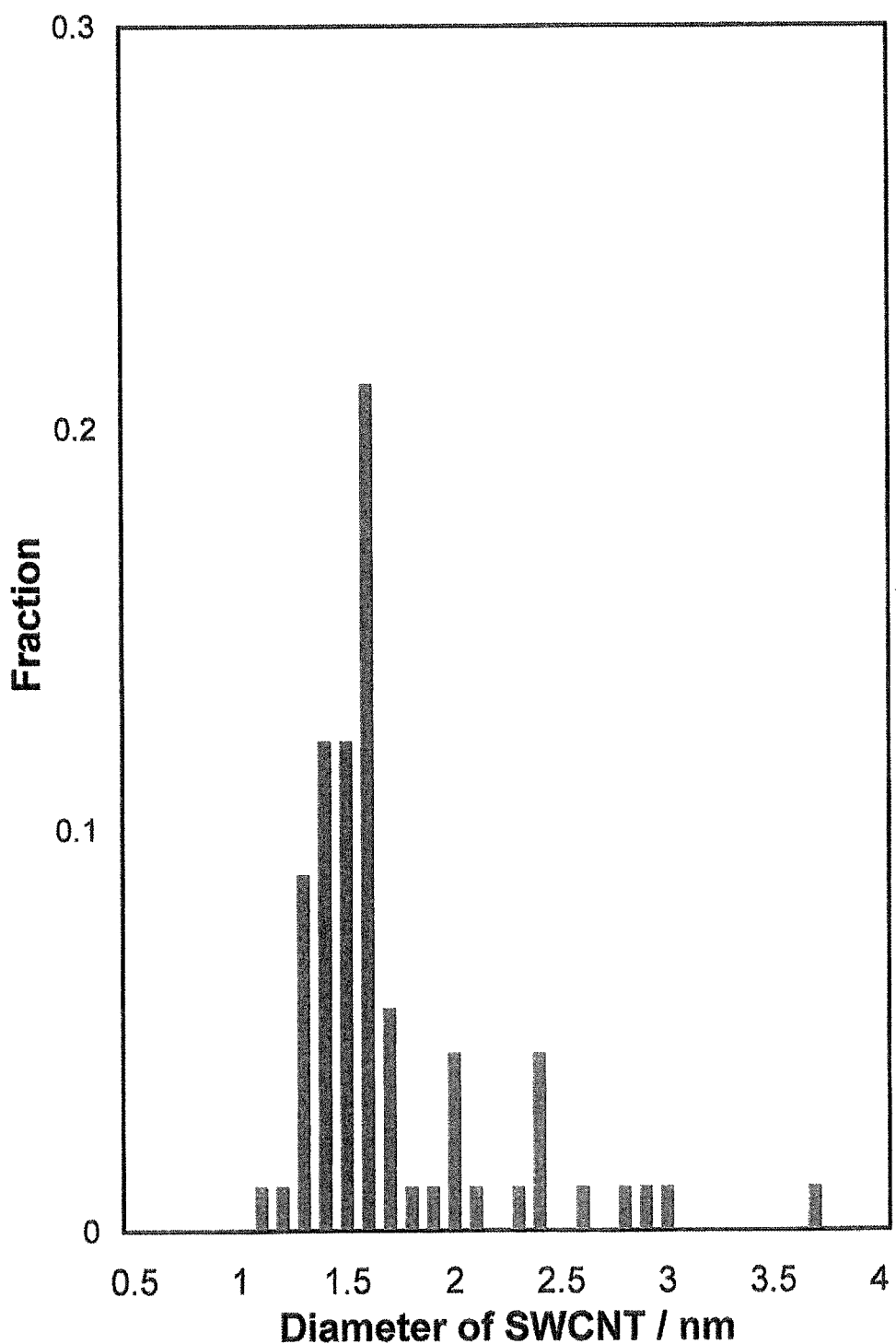
FIG. 4 is a graph showing distribution of diameters of CNT obtained in Example 1; the diameters were measured with a transmission electron microscope.

Further, using a TEM image of a single-walled carbon nanotube, it is possible to confirm the diameter of CNT, the bundle form of the single-walled CNT, the presence/absence of defects on the wall of the single-walled carbon nanotube, etc. For example, FIG. 4 shows a result of distribution of CNT diameters measured with a transmission electron microscope regarding CNT produced from [12]cycloparaphenylene in Example 1.

In Raman spectroscopy, a vibration mode called breathing mode appears in a tube obtained by seamlessly folding a single graphene sheet into a cylinder. The number of vibrations in this vibration mode is known to be inversely proportional to the tube diameter; therefore, the distribution of CNT diameters can be found by measuring the number of vibrations of the breathing mode by Raman scattering.

Further, in Raman spectroscopy, a ratio (G/D) of the spectral intensity of the G band, which is a Raman band inherent in CNT, to the spectral intensity of the D band derived from an amorphous carbon can be regarded as an index showing the purity of the synthesized single-walled carbon nanotube (i.e., a scale showing contamination with impurities).

Further, since Raman spectroscopy enables detection of various CNT by changing the wavelength of laser, it is possible to evaluate physical properties of CNT using laser of variable wavelengths. Regarding CNTs obtained in the present invention, for example, an excitation wavelength of 514 nm and 488 nm enables detection of a semiconductor CNT, and an excitation wavelength of 633 nm enables detection of a metal CNT.

The production method of the present invention enables production of CNT having a diameter substantially faithfully replicated from the diameter of the cyclic compound used as the template. Therefore, the resulting CNT has a feature such that the CNT has a diameter distribution significantly smaller than the diameter distribution of CNT produced by a hitherto-known CVD. For example, when [12]cycloparaphenylene (ring diameter=1.65 nm) in which 12 phenylene groups are continuously bonded is used as a template in Example 1, the diameter of the resulting CNT is 1.4 to 1.6 nm, which is almost the same as that of [12]CPP (FIG. 4). Accordingly, the production method of the present invention is useful as a CNT production method with diameter control of CNT by the template).

Further, the production method of the present invention may be performed under mild conditions at a relatively low temperature; that is, a catalyst or high temperature is not necessary. This is presumably because of the template used as a starting material. Thus, it is possible to form a graphene sheet (grow a n-conjugated system) under mild conditions without using a catalyst or high temperature.

Further, the CNT obtained by the production method of the present invention does not contain impurities since a catalyst such as a metal catalyst is not used. Therefore, the method of the present invention enables production of highly pure CNT without a burdensome purification step. Moreover, since the CNT is free of metal particles derived from a catalyst, the CNT may be appropriately used for devices, transistors, integrated circuits, memories, sensors, wires, and the like.

4. Production of Template

The cyclic compound in which multiple aromatic rings are continuously bonded to be used as the template in the production method of the present invention may be produced, for example, as follows.

The cycloparaphenylene compound (in particular, the compound represented by Formula (1)) may be produced, for example, according to the methods disclosed in Non-Patent Documents 1 to 4. Further, the carbon nanoring (cycloparaphenylene compound and/or modified cycloparaphenylene compound) may be produced, for example, through the production methods shown in Reaction Formulas 1 to 3.

[Chem. 12]

Reaction Formula 1

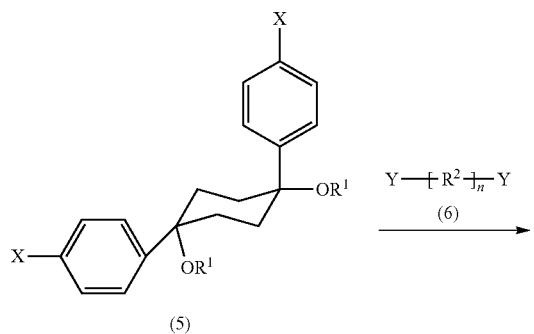

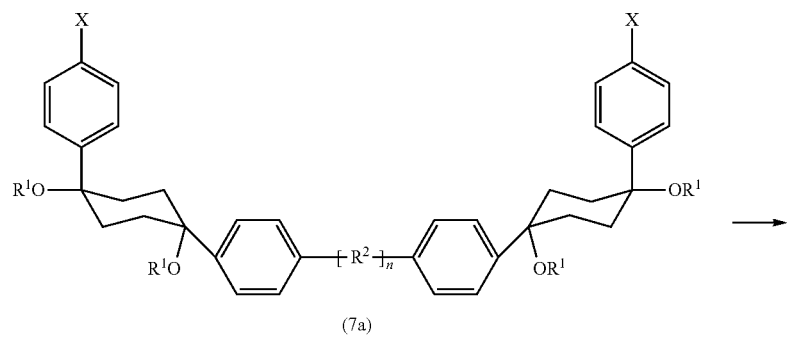

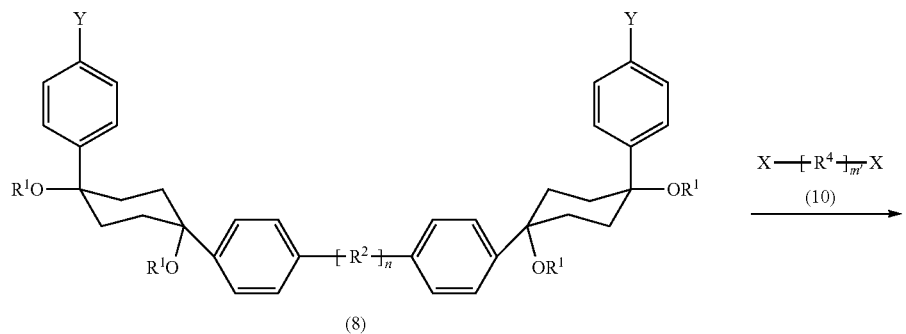

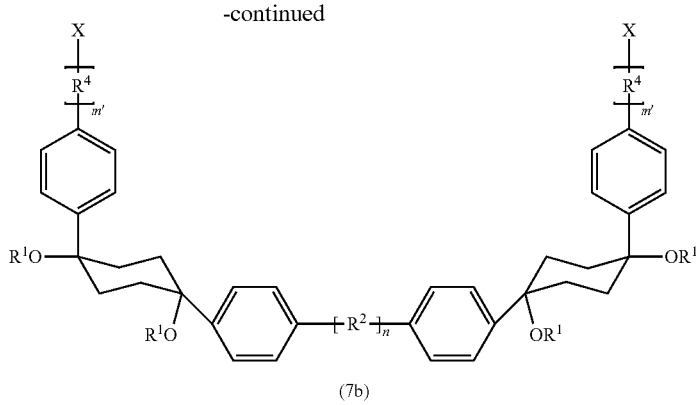

(7b)

wherein $R^1$ is the same or different, and each represents hydrogen atom or hydroxyl protecting group; $R^2$ is the same or different, and each represents a phenylene group or a bivalent condensed polycyclic aromatic hydrocarbon group; $R^4$ is the same or different, and each represents a phenylene group or a bivalent condensed polycyclic aromatic hydrocarbon group; m' is the same or different, and each represents an integer of 1 or more; n is the same or different, and each represents an integer of 1 or more; X is the same or different, and each represents halogen atom; and Y is the same or different, and each represents a group represented by Formula (9):

[Chem. 13]

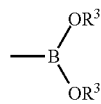

(9)

wherein $R^3$ is the same or different, and each represents hydrogen atom or $C_{1-10}$ alkyl group; $R^3$ may be bonded to form a ring with adjacent —O—B—O—.

$R^1$ represents hydrogen atom or hydroxyl protecting group. Examples of the hydroxyl protecting groups include an alkoxy alkyl group (such as a methoxymethyl group (—$CH_2$—O—$CH_3$, which may be referred to as "-MOM" hereinafter), alkanoyl group (e.g., an acetyl group, propionyl group, etc.), a silyl group (e.g., a trimethylsilyl group, triethylsilyl group, t-butyldimethylsilyl group, etc.), a tetrahydropyranyl group (THP), an alkyl group (e.g., methyl group, ethyl group, etc.), and an aralkyl group (such as a benzyl group). An alkoxy alkyl group, in particular, a methoxymethyl group, is preferable.

$R^2$ and $R^4$ are as defined above.

m' is preferably an integer of 1 to 30, more preferably an integer of 1 to 20, further preferably an integer of 1 to 10, particularly preferably an integer of 1 to 2.

n are as defined above.

Examples of halogen atoms represented by X include fluorine atom, chlorine atom, bromine atom and iodine atom. Bromine atom and iodine atom are preferable. Bromine atom is particularly preferable.

In the monovalent group (hereinafter referred as "boronic acid or an ester thereof") in Formula (9) represented by Y, the alkyl group represented by $R^3$ is preferably a linear or branched $C_{1-8}$ alkyl group, more preferably a linear or branched $C_{1-5}$ alkyl group. Further, when $R^3$ is an alkyl group, the carbon atoms of these alkyls may be bonded to each other to form a ring with the boron atom and the two oxygen atoms. In this case, Y may be any of the groups represented by Formulas (9a) to (9c) below:

[Chem. 14]

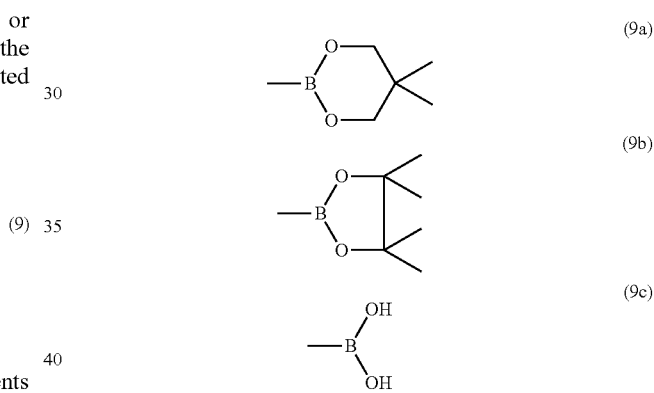

When Y in Compound (6) is one of the groups represented by Formulas (9a) to (9c), it is possible to more efficiently advance the reaction of Compound (5) and Compound (6). Compounds (5) and (6):

Compounds (5) and (6) may be synthesized according to the method of Non-Patent Document 3, or Synthesis Examples 1 to 5 in this specification of the present invention. Synthesis of Compound (7a):

By reacting Compound (5) and Compound (6), Compound (7a) is produced. The reaction of Compound (5) and Compound (6) may be performed according to the Suzuki-Miyaura coupling reaction. The Suzuki-Miyaura coupling reaction is a carbon-carbon bond reaction that couples an aryl halide compound and an organic boron compound. Compound (5) is an aryl halide compound having a halogen atom, and Compound (6) is an organic boron compound having a boronic acid or an ester thereof.

In the above reaction step, the amounts of Compound (6) is preferably 0.01 to 0.5 mol, more preferably 0.05 to 0.4 mol, and yet more preferably 0.08 to 0.2 mol, per mol of Compound (5).

In the above reaction, a palladium catalyst is generally used. Examples of palladium catalysts include $Pd(PPh_3)_4$ (Ph represents a phenyl group), $PdCl_2(PPh_3)_2$ (Ph represents a phenyl group), Pd(OAc)$_2$ (Ac represents an acetyl group), tris(dibenzylideneacetone)dipalladium(0) (Pd$_2$(dba)$_3$), tris (dibenzylideneacetone)dipalladium(0)chloroform complex, bis(dibenzylideneacetone)palladium(0), bis(tri-t-butyl) phosphino)palladium(0), and (1,1'-bis(diphenylphosphino) ferrocene)dichloropalladium(II). In the above reaction, Pd(PPh$_3$)$_4$ and Pd$_2$(dba)$_3$ are preferable.

In terms of the yield, the amount of the palladium catalyst is generally 0.0001 to 0.1 mol, preferably 0.0005 to 0.02 mol, and more preferably 0.001 to 0.01 mol, per mol of Compound (5).

In the above reaction, as required, it is possible to use a phosphorus ligand that can be coordinated with the palladium atom that is the center element of the palladium catalyst. Examples of phosphorus ligands include triphenylphosphine, tri-o-tolylphosphine, tri-m-tolylphosphine, tri-p-tolylphosphine, tris(2,6-dimethoxyphenyl)phosphine, tris[2-(diphenylphosphino)ethyl]phosphine, bis(2-methoxyphenyl)phenyl phosphine, 2-(di-t-butyl phosphino) biphenyl, 2-(dicyclohexylphosphino)biphenyl, 2-(diphenylphosphino)-2'-(N,N-dimethylamino)biphenyl, tri-t-butyl phosphine, bis (diphenylphosphino)methane, 1,2-bis(diphenylphosphino)ethane, 1,2-bis(dimethylphosphino) ethane, 1,3-bis(diphenylphosphino) propane, 1,4-bis(diphenylphosphino)butane, 1,5-bis(diphenylphosphino)pentane, 1,6-bis(diphenylphosphino) hexane, 1,2-bis(dimethylphosphino) ethane, 1,1'-bis(diphenylphosphino) ferrocene, bis(2-diphenylphosphino ethyl)phenyl phosphine, 2-(dicyclohexylphosphino-2',6'-dimethoxy-1,1'-biphenyl (S-Phos), 2-(dicyclohexylphosphino-2',4',6'-tri-isopropyl-1,1'-biphenyl (X-Phos), and bis(2-diphenylphosphino phenyl)ether (DPEPhos). In the above reaction, 2-(dicyclohexylphosphino)-2',4',6'-tri-isopropyl-1,1'-biphenyl (X-Phos), and the like, are preferable.

When a phosphorus ligand is used, the amount is, in terms of the yield, generally 0.001 to 1.0 mol, preferably 0.01 to 0.8 mol, and more preferably 0.05 to 0.3 mol, per mol of Compound (5).

In the above reaction, a base (a reagent for activation of boron species) is preferably used in addition to the palladium catalyst. This base is not particularly limited insofar as the base is a compound that can form an ate complex on the boron atom through the Suzuki-Miyaura coupling reaction. Examples of bases include potassium fluoride, cesium fluoride, sodium hydroxide, potassium hydroxide, sodium methoxide, sodium hydrogen carbonate, potassium hydrogen carbonate, sodium carbonate, potassium carbonate, cesium carbonate, potassium phosphate, sodium acetate, potassium acetate, and calcium acetate. Among these, cesium fluoride, cesium carbonate, and potassium phosphate are preferable. The amount of the base is generally about 0.01 to 10 mol, preferably 0.1 to 5.0 mol, more preferably 0.5 to 1.0 mol, per mol of Compound (5).

The coupling reaction is generally performed in the presence of a reaction solvent. Examples of reaction solvents include aromatic hydrocarbons such as toluene, xylene, or benzene; esters such as methyl acetate, ethyl acetate, or butyl acetate; cyclic ethers such as diethylether, tetrahydrofuran, dioxane, dimethoxyethane, or diisopropyl ether; halogenated hydrocarbons such as methyl chloride, chloroform, dichloromethane, dichloroethane, or dibromoethane; ketones such as acetone or methyl ethyl ketone; amides such as dimethylformamide or dimethylacetamide; nitriles such as acetonitrile; alcohols such as methanol, ethanol, or isopropyl alcohol; and dimethylsulfoxides. These substances can be used singly, or in a combination of two or more. Among them, tetrahydrofuran, etc., are preferable in the present invention.

The temperature in the above reaction is generally selected from a temperature range of not less than 0° C. and not more than the boiling point of the reaction solvent. The reaction atmosphere in the above coupling step is not particularly limited; an inert gas atmosphere, such as an argon gas atmosphere, a nitrogen gas atmosphere, etc., is preferable. It is also possible to adopt an air atmosphere.

After the reaction, a purification step may be performed as necessary. In this purification step, general post-treatment steps, such as solvent removal, washing, chromatography separation, or the like, may be performed.

In the above production method, it is possible to select an appropriate number of n in $R^2$ in Compound (6), thereby arbitrarily and accurately determining the number of aromatic rings, i.e., the molecular length of Compound (7a).

Synthesis of Compound (8):

This reaction is a step for forming Compound (8) using Compound (7a) and a boron compound having a boronic acid or an ester thereof ($—B(OR^3)_2$; $R^3$ is as defined above) (this boron compound may be simply referred to as "boron compound" hereinafter).

In this reaction step, the halogen atom X in Compound (7a) is substituted with Y, which is a boronic acid or an ester thereof, in the boron compound, thereby obtaining Compound (8) having Y (boronic acid or an ester thereof) derived from the boron compound. This reaction for forming Compound (8) is a borylation reaction.

Examples of boron compounds used in the above reaction include 2-phenyl-1,3,2-dioxaborinane, (4,4,5,5)-tetramethyl-1,3,2-dioxaborolane, 4,4,4',4',5,5,5',5'-octamethyl-2,2'-bi[1,3,2-dioxaborolane] (bispinacolatodiboron), 5,5,5',5'-tetramethyl-5,5',6,6'-tetrahydro-2,2'-bi[4H-1,3,2-dioxaborine], and 1,1,2,2-tetrahydroxy-1,2-diboraethane.

The amount of the boron compound used in the reaction is preferably 1 to 10 mol, more preferably 1.5 to 7 mol, and further more preferably 2 to 5 mol, per mol of Compound (7a).

The above reaction is generally performed in the presence of a catalyst, preferably a palladium catalyst. The palladium catalyst used herein can be selected from the palladium catalysts used in the above coupling reaction. In particular, Pd$_2$(dba)$_3$, Pd(PPh$_3$)$_4$, and the like, are preferable.

When a palladium catalyst is used, the amount thereof is, in view of the yield, generally 0.001 to 1 mol, preferably 0.005 to 0.1 mol, and more preferably 0.01 to 0.05 mol, per mol of Compound (7a) used as a raw material.

In this reaction, a phosphorus ligand may be used together with a catalyst. This phosphorus ligand may be selected from the phosphorus ligands used in the coupling reaction. In particular, 2-(dicyclohexylphosphino)-2',4',6'-tri-isopropyl-1,1'-biphenyl (X-Phos), and the like, are preferable.

When a phosphorus ligand is used, the amount thereof is, in view of the yield, generally 0.01 to 1.0 mol, preferably 0.05 to 0.5 mol, more preferably 0.08 to 0.2 mol, per mol of Compound (7a) used as a raw material.

Further, as required, a base may be used in this reaction. The base may be selected from the bases used in the above coupling reaction. The amount of the base is generally about 0.1 to 5.0 mol, preferably 0.5 to 1.0 mol, per mol of Compound (7a) used as a raw material.

This reaction is generally performed in the presence of a reaction solvent. The reaction solvent may be selected from the reaction solvents used in the above coupling reaction.

The temperature in the reaction is generally selected from a range of not less than 0° C. and not more than the boiling point of the reaction solvent. Further, the reaction atmosphere in the above coupling step is not particularly limited; an inert gas atmosphere, such as an argon gas atmosphere, a nitrogen gas atmosphere, etc., is preferable. It is also possible to adopt an air atmosphere.

When the boron compound is a compound having a boronic acid ester group, it is possible to first produce Compound (8) having the boronic acid ester group, and then convert the boronic acid ester group into a boronic acid group through hydrolysis.

Synthesis of Compound (7b):

This step is performed to form Compound (7b) from Compound (8) and Compound (10).

In this step, Y (boronic acid or an ester thereof) in Compound (8) is substituted with —[$R^4$]$_m$—X. Accordingly, it is possible to appropriately adjust the size of the carbon nanoring.

The amount of Compound (10) is preferably 0.1 to 10 mol, more preferably 0.5 to 5 mol, further preferably 0.8 to 2 mol, per mol of Compound (8).

This reaction is generally performed in the presence of a catalyst, preferably a palladium catalyst. The palladium catalyst used herein can be selected from the palladium catalysts used in the above coupling reaction. In particular, (1,1'-bis(diphenylphosphino)ferrocene)dichloro palladium (II), Pd$_2$(dba)$_3$, Pd(PPh$_3$)$_4$, and the like, are preferable.

When a palladium catalyst is used, the amount thereof is, in view of the yield, generally 0.001 to 1 mol, preferably 0.005 to 0.2 mol, more preferably 0.01 to 0.1 mol, per mol of Compound (8) used as a raw material.

A phosphorus ligand may be used together with a catalyst. This phosphorus ligand may also be selected from the phosphorus ligands used in the coupling reaction. In particular, 1,1'-bis(diphenylphosphino) ferrocene, 2-(dicyclohexylphosphino)-2',4',6'-tri-isopropyl-1,1'-biphenyl (X-Phos), and the like, are preferable.

When a phosphorus ligand is used, the amount thereof is, in view of the yield, generally 0.01 to 1.0 mol, preferably 0.05 to 0.5 mol, more preferably 0.08 to 0.2 mol, per mol of Compound (8) used as a raw material.

In this reaction, a base may be used as required. The base used herein may be selected from the bases used in the above coupling reaction. Examples of preferable bases include sodium carbonate, phosphate potassium, and the like. The amount of the base is generally about 0.1 to 5.0 mol, preferably 0.5 to 1.0 mol, per mol of Compound (8) used as a raw material.

This reaction is generally performed in the presence of a reaction solvent. The reaction solvent may be selected from the reaction solvents used in the above coupling reaction. In this step, toluene, 1,4-dioxane, water, a mixed solvent thereof, etc., are preferable.

The temperature in the reaction is generally selected from a range of not less than 0° C., and not more than the boiling point of the reaction solvent. The reaction atmosphere is not particularly limited; an inert gas atmosphere, such as an argon gas atmosphere, a nitrogen gas atmosphere, etc., is preferable. It is also possible to adopt an air atmosphere.

[Chem. 15]

Reaction Formula 2

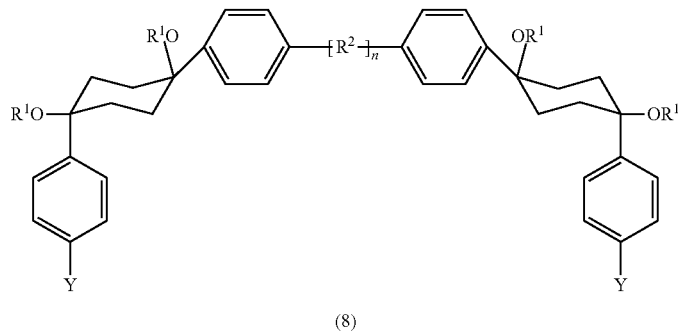

(8)

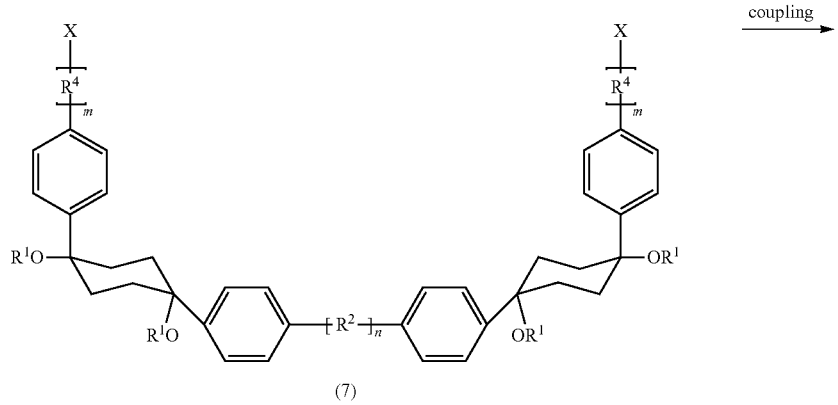

(7)

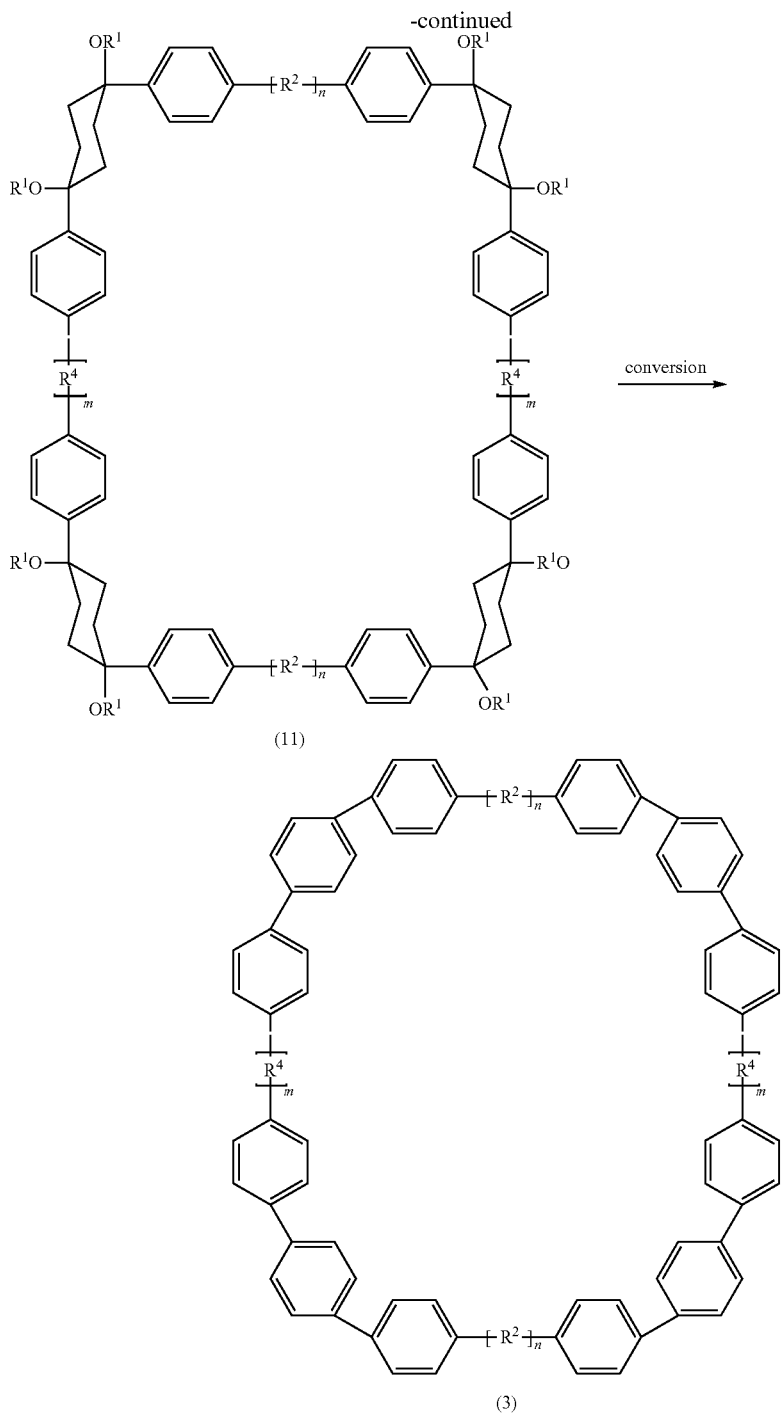

wherein $R^1$, $R^2$, $R^4$, m, n, X and Y are as defined above.

Synthesis of Compound (11) from Compounds (7) and (8):

This step is performed to form Compound (11) from Compound (7) and Compound (8). Compound (7) includes Compound (7a) and Compound (7b).

Compound (11) is obtained through a coupling reaction that forms a cyclic compound by reacting Compound (7) with Compound (8). Due to their U-shaped structures, the coupling of Compound (7) and Compound (8) efficiently form Compound (11).

In the above coupling reaction, the amount of Compound (8) is preferably 0.8 to 3.0 mol, more preferably 1.0 to 2.0 mol, further preferably 1.2 to 1.8 mol, per mol of Compound (7).

This reaction is generally performed in the presence of a catalyst, preferably a palladium catalyst. The palladium catalyst used herein can be selected from the palladium catalysts used in the above coupling reaction. In particular, $Pd_2(dba)_3$ and $Pd(PPh_3)_4$ are preferable.

When a palladium catalyst is used, the amount thereof is, in view of the yield, generally 0.001 to 1 mol, preferably 0.005 to 0.1 mol, and more preferably 0.01 to 0.05 mol, per mol of Compound (7) used as a raw material.

A phosphorus ligand may be used together with a catalyst. This phosphorus ligand may be selected from the phosphorus ligands used in the coupling reaction. In particular, 2-(dicyclohexylphosphino)-2',4',6'-tri-isopropyl-1,1'-biphenyl (X-Phos), and the like, are preferable.

When a phosphorus ligand is used, the amount thereof is, in view of the yield, generally 0.01 to 1.0 mol, preferably 0.05 to 0.5 mol, and more preferably 0.08 to 0.2 mol, per mol of Compound (7) used as a raw material.

In this reaction, a base may be used as required. The base may be selected from the bases used in the above coupling reaction. Examples of preferable bases include cesium fluoride, cesium carbonate, and potassium phosphate. The amount of the base is generally about 0.1 to 5.0 mol, and preferably 0.5 to 1.0 mol, per mol of Compound (7) used as a raw material.

This reaction is generally performed in the presence of a reaction solvent. The reaction solvent may be selected from the reaction solvents used in the above coupling reaction. In this reaction, tetrahydrofuran, etc., are preferable.

The temperature in the reaction is generally selected from a range of not less than 0° C. and not more than the boiling point of the reaction solvent. The reaction atmosphere is not particularly limited; an inert gas atmosphere, such as an argon gas atmosphere, a nitrogen gas atmosphere, etc., is preferable. It is also possible to adopt an air atmosphere.

Synthesis of Cyclic Compound (3) from Compound (11):

Cyclic Compound (3) is obtained by converting cyclohexane rings of Compound (11) into benzene rings (aromatic rings).

For example, this reaction may be performed by a general oxidation reaction. For example, a method of heating Compound (11) in the presence of acid (acid-treatment), a method of heating the compound in the presence of oxygen (in air atmosphere, oxygen atmosphere, etc.), a reaction with quinones, metallic oxidants, etc., may be adopted. Such processes are generally performed by a dehydrogenation reaction or the like, thereby chemically changing (aromatizing) the cyclohexane rings of Compound (11) into benzene rings to synthesize Cyclic Compound (3). More specifically, such processes eliminate the $OR^1$ in each cyclohexane ring of the cyclic compound before conversion, while advancing the dehydrogenation reaction, thereby yielding Cyclic Compound (3).

When an acid treatment is performed, the manner of the acid treatment is not particularly limited. Preferable examples thereof include the following methods.

(A) A method of dissolving Compound (11) and an acid in a solvent, and reacting the resulting solution by heating.
(B) A method of dissolving Compound (11) in a solvent, mixing the resulting solution with an acid, and reacting the resulting mixture by heating.

In the above reaction, the acid treatment can be performed without a solvent.

The acid is not particularly limited; however, strong acids generally used as catalysts or the like are preferable. Examples thereof include sulfuric acids, methanesulfonic acids, para-toluenesulfonic acids, tungstophosphoric acids, tungstosilicic acids, molybdophosphoric acids, molybdosilicic acids, boron trifluoride etherates, and tin tetrachlorides. They may be used singly, or in a combination of two or more.

The acid amount may be varied depending on the production conditions, etc. In Method (A), the acid amount is preferably 0.01 to 100 mol, more preferably 0.5 to 50 mol, and yet more preferably 1 to 20 mol, per mol of Compound (11).

In Method (B), the acid amount is preferably 0.01 to 100 mol, more preferably 0.5 to 50 mol, and yet more preferably 1 to 20 mol, per mol of Compound (11).

Both nonpolar solvents and polar solvents may be used as solvents for the acid treatment reaction. Examples thereof include alkanes such as hexane, heptane, or octane; haloalkanes such as methylene chloride, chloroform, carbon tetrachloride, or ethylene chloride; benzenes such as benzene, toluene, xylene, mesitylene, or pentamethylbenzene; halobenzenes such as chrolobenzene or bromobenzene; ethers such as diethyl ether or anisole; and dimethylsulfoxides. These solvents may be used singly, or in a combination of two or more.

In the reaction using a solvent, the reaction intermediate between the raw material and Cyclic Compound (3) may have low solubility with respect to the solvent used in this step. In this case, another solvent may be added in advance or during the reaction.

When a solvent is used, the amount thereof is appropriately determined depending on the production conditions. However, it is preferable that the amount of the solvent be 100 to 100000 parts by mass, and more preferably 1000 to 10000 parts by mass, based on 100 parts by mass of Compound (11).

The heating temperature in Methods (A) and (B) above is generally 50° C. or more, preferably 80° C. or more, more preferably 100° C. or more, and yet more preferably 120° C. or more. When a solvent is used, the temperature is selected from a range of not more than the boiling point of the solvent.

The heating is performed by using, for example, an oil bath, an aluminum block constant-temperature bath, a heat gun, a burner, microwave irradiation, etc. In the case of microwave irradiation, it is possible to use a known microwave reaction device for microwave reaction. Reflux cooling may be performed together with the heating process.

Further, the reaction atmosphere is not particularly limited; an inert gas atmosphere, such as an argon gas atmosphere, a nitrogen gas atmosphere, etc., is preferable. It is also possible to adopt an air atmosphere.

After the reaction, a purification step may be performed as necessary. More specifically, general post-treatment steps, such as solvent removal (when a solvent is used), washing, chromatography separation, or the like, may be performed. In particular, because the resulting Cyclic Compound (3) is usually amorphous (non-crystalline), the compound can be crystallized using a hitherto-known recrystallization method. In the resulting crystal, the organic solvent used for the recrystallization may be incorporated in the ring of the molecule.

In the above Reaction Formula, by suitably setting the numbers of m and n, a cyclic compound in which 14 or more bivalent aromatic rings are continuously bonded is obtained. For example, when each of m is 0, and n is 1, a cyclic compound in which 14 bivalent aromatic rings are continuously bonded is obtained. For example, when m is 1 or 0, and n is 1, a cyclic compound in which 15 bivalent aromatic rings are continuously bonded is obtained. For example, when each of m is 1, and n is 1, a cyclic compound in which 16 bivalent aromatic rings are continuously bonded is obtained.

[Chem. 16]

Reaction Formula 3

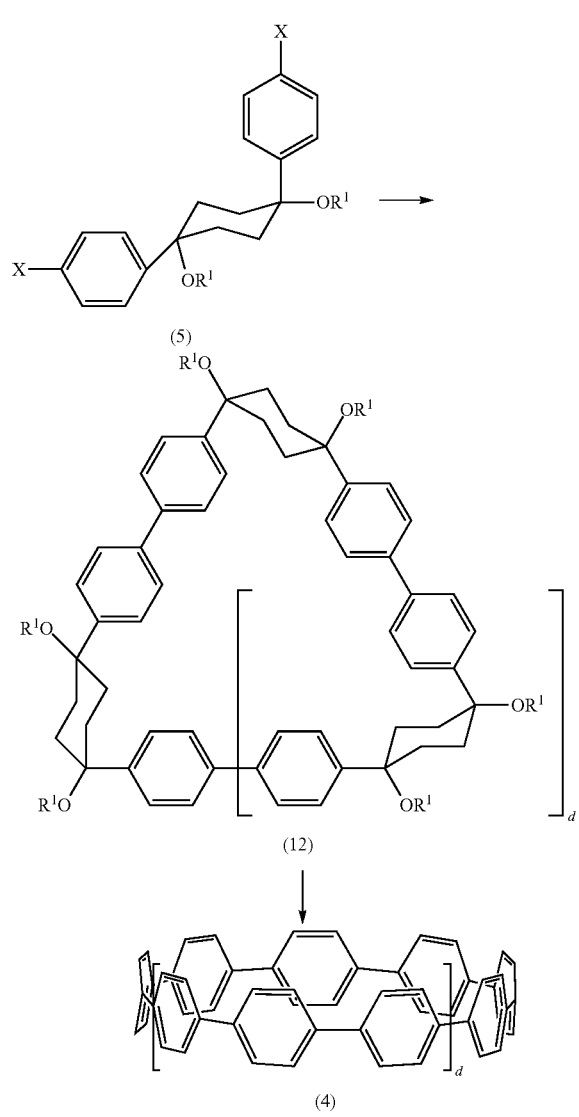

wherein d is an integer of 1 or more; and R¹ and X are as defined above.

Synthesis of Compound (12):

In this reaction, a plurality of Compounds (5) are coupled (homocoupling) to each other to form Cyclic Compound (12). Compound (5) has two halogen atoms. Thus, by using a nickel compound, the carbon atoms attached to these two halogen atoms in the plurality of Compounds (5), i.e., the carbon atoms attached to the halogen atoms in one of Compounds (5) and the carbon atoms attached to the two halogen atoms of the other Compound (5), are coupled. In this manner, a coupling reaction of Compounds (5) is continuously advanced as the carbon atoms therein keep coupling, thereby obtaining Cyclic Compound (12).

In Compound (5), two benzene rings are connected at the 1-position and 4-position of cyclohexane moiety. The benzene rings are respectively at axial and equatorial positions. Accordingly, the compound has an L-shaped structure. By using such an L-shaped compound as Compound (5), Compound (12) having a cyclic structure can be more easily formed.

In this reaction, a nickel compound is generally used. The nickel compound is not particularly limited; however, zerovalent nickel salts or bivalent nickel salts are preferable. They may be used singly, or in a combination of two or more. These complexes designate both a reagent to be added, and a product generated during the reaction.

The zerovalent nickel salts are not particularly limited, and examples thereof include bis(1,5-cyclooctadiene)nickel (0), bis(triphenylphosphine)nickeldicarbonyl, nickelcarbonyl, and the like.

Further, examples of bivalent nickel salts include nickel (II)acetate, nickel(II)trifluoroacetate, nickel(II)nitrate, nickel(II)chloride, nickel(II)bromide, nickel(II)acetylacetonato, nickel(II)perchlorate, nickel(II)citrate, nickel(II)oxalate, nickel cyclohexanebutyrate, nickel(II)benzoate, nickel(II) stearate, nickel(II)stearate, nickel(II)sulfamate, nickel(II) carbonate, nickel(II)thiocyanate, nickel(II)trifluoromethanesulfonate, bis(1,5-cyclo-octadiene)nickel(II), bis(4-diethylamino dithiobenzyl)nickel(II), nickel(II)cyanide, nickel fluoride(II), nickel(II)boride, nickel(II)borate, nickel (II)hypophosphite, ammonium nickel(II)sulfate, nickel(II) hydroxide, nickel(II)cyclopentadienyl, hydrates thereof, and mixtures thereof.

Examples of zerovalent nickel salts and bivalent nickel salts also include compounds with previously coordinated ligands.

The amount of the nickel compound added as a reagent is generally 0.01 to 50 mol, preferably 0.1 to 10 mol, more preferably 0.5 to 5 mol, and particularly preferably 1 to 3 mol, per mol of Compound (5) used as a raw material.

In this reaction, a ligand that can be coordinated to nickel (a nickel atom) may be used as well as the nickel compound. Examples of such ligands include carboxylate-based ligands, amide-based ligands, phosphine-based ligands, oxime-based ligands, sulfonate-based ligands, 1,3-diketone-based ligands, Schiff base ligands, oxazoline-based ligands, diamine-based ligands, carbon monoxide ligands, carbene-based ligands, and the like. They may be used singly, or in a combination of two or more. The coordinating atoms in the ligands are a nitrogen atom, phosphorus atom, and oxygen atom, sulfur atoms, and the like. These ligands include monodentate ligands having a coordinating atom at one site, and multidentate ligands having coordinating atoms at two or more sites. Further, in carbon monoxide ligands and carbene-based ligands, carbon atoms serve as coordinating atoms.

Examples of monodentate ligands include triphenylphosphine, trimethoxyphosphine, triethylphosphine, tri(i-propyl) phosphine, tri(tert-butyl)phosphine, tri(n-butyl)phosphine, tri(isopropoxy)phosphine, tri(cyclopentyl)phosphine, tri(cyclohexyl)phosphine, tri(ortho-toluoyl)phosphine, tri(mesityl)phosphine, tri(phenoxy)phosphine, tri-(2-furyl)phosphine, bis(p-sulfonatophenyl)phenylphosphine potassium, di(tert-butyl)methylphosphine, methyldiphenylphosphine, dimethylphenylphosphine, triethylamine, pyridine, and the like.

Examples of bidentate ligands include 2,2'-bipyridyl, 4,4'-(tert-butyl)bipyridyl, phenanthroline, 2,2'-bipyrimidyl, 1,4-diazabicyclo[2,2,2]octane, 2-(dimethylamino)ethanol, tetramethylethylenediamine, N,N-dimethylethylenediamine, N,N'-dimethylethylenediamine, 2-aminomethylpyridine, or (NE)-N-(pyridine-2-ylmethyliden) aniline, 1,1'-bis (diphenylphosphino)ferrocene, 1,1'-bis(tert-butyl)ferrocene, diphenylphosphino methane, 1,2-bis(diphenylphosphino) ethane, 1,3-bis(diphenylphosphino)propane, 1,5-bis(diphenylphosphino)pentane, 1,2-bis(dipentafluorophenylphosphino)ethane, 1,2-bis(dicyclohexylphosphino)ethane, 1,3-

(dicyclohexylphosphino)propane, 1,2-bis(di-tert-butylphosphino) ethane, 1,3-bis(di-tert-butylphosphino) propane, 1,2-bis(diphenylphosphino)benzene, 1,5-cyclooctadiene, BINAP, BIPHEMP, PROPHOS, DIOP, DEGUPHOS, DIPAMP, DuPHOS, NORPHOS, PNNP, SKEWPHOS, BPPFA, SEGPHOS, CHIRAPHOS, JOSIPHOS, and mixtures thereof. Further, examples of BINAP and BIPHEMP include BINAP derivatives and BIPHEMP derivatives.

When a phosphorus ligand is used, the amount thereof is generally 0.01 to 50 mol, preferably 0.1 to 10 mol, and more preferably 0.5 to 5 mol, per mol of Compound (5) used as a raw material.

The above reaction is generally performed in the presence of a reaction solvent. Examples of reaction solvents include aliphatic hydrocarbons (hexane, cyclohexane, heptane, and the like), aliphatic halogenated hydrocarbons (dichloromethane, chloroform, carbon tetrachloride, dichloroethane, and the like), aromatic hydrocarbons (benzene, toluene, xylene, chlorobenzene, and the like), ethers (diethylether, dibutylether, dimethoxyethane (DME), cyclopentylmethylether (CPME), tert-butylmethylether, tetrahydrofuran, dioxane, and the like), esters (ethyl acetate, ethyl propanoate, and the like), acid amides (dimethylformamide (DMF), dimethylacetamido (DMA), N-methylpyrrolidone (1-methyl-2-pyrrolidone) (NMP), and the like), nitriles (acetonitrile, propionitrile, and the like), and dimethylsulfoxides (DMSO). They may be used singly, or in a combination of two or more.

In the above reaction, the amount of the solvent is generally 1 to 1.000 parts by mass, preferably 5 to 200 parts by mass, and more preferably 10 to 100 parts by mass, per 100 parts by mass of Compound (5).

The temperature in the above reaction is generally selected from a range of not less than 0° C., and not more than the boiling point of the reaction solvent.

Synthesis of Compound (4):

The conversion of Compound (12) into Compound (4) can also be performed in the same manner as in the conversion of Compound (11) into Compound (3) represented by Reaction Formula 2.

In the above reaction formula, when each of d is 1, a cyclic compound in which 9 bivalent aromatic rings are continuously bonded is obtained. In the above reaction formula, when each of d is 2, a cyclic compound in which 12 bivalent aromatic rings are continuously bonded is obtained.

The above methods are capable of producing a cyclic compound in which 9, 12, or 14 bivalent aromatic rings are continuously bonded. In addition, it is possible to synthesize a compound represented by Formula (13):

[Chem. 17]

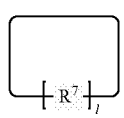

(13)

wherein $R^7$ is the same or different, and each represents a phenylene group or a bivalent condensed polycyclic aromatic hydrocarbon group; l is 10, 11, or 13, as Compound (13).

This method enables production of various cyclic compounds with various numbers of continuously bonded bivalent aromatic rings according to Method 1 and Method 2 below using the following raw materials. This method encompasses the methods according to Reaction Formulas 1 to 3.

Material

In this method, as a raw material, a compound obtained by reacting one or plural kinds of compounds selected from the group consisting of a compound represented by Formula (I):

[Chem. 18]

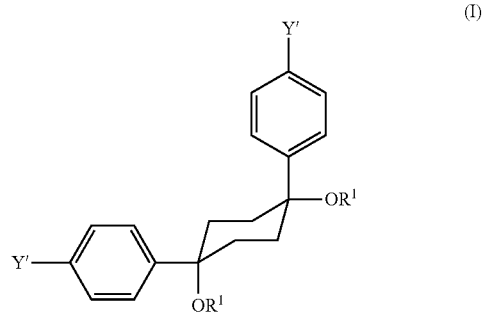

(I)

wherein $R^1$ is as defined above; Y' is the same or different, and each represents halogen atom, or a boronic acid or an ester thereof, and a compound represented by Formula (II):

[Chem. 19]

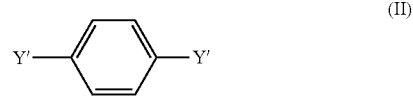

(II)

wherein Y' is as defined above.

More preferably, a cyclic compound is obtained by using various combinations of compounds and reactions that enable production of a cyclic compound, using a compound selected from the group consisting of Compound (5), a compound represented by Formula (Ib):

[Chem. 20]

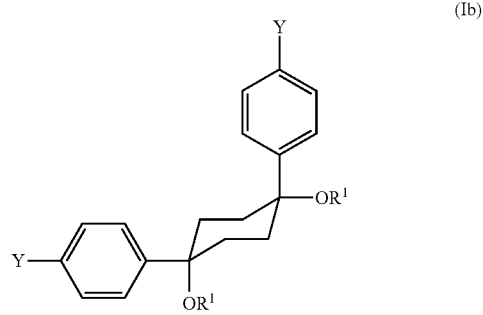

(Ib)

wherein $R^1$ and Y are as defined above, Compound (10), and Compound (6).

As described above, the method using a reaction represented by Reaction Formulas 1 to 3 is an example of this method.

The halogen atom (represented by Y') is not particularly limited. Examples thereof include fluorine atom, chlorine atom, bromine atom, and iodine atom. In the present invention, bromine atom and iodine atom are preferable. Bromine atom is particularly preferable. Further, Y' (when Y' is a halogen atom) may be the same or different.

Boronic acid or esters thereof (represented by Y or Y') are as explained above.

Compound (Ib) is obtained by converting the halogen atom at each end of Compound (5) into a boronic acid or an ester thereof through, for example, a borylation reaction using a boron compound.

Examples of the boron compound are same as those above.

The amount of the boron compound is preferably 1 to 10 mol, more preferably 1.5 to 7 mol, per mol of Compound (5).

This reaction is generally performed in the presence of a catalyst, preferably a palladium catalyst. The palladium catalyst used herein can be selected from the palladium catalysts used in the methods according to Reaction formulas 1 to 3. In this reaction, $Pd_2(dba)_3$, $Pd(PPh_3)_4$, (1,1'-bis(diphenylphosphino)ferrocene)dichloro palladium (II), and the like, are preferable.

When a palladium catalyst is used in this step, in terms of the yield, the amount of the palladium catalyst is generally 0.001 to 1 mol, preferably 0.005 to 0.1 mol, per mol of Compound (5).

Further, as required, it is possible to use, together with the catalyst, a phosphorus ligand that can be coordinated with the palladium atom that is the center element of the palladium catalyst. This phosphorus ligand may be selected from the phosphorus ligands used in the reactions represented by Reaction Formulas 1 to 3. In this reaction, 2-(dicyclohexylphosphino)-2',4',6'-tri-isopropyl-1,1'-biphenyl (X-Phos), and the like, are preferable.

When a phosphorus ligand is used, the amount thereof is, in terms of the yield, generally 0.01 to 1.0 mol, preferably 0.05 to 0.5 mol, per mol of Compound (5).

Further, as required, a base (a reagent for activation of boron species) may be used in addition to the palladium catalyst. Examples of bases include those described in the methods according to Reaction Formulas 1 to 3. Preferable examples include potassium acetate. The amount of the base is generally about 0.1 to 5.0 mol, and preferably 0.5 to 1.0 mol, per mol of Compound (5) used as a raw material.

Further, the reaction is generally performed in the presence of a reaction solvent. The reaction solvent may be selected from the reaction solvents used in the above methods according to Reaction Formulas 1 to 3. In this reaction, dimethyl sulfoxide, etc., are preferable.

The temperature in the reaction is generally selected from a range of not less than 0° C. and not more than the boiling point of the reaction solvent.

Further, the reaction atmosphere is not particularly limited; an inert gas atmosphere, such as an argon gas atmosphere, a nitrogen gas atmosphere, etc., is preferable. It is also possible to adopt an air atmosphere.

When the boron compound has a boronic acid ester group, it is possible to first produce Compound (8) having the boronic acid ester group, and then convert the boronic acid ester group into a boronic acid group through hydrolysis.

Among the compounds used as a material, examples of the compounds obtained by reacting two or more compounds selected from Compound (I) and Compound (II) include a compound represented by Formula (14):

[Chem. 21]

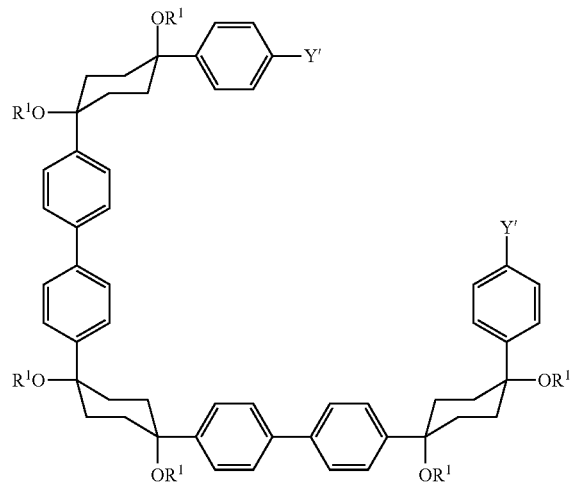

(14)

wherein $R^1$ and Y' are as defined above; a compound represented by Formula (15):

[Chem. 22]

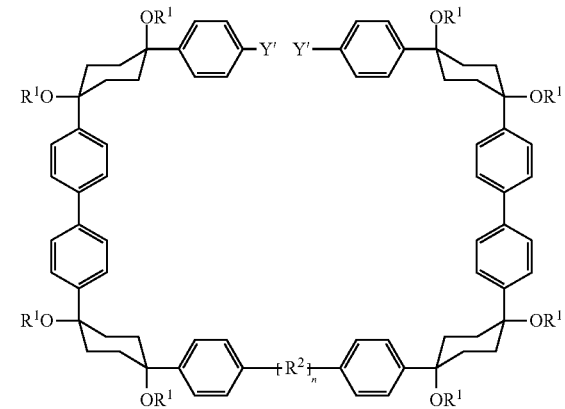

(15)

wherein $R^1$, $R^2$, Y' and n are as defined above; Compound (7a); Compound (8); and a compound represented by Formula (16):

[Chem. 23]

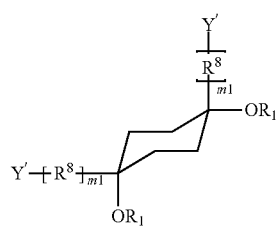

(16)

wherein $R^8$ is the same as $R^2$ or $R^4$; m1 is the same as n or m'; Y' is as defined above.

Compound (14)

Compound (14) can be obtained by, for example, a reaction using Compound (I). More specifically, using Compound (5) and Compound (Ib), Compound (14) can be obtained by reacting the halogen atom at an end of Compound (5) with the boronic acid or an ester thereof at an end of Compound (Ib), thereby obtaining a trimer.

[Chem. 24]

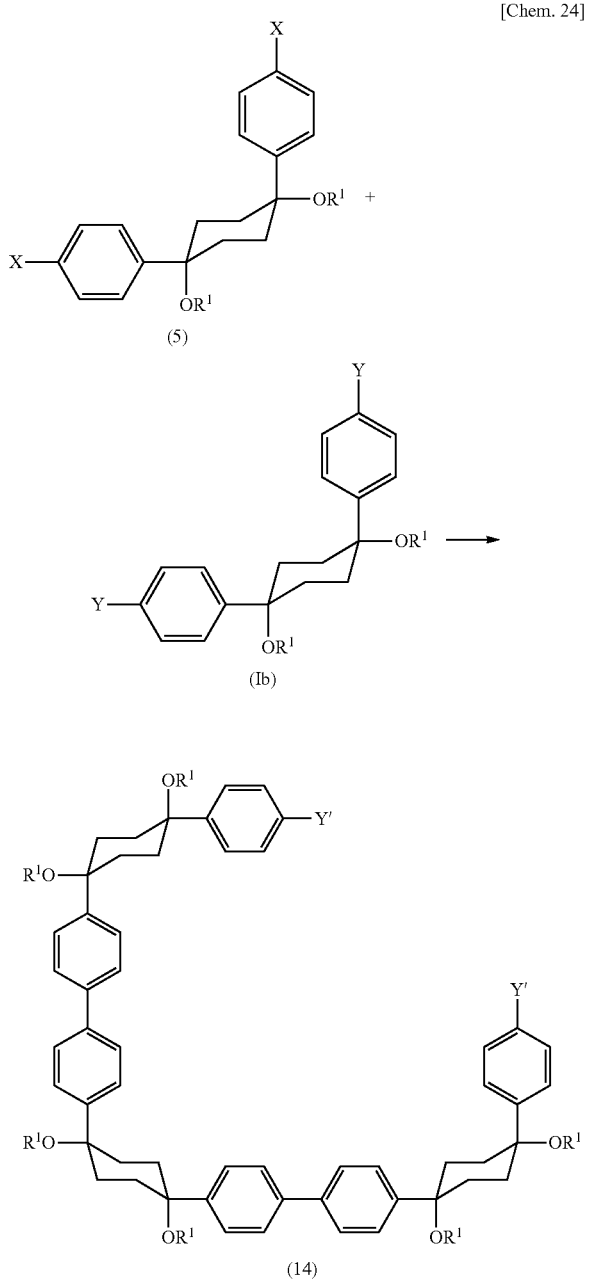

wherein $R^1$, X, Y and Y' are as defined above.

This reaction uses each corner of the cyclohexane ring, thereby producing Compound (14) as a C-shaped chain compound.

The reaction of Compound (5) and Compound (Ib) may be performed by the Suzuki-Miyaura coupling reaction.

The amounts of Compound (5) and Compound (Ib) are preferably adjusted depending on target Compound (14) to be produced.

More specifically, it is preferable to use an excessive amount of Compound (5) when Compound (14) having halogen atoms at the two ends is produced. Specifically, the amount of Compound (Ib) is preferably 0.05 to 0.2 mol, more preferably 0.075 to 0.15 mol, per mol of Compound (5).

Further, it is preferable to use an excessive amount of Compound (Ib) When Compound (14) having boronic acids or esters thereof at the two end is produced. Specifically, the amount of Compound (Ib) is preferably 5 to 20 mol, more preferably 7 to 15 mol, per mol of Compound (5).

This reaction is generally performed in the presence of a catalyst, preferably a palladium catalyst. The palladium catalyst used herein can be selected from the palladium catalysts used in the above reaction represented by Reaction Formulas 1 to 3. In this step, $Pd(PPh_3)_4$, $Pd_2(dba)_3$, and the like, are preferable.

When a palladium catalyst is used in this step, in terms of the yield, the amount of the palladium catalyst is generally 0.001 to 1 mol, preferably 0.005 to 0.5 mol, per mol of one of Compound (Ib) and Compound (5) in a smaller amount.

Further, as required, in addition to the catalyst, it is possible to use a phosphorus ligand that can be coordinated with the palladium atom that is the center element of the palladium catalyst. This phosphorus ligand may be selected from the phosphorus ligands used in the reactions represented by Reaction Formulas 1 to 3. In this reaction, 2-(dicyclohexylphosphino)-2',4',6'-tri-isopropyl-1,1'-biphenyl (X-Phos), and the like, are preferable.

When a phosphorus ligand is used, the amount is, in terms of the yield, generally 0.01 to 1.0 mol, preferably 0.05 to 0.5 mol, per mol of one of Compound (5) and Compound (Ib) in a smaller amount.

Further, as required, a base (a reagent for activation of boron species) may be used in addition to the palladium catalyst. The base may be selected from the bases used in the above reactions represented by Reaction Formulas 1 to 3. Among them, cesium fluoride, cesium carbonate, silver carbonate, potassium phosphate, and the like, are preferable. The amount of the base is generally about 0.1 to 5.0 mol, preferably 0.5 to 4.0 mol, per mol of one of Compound (5) and Compound (Ib) in a smaller amount.

This reaction is generally performed in the presence of a reaction solvent. The reaction solvent may be selected from the reaction solvents used in the above reactions represented by Reaction Formulas 1 to 3. In this reaction, cyclic ethers (such as tetrahydrofuran) are preferable.

The temperature in the reaction is generally selected from a range of not less than 0° C. and not more than the boiling point of the reaction solvent.

Further, the reaction atmosphere is not particularly limited; an inert gas atmosphere, such as an argon gas atmosphere, a nitrogen gas atmosphere, etc., is preferable. It is also possible to adopt an air atmosphere.

Compound (15)

Compound (15) is obtained by reacting the halogen atom at an end of Compound (7a) with the boronic acid or an ester thereof at an end of Compound (Ib), after Compound (7a) is obtained according to Reaction Formula (1).

[Chem. 25]

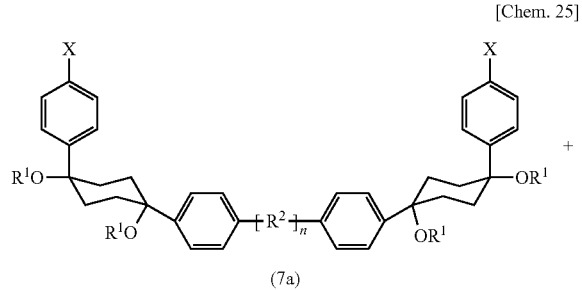

(7a)

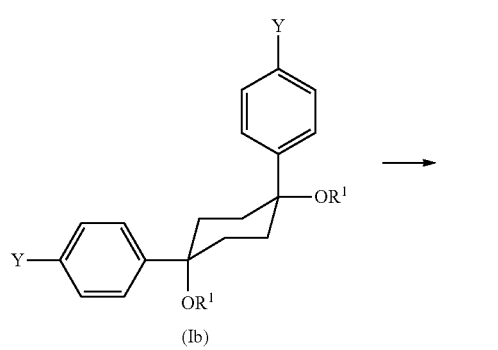

(Ib)

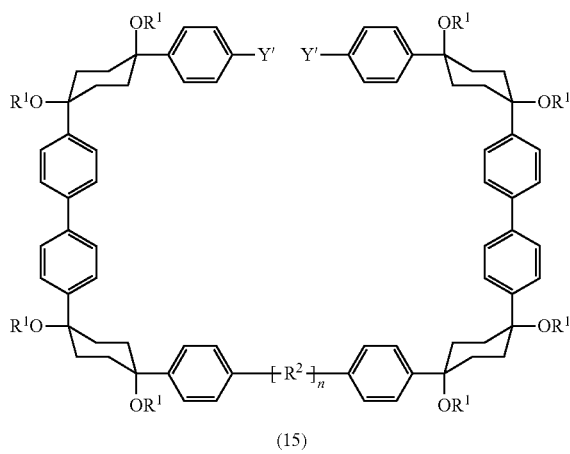

(15)

wherein $R^1$, $R^2$, X, Y, Y' and n are as defined above.

Compound (15) may also be obtained by reacting the boronic acid or an ester thereof at an end of Compound (8) with the halogen atom at an end of Compound (5).

[Chem. 26]

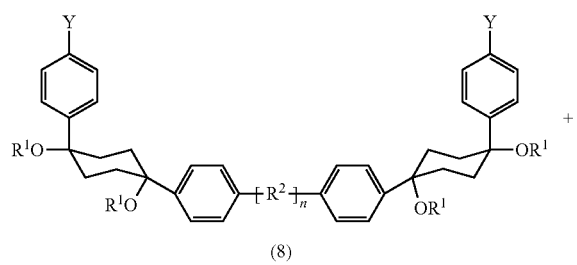

(8)

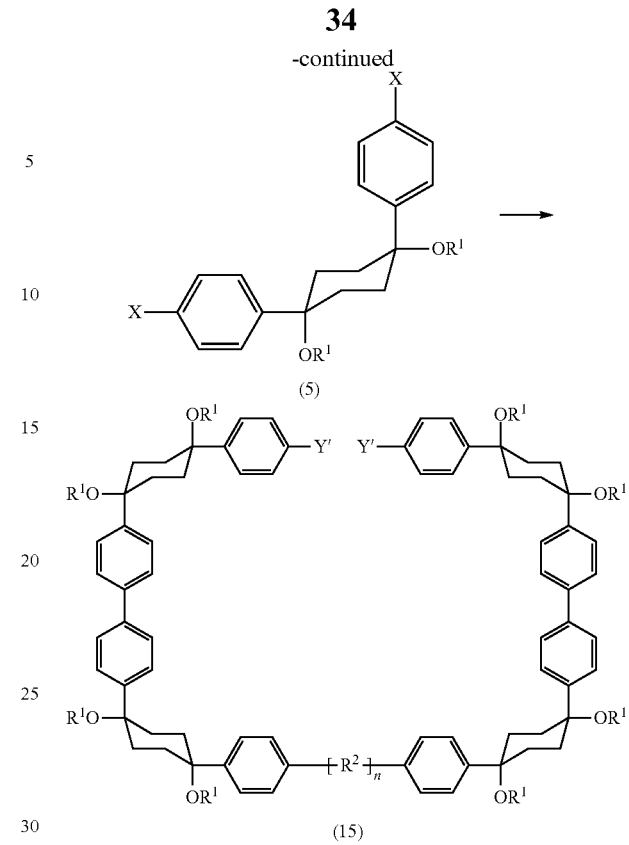

wherein $R^1$, $R^2$, X, Y, Y' and n are as defined above.

This reaction uses each corner of the cyclohexane ring, thereby producing Compound (15) as a C-shaped chain compound.

The above reaction is preferably performed by the Suzuki-Miyaura coupling reaction.

It is preferable to use an excessive amount of Compound (Ib) or Compound (5). More specifically, the amount of Compound (Ib) is preferably 5 to 20 mol, more preferably 7 to 15 mol, per mol of Compound (7a). Further, the amount of Compound (5) is preferably 5 to 20 mol, more preferably 7 to 15 mol, per mol of Compound (8).

In this reaction, a palladium catalyst is generally used. The palladium catalyst used herein can be selected from the palladium catalysts used in the above reactions represented by Reaction Formulas 1 to 3. In particular, Pd(PPh$_3$)$_4$, and the like, are preferable.

In terms of the yield, the amount of the palladium catalyst is generally 0.001 to 1 mol, preferably 0.005 to 0.5 mol, per mol of Compound (7a) or Compound (8).

Further, as required, it is possible to use a phosphorus ligand that can be coordinated with the palladium atom that is the center element of the palladium catalyst. This phosphorus ligand may be selected from the phosphorus ligands used in the reactions represented by Reaction Formulas 1 to 3. Among them, 2-(dicyclohexylphosphino)-2',4',6'-tri-isopropyl-1,1'-biphenyl (X-Phos), and the like, are preferable.

When a phosphorus ligand is used, the amount thereof is, in terms of the yield, generally 0.001 to 1.0 mol, preferably 0.01 to 0.8 mol, per mol of Compound (7a) or Compound (8).

In addition to the palladium catalyst, a base (a reagent for activation of boron species) may be used. The base may be selected from the bases used in the above reactions represented by Reaction Formulas 1 to 3. Sodium carbonate, silver carbonate, and the like, are preferable. The amount of the base (the activation reagent) is generally about 0.01 to 10 mol, and preferably 0.1 to 5.0 mol, per mol of Compound (7a) or Compound (8).

The reaction is generally performed in the presence of a reaction solvent. The reaction solvent may be selected from the reaction solvents used in the above reactions represented by Reaction Formulas 1 to 3. Among them, in this reaction, aromatic hydrocarbons (toluene, etc.) are preferable. The system may contain water.

The temperature in the reaction is generally selected from a range of not less than 0° C. and not more than the boiling point of the reaction solvent.

Further, the reaction atmosphere is not particularly limited; an inert gas atmosphere, such as an argon gas atmosphere, a nitrogen gas atmosphere, etc., is preferable. It is also possible to adopt an air atmosphere.

Compound (16)

Compound (16) can be obtained, for example, a reaction using Compound (I) and Compound (II). More specifically, Compound (16) can be obtained by reacting the halogen atom at an end of Compound (5) or Compound (10) with the boronic acid or an ester thereof at an end of Compound (6) or Compound (Ib).

The amount of the palladium catalyst is, in terms of the yield, generally 0.0001 to 0.5 mol, preferably 0.0005 to 0.2 mol, per mol of Compound (5) or Compound (Ib).

Further, as required, it is possible to use a phosphorus ligand that can be coordinated with the palladium atom that is the center element of the palladium catalyst. This phosphorus ligand may be selected from the phosphorus ligands used in the reactions represented by Reaction Formulas 1 to 3. Among them, 2-(dicyclohexylphosphino)-2',4',6'-tri-isopropyl-1,1'-biphenyl (X-Phos), and the like, are preferable.

When a phosphorus ligand is used, the amount is, in terms of the yield, generally 0.001 to 1.0 mol, preferably 0.01 to 0.8 mol, per mol of Compound (5) or Compound (Ib).

In addition to the palladium catalyst, a base (a reagent for activation of boron species) may be used. The base may be selected from the bases used in the above reactions represented by Reaction Formulas 1 to 3. Silver carbonate, and the like, are preferable. The amount of the base (the activation reagent) is generally about 0.01 to 10 mol, and

[Chem. 27]

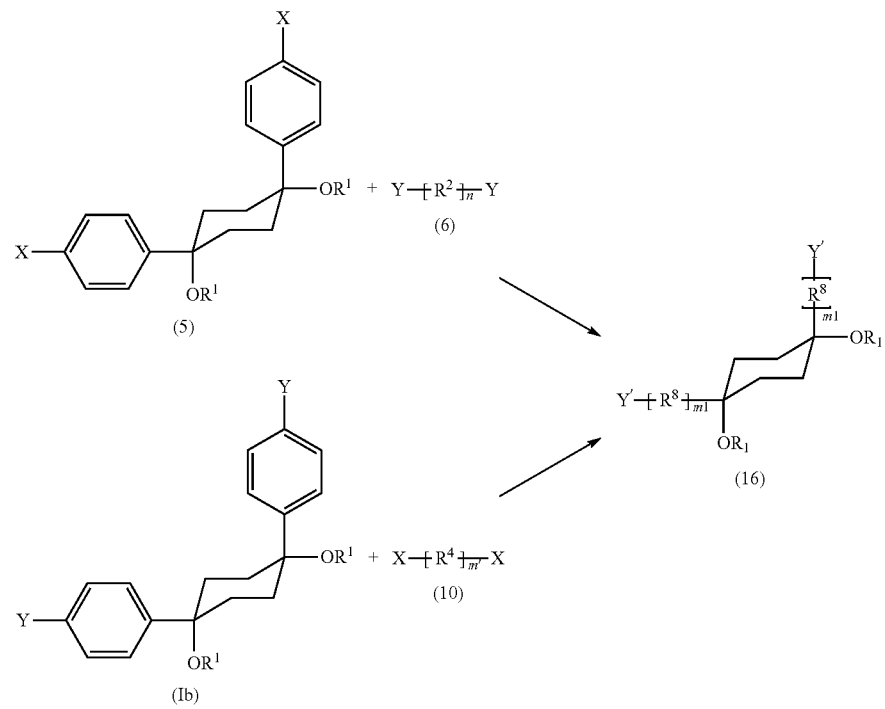

wherein $R^1$, $R^2$, $R^4$, $R^8$, X, Y, Y', n, m' and m1 are as defined above.

This reaction uses each corner of the cyclohexane ring, thereby producing Compound (16) as an L-shaped chain compound.

The above reaction is preferably performed by the Suzuki-Miyaura coupling reaction.

It is preferable to use an excessive amount of Compound (6) or Compound (10). More specifically, the amount of Compound (6) is preferably 5 to 20 mol, more preferably 7 to 15 mol, per mol of Compound (5). Further, the amount of Compound (10) is preferably 5 to 20 mol, more preferably 7 to 15 mol, per mol of Compound (Ib).

In this reaction, a palladium catalyst is generally used. The palladium catalyst used herein can be selected from the palladium catalysts used in the above reactions represented by Reaction Formulas 1 to 3. Among them, Pd(PPh$_3$)$_4$, and the like, are preferable.

preferably 0.1 to 5.0 mol, per mol of Compound (5) or Compound (Ib) used as a raw material.

This reaction is generally performed in the presence of a reaction solvent. The reaction solvent may be selected from the reaction solvents used in the above reactions represented by Reaction Formulas 1 to 3. Among them, in the present invention, cyclic ethers (such as tetrahydrofuran) are preferable.

The temperature in the reaction is generally selected from a range of not less than 0° C. and not more than the boiling point of the reaction solvent.

Further, the reaction atmosphere is not particularly limited; an inert gas atmosphere, such as an argon gas atmosphere, a nitrogen gas atmosphere, etc., is preferable. It is also possible to adopt an air atmosphere.

Method 1

The method for producing the cyclic compounds having continuously bonded 9 to 13 (in particular, 9, 11 or 13) aromatic rings includes, for example, a step of reacting the terminal atoms (in particular, halogen atoms) of the chain compounds represented by Formula (III): X—R⁹—X (wherein R⁹ is a bivalent group having 3 to 4 structural units represented by Formula (17):

[Chem. 28]

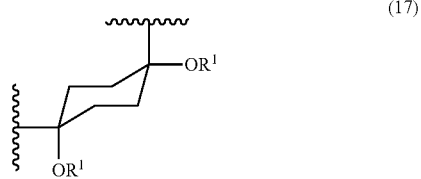

(17)

wherein $R^1$ is as defined above, and 6 or more (in particular, 6 to 9) phenylene groups or bivalent condensed polycyclic aromatic hydrocarbon groups; X is as defined above) by intramolecular ring closure reaction, thereby obtaining a cyclic compound.

In this step, a cyclic compound is obtained by subjecting Compound (III) to intramolecular ring closure reaction. Compound (III) is obtained by reacting the above raw materials.

Among the above-described compounds, Compound (III) corresponds to Compound (14) and Compound (15) having halogen atoms at the two ends. Therefore, other compounds of Compound (III) may also be obtained by the same method as the method for producing Compound (14) and Compound (15) having halogen atoms at the two ends.

In this reaction, the terminal atoms of Compound (III) are coupled, thereby forming a cyclic compound. Compound (III) has two halogen atoms. By using a nickel compound, these two halogen atoms are coupled, thus causing an intramolecular ring closure reaction.

In this step, the number of rings in the resulting cyclic compound (in particular, carbon nanoring) directly derives from the number of rings in Compound (III). Accordingly, by appropriately selecting Compound (III), it is possible to arbitrarily design the number of continuously bonded aromatic rings, thereby efficiently producing a cyclic compound in which a desired number of aromatic rings are continuously bonded with a short production process.

A nickel compound is used in the intramolecular ring closure reaction. The nickel compound used herein may be selected from the nickel compounds used in the above reaction represented by Reaction Formula 3.

The amount of the nickel compound depends on the raw material to be used; the amount of the nickel compound to be supplied as a reagent is generally 0.01 to 50 mol, preferably 0.1 to 10 mol, per mol of Compound (III) used as a raw material.

Together with the nickel compound, it is possible to use a ligand that can be coordinated with nickel (nickel atom). This ligand may be selected from the ligands used in the reaction represented by Reaction Formula 3.

When a ligand is used, the amount is generally 0.01 to 50 mol, preferably 0.1 to 10 mol, per mol of Compound (III).

This reaction is generally performed in the presence of a reaction solvent. The reaction solvent may be selected from the reaction solvents used in the above reaction represented by Reaction Formula 3. Among them, in the present invention, cyclic ethers (such as tetrahydrofuran) are preferable.

When a reaction solvent is used, the concentration of the raw material is preferably adjusted; however, it is preferable to avoid an excessively high concentration. Specifically, the concentration of Compound (III) is preferably 0.1 to 5 mmol/L, more preferably 0.2 to 3 mol/L.

The temperature in the reaction is generally selected from a range of not less than 0° C. and not more than the boiling point of the reaction solvent.

Further, the reaction atmosphere is not particularly limited; an inert gas atmosphere, such as an argon gas atmosphere, a nitrogen gas atmosphere, etc., is preferable. It is also possible to adopt an air atmosphere.

Through this method, a cyclic compound is obtained. When Compound (14) having halogen atoms at the two ends is used as a raw material, a compound represented by Formula (12b):

[Chem. 29]

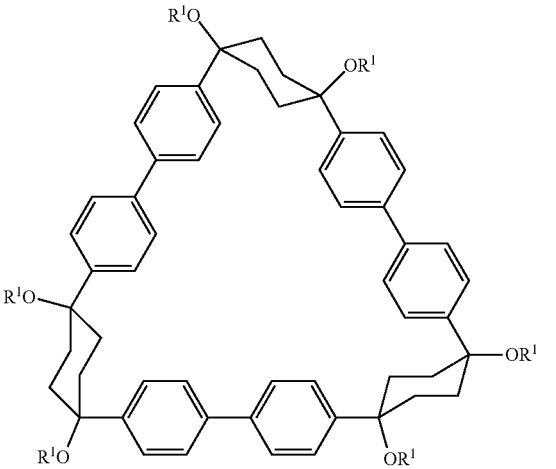

(12b)

wherein $R^1$ is as defined above is obtained.

Further, when Compound (15) with the ends having halogen atoms wherein $R^2$ is a 1,4-phenylene group; and n is 1 is used, a compound represented by Formula (18):

[Chem. 30]

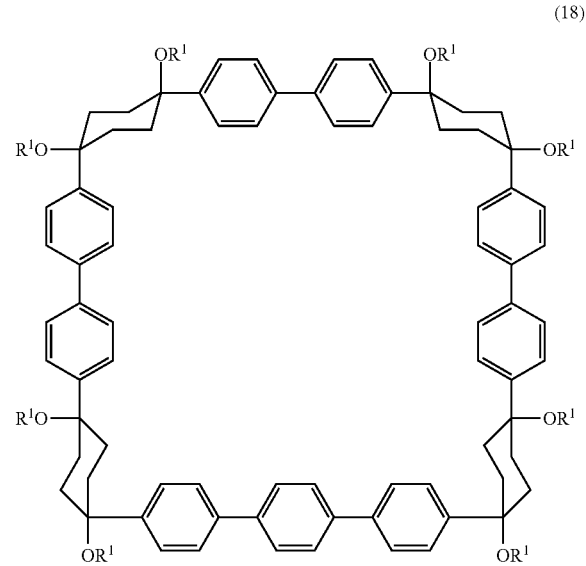

(18)

wherein $R^1$ is as defined above is obtained.

Further, by the same method, a compound represented by Formula (19):

[Chem. 31]

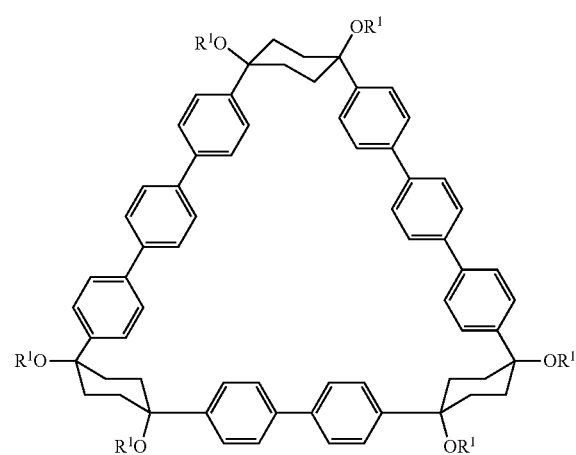

(19)

wherein $R^1$ is as defined above is obtained.

Method 2

The method for producing the cyclic compounds having continuously bonded 10 to 13 (in particular, 10) aromatic rings includes a step of reacting a compound represented by Formula (IV-1): Y'—$R^{10a}$—Y' (wherein $R^{10a}$ is a bivalent group having 3 structural units represented by Formula (17) and 6 or more (in particular, 6 to 9) phenylene groups or bivalent condensed polycyclic aromatic hydrocarbon groups; Y' is as defined above) with a compound represented by Formula (IV-2): Y'—$R^{10b}$—Y' (wherein $R^{10b}$ is a bivalent group having at least one (in particular, 1 to 4) phenylene group or a bivalent condensed polycyclic aromatic hydrocarbon group; Y' is as defined above), thereby producing a cyclic compound; or a step of reacting a compound represented by Formula (V-1): Y'—$R^{11a}$—Y' (wherein $R^{11a}$ is a bivalent group having 2 structural units represented by Formula (17) and 4 or more (in particular 4 to 8) phenylene groups or bivalent condensed polycyclic aromatic hydrocarbon groups; Y' is as defined above), with a compound represented by Formula (V-2): Y'—$R^{11b}$—Y' (wherein $R^{11b}$ is a bivalent group having 1 structural unit represented by Formula (17), and two or more (in particular, 2 to 6) phenylene groups or bivalent condensed polycyclic aromatic hydrocarbon groups; Y' is as defined above), thereby producing a cyclic compound.

More specifically, a cyclic compound is obtained by reacting Compound (IV-1) with Compound (IV-2), or reacting Compound (V-1) with Compound (V-2).

Compound (IV-1) encompasses Compound (14), and Compound (IV-2) encompasses Compound (II), Compound (6), Compound (10), etc.

Accordingly, a cyclic compound is obtained by a reaction of Compound (IV-1) and Compound (IV-2), more specifically, the following reaction:

[Chem. 32]

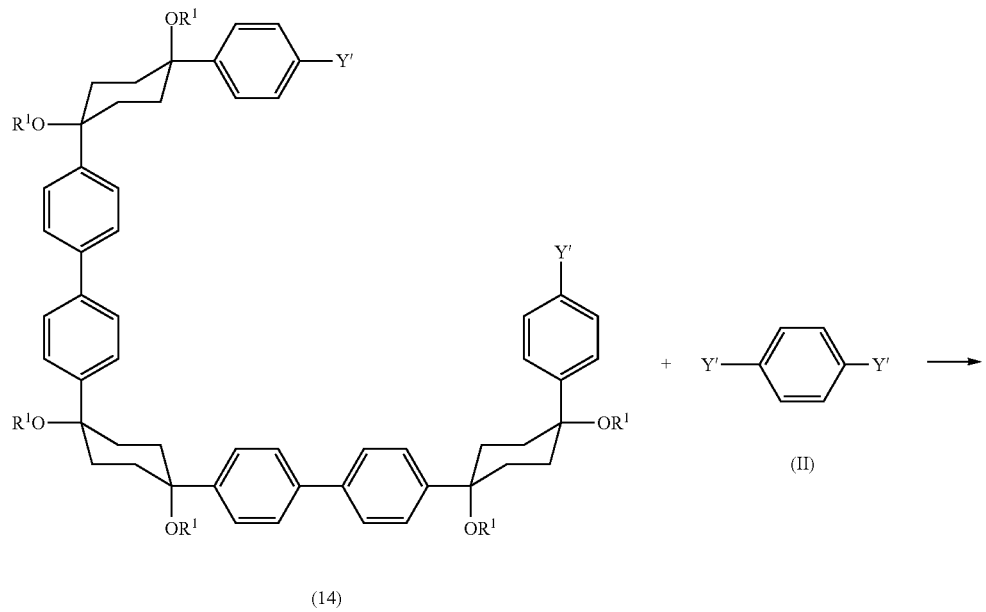

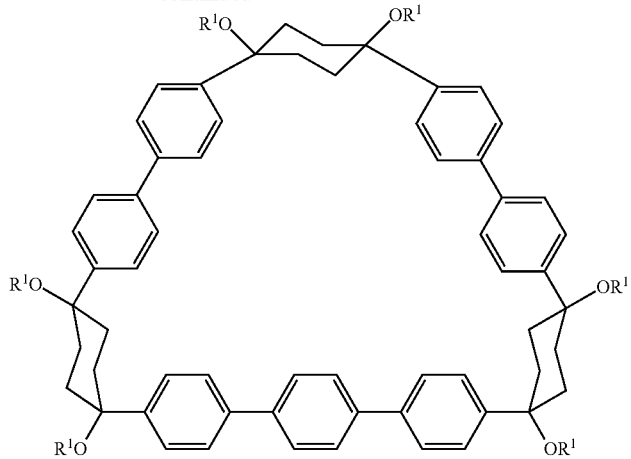

(20a)

wherein $R^1$ and $Y'$ are as defined above.

Compound (V-1) encompasses Compound (8), and Compound (V-2) encompasses Compound (I), Compound (Ib), Compound (5), Compound (16), etc.

Accordingly, a cyclic compound is obtained by a reaction of Compound (V-1) and Compound (V-2), more specifically, the following reaction:

[Chem. 33]

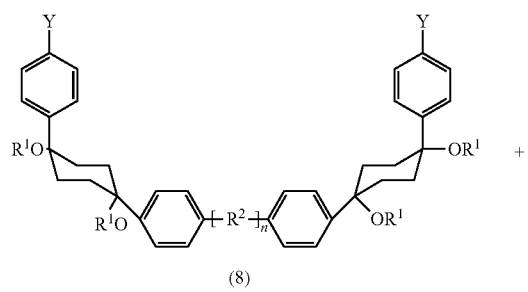

(8)

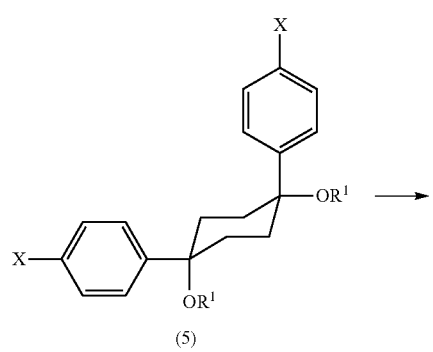

(5)

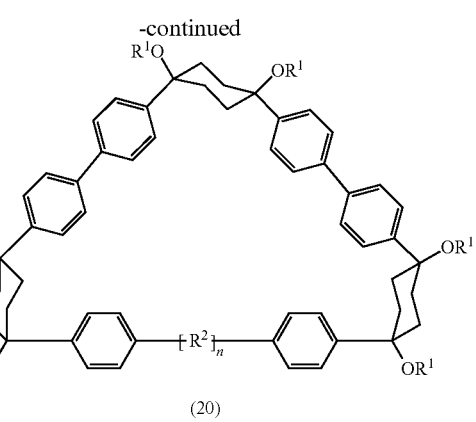

(20)

wherein $R^1$, $R^2$, X, Y and n are as defined above.

As such, it is possible to adopt even a combination that presumably produces a cyclic compound having an irregular shape evidently incapable of forming a substantial rectangle or a substantial triangle using the angles of the cyclohexane ring. Therefore, it is possible to synthesize cyclic compounds having various numbers of rings.

The reaction is not limited to the above reaction, and various combinations of Compound (IV-1) and Compound (IV-2), and combinations of Compound (V-1) and Compound (V-2) can be adopted.

The above reaction is preferably performed by the Suzuki-Miyaura coupling reaction. More specifically, it is preferable that one of Compound (IV-1) and Compound (IV-2) has halogen atoms at the two ends, while the other has boronic acids or esters thereof at the two ends. Further, it is preferable that one of Compound (V-1) and Compound (V-2) has halogen atoms at the two ends, while the other has boronic acids or esters thereof at the two ends.

The amount of Compound (IV-2) is preferably 0.01 to 5.0 mol, more preferably 0.05 to 3.0 mol, per mol of Compound (IV-1). The amount of Compound (V-2) is preferably 0.01 to 5.0 mol, more preferably 0.05 to 3.0 mol, per mol of Compound (V-1).

In this reaction, a palladium catalyst is generally used. The palladium catalyst used herein can be selected from the palladium catalysts used in the above reactions represented by Reaction Formulas 1 to 3. Among them, Pd(OAc)$_2$ (Ac is an acetyl group), bis(dibenzylideneacetone)palladium (0), bis(tri-t-butyl phosphino)palladium (0), and the like, are preferable.

The amount of the palladium catalyst is, in terms of the yield, generally 0.0001 to 1.0 mol, preferably 0.0005 to 0.5 mol, per mol of Compound (IV-1) or Compound (V-1).

Further, as required, it is possible to use a phosphorus ligand that can be coordinated with the palladium atom that is the center element of the palladium catalyst. This phosphorus ligand may be selected from the phosphorus ligands used in the reactions represented by Reaction Formulas 1 to 3. Among them, 2-(dicyclohexylphosphino)-2',4',6'-tri-isopropyl-1,1'-biphenyl (X-Phos), and the like, are preferable.

When a phosphorus ligand is used, the amount is, in terms of the yield, generally 0.001 to 1.0 mol, preferably 0.01 to 0.8 mol, per mol of Compound (IV-1) or Compound (V-1).

In addition to the palladium catalyst, a base (a reagent for activation of boron species) may be used. The base may be selected from the bases used in the above reactions represented by Reaction Formulas 1 to 3. Sodium hydroxide, potassium phosphate, and the like, are preferable. The amount of the base (the activation reagent) is generally about 0.01 to 10 mol, preferably 0.1 to 5.0 mol, per mol of Compound (IV-1) or Compound (V-1) used as a raw material.

This reaction is generally performed in the presence of a reaction solvent. The reaction solvent may be selected from the reaction solvents in the above reactions represented by Reaction Formulas 1 to 3. Among them, in the present invention, cyclic ethers (such as dioxane) are preferable. The system may contain water.

When a reaction solvent is used, the concentration of the raw material is preferably adjusted; however, it is preferable to avoid an excessively high concentration. For example, in the reaction of Compound (14) and Compound (II), the concentration of Compound (14) is preferably 0.1 to 5 mmol/L, more preferably 0.2 to 3 mol/L. Further, in the reaction of Compound (8) and Compound (5), the concentration of Compound (8) is preferably 0.1 to 5 mmol/L, more preferably 0.2 to 3 mol/L.

The temperature in the reaction is generally selected from a range of not less than 0° C. and not more than the boiling point of the reaction solvent.

Further, the reaction atmosphere is not particularly limited; an inert gas atmosphere, such as an argon gas atmosphere, a nitrogen gas atmosphere, etc., is preferable. It is also possible to adopt an air atmosphere.

The cyclic compound thus obtained has 3 to 4 structural units represented by Formula (17):

[Chem. 34]

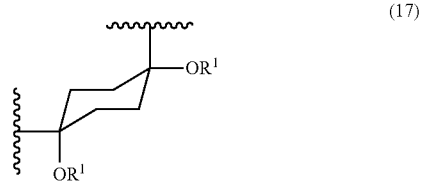

(17)

wherein R$^1$ is as defined above, and 6 to 9 phenylene groups or bivalent condensed polycyclic aromatic hydrocarbon groups. Further, in the cyclic compound, the total number of structural units represented by Formula (17) and the phenylene groups or bivalent condensed polycyclic aromatic hydrocarbon groups is 10, 11, or 13.

Conversion of Cyclohexane Ring into Benzene

After the cyclic compound is obtained in the above manner, cyclohexane rings are converted into benzene rings to obtain a cyclic compound.

The conversion can be performed in the same manner as in the method represented by Reaction Formula 2 for converting Compound (11) into Compound (3).

By converting the cyclohexane rings of a cyclic compound having 10, 11, or 13 rings into benzene rings, it is possible to obtain a cyclic compound in which 10, 11, or 13 aromatic rings are continuously bonded.

EXAMPLES

Hereinafter, the present invention is described in further detail with reference to Examples. However, the scope of the invention is not limited to these Examples.

Thin-layer chromatography (TLC) was performed using E. Merck silica gel 60 F254 precoated plates (0.25 mm). The developed chromatogram was analyzed by UV lamp (254 nm). Flash column chromatography (FCC) was performed using E. Merck silica gel 60 F254 (230-400 mesh). Preparative thin-layer chromatography (PTLC) was performed using Wakogel B5-F silica coated plates (0.75 mm). Recycling preparative gel permeation chromatography (GPC) was performed with JAI LC-9204 (preparative column: JAIGEL-1H/JAIGEL-2H, chloroform). Mass spectra were recorded on a Waters Micromass LCT Premier (electrospray ionization time-of-flight mass spectrometry, ESI-TOFMS), JEOL JMS700 (Fast atom bombardment mass spectroscopy, FAB-MS), and Bruker Daltonics Ulitraflex III TOF/TOF (MALDI-TOF-MS). Elemental analyses were performed with Yanako MT-6. Melting points were measured on a MPA100 OptiMelt automated melting point system. Nuclear magnetic resonance (NMR) spectra were recorded on a JEOL GSX-270 spectrometer ($^1$H 270 MHz, $^{13}$C 67.5 MHz), a JEOL JNM-ECS400 spectrometer ($^1$H 400 MHz, $^{13}$C 100 MHz), and a JEOL JNM-ECA-600 spectrometer ($^1$H 600 MHz, $^{13}$C 150 MHz), in CDCl$_3$ or DMSO-d6. Chemical shifts for $^1$H NMR are expressed in ppm relative to tetramethylsilane (δ 0.00 ppm), CHCl$_3$ (δ 7.26 ppm), or CDCl$_2$ (δ 5.32 ppm). Chemical shifts for $^{13}$C NMR are expressed in ppm relative to CDCl$_3$ (δ 77.0 ppm).

Synthesis Example 1

Production of Compound (5a)

To a 1-L round-bottom flask were added lithium chloride (1.68 g, 33 mmol) and cerium(III)trichloride heptahydrate (14.4 g, 0.33 mol). This flask was immersed in an oil bath, and heated at 90° C. for 2 hours under vacuum to dry. The obtained reactant mixture was crushed into a powder, and the powdered reactant mixture was returned to the flask. The flask was immersed again in an oil bath, and heated at 90° C. for 1 hour under vacuum. A stirring bar was added to the flask, and the flask was immersed again in an oil bath and heated at 150° C. for 3 hours under vacuum while stirring. While the content in the flask was still hot, argon gas was introduced into the flask. Dry tetrahydrofuran (THF) (200 mL) was added thereto, and the mixture was suspended. The resulting suspension was stirred at room temperature (i.e., about 23° C., the same applies hereinafter) for about 8 hours. A solution of cyclohexane-1,4-dione (1.68 g, 15 mmol) in THF (15 mL) was added to the suspension via cannula. The mixture was stirred at room temperature for 2 hours and cooled to −78° C., thereby obtaining Suspension A.

To another 1-L round-bottom flask were added 1,4-dibromobenzene (10.7 g, 45 mmol) and dry THF (90 mL). A solution of n-butyllithium in hexane (29.5 mL, 1.57 M, 45 mmol) was gradually added thereto dropwise at −78° C. (addition rate: 4.5 cm$^3$/min). After completion of dropwise addition, the mixture was stirred at −78° C. for 30 minutes, and the resulting solution was added to Suspension A obtained above via a cannula, thereby obtaining a mixture.

The mixture was stirred at −78° C. for 1 hour, followed by stirring at room temperature for 2 hours. A saturated NH$_4$Cl aqueous solution (50 mL) was then added to the mixture to stop the reaction. The resulting product was passed through Celite, and the filtrate was concentrated with an evaporator. Then, ethyl acetate was added to the residue (concentrate) to extract a crude product, which was dried over anhydrous NazSO$_4$, thereby obtaining an ethyl acetate solution. The solution was concentrated with an evaporator, and the residue (concentrate) was recrystallized from chloroform to yield a white solid (5.32 g). This white solid was identified by nuclear magnetic resonance ($^1$H NMR, $^{13}$C NMR) analysis and mass spectrometry as a compound represented by the following Formula (5a):

[Chem. 35]

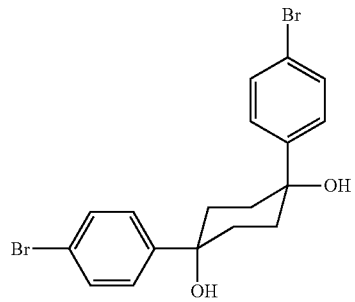

(5a)

The yield of this compound was 83%.

$^1$H NMR (270 MHz, CDCl$_3$) δ 1.71 (s, 2H), d 2.07 (s, 8H), 7.34 (d, J=8.6 Hz, 4H), 7.47 (d, J=8.6 Hz, 4H); $^{13}$C NMR (67.5 MHz, CDCl$_3$) δ 33.2 (CH$_2$), 72.3 (4°), 121.5 (4°), 127.2 (CH), 131.6 (CH), 144.6 (4°); HRMS (FAB, negative) m/z calcd for C$_{18}$H$_{17}$Br$_2$O$_2$ [M−H]$^-$: 422.9595, found 422.9576; mp: 177.7-178.7° C.

Synthesis Example 2

Introduction of MOM Protecting Group to Hydroxyl Group of Compound (5a)

To a 200-mL round-bottom flask containing a stirring bar were added Compound (5a) (4.69 g, 11 mol) obtained in Synthesis Example 1, dry dichloromethane (CH$_2$Cl$_2$) (44 mL), and diisopropylethylamine (7.7 mL, 44 mmol), and the flask was immersed in an ice bath. The mixture in the flask was stirred at 0° C. for 30 minutes, and methoxymethyl chloride (3.5 mL, 46 mmol) was further added thereto. After the mixture was reacted at room temperature for 18 hours while stirring, a saturated NH$_4$Cl aqueous solution (20 mL) was added thereto to stop the reaction. The resulting product was extracted with CH$_2$Cl$_2$ (20 mL×3), and the organic phase from the extraction was dried over anhydrous Na$_2$SO$_4$, thereby obtaining a solution. The solution was concentrated with an evaporator, and the residue (concentrate) was purified by silica gel chromatography (CH$_2$Cl$_2$) to yield a colorless solid (5.48 g). This colorless solid was identified by nuclear magnetic resonance ($^1$H NMR, $^{13}$C NMR) analysis and mass spectrometry as a compound represented by the following Formula (5b):

[Chem. 36]

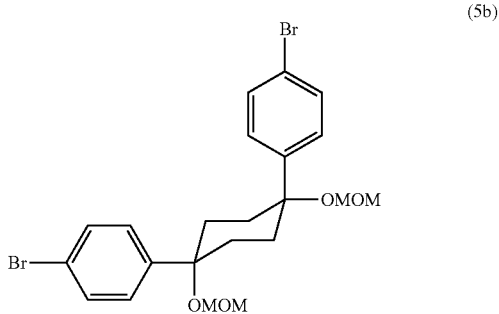

(5b)

The yield of this compound was 97%.

$^1$H NMR (270 MHz, CDCl$_3$) δ 1.71 (s, 2H), 2.07 (s, 8H), 7.34 (d, J=9 Hz, 4H), 7.47 (d, J=9 Hz, 4H); $^{13}$C NMR (150 MHz, CDCl$_3$) δ 33.0 (CH$_2$), 56.2 (CH$_3$), 77.9 (4°), 92.3 (CH$_2$), 1.2-1.8 (4°), 128.7 (CH), 131.6 (CH), 141.6 (br, 4°); HRMS (FAB) m/z calcd for C$_{22}$H$_{26}$Br$_2$O$_4$Na [M$^+$Na]$^+$: 535.0096, found 535.0103. mp: 107.1-108.9° C.

Synthesis Example 3

Production of Compound (6a) (1,4-benzenediboronic acid neopentyl glycol ester)

To a 50-mL round-bottom flask containing a stirring bar were added p-phenylenebisboronic acid (1,4-benzenediyl-bisboranic acid) (125 mg, 0.75 mmol, 1 eq), neopentyl glycol (250 mg, 2.4 mmol, 3 eq), p-toluenesulfonate (50 mg), and dry benzene (10 mL). The mixture was then reacted under reflux at 70° C. for 12 hours. After the mixture (reaction product) in the flask was cooled to room temperature, the mixture was extracted with CH$_2$Cl$_2$ to obtain a desired product. The organic phase from the extraction was washed with a saturated NaHCO$_3$ aqueous solution, and the solvent was distilled off under reduced pressure to obtain a product (226.9 mg). This product was identified by nuclear magnetic resonance ($^1$H NMR) analysis and mass spectrometry as a compound represented by the following Formula (6a):

[Chem. 37]

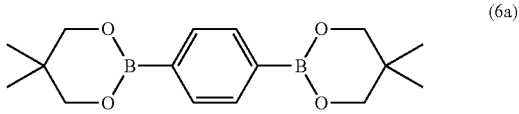

(6a)

The yield of this compound was 99%.

$^1$H NMR (270 MHz, CDCl$_3$) δ 1.02 (s, 12H), 3.77 (s, 8H), 7.78 (s, 4H); LRMS (EI) m/z calcd for C$_{16}$H$_{24}$Br$_2$O$_4$ [M]$^+$: 302.1861, found 302.

Synthesis Example 4

Production of Compound (6b)
(4,4'-biphenyldiboronic acid neopentyl glycol ester)

As in Synthesis Example 3, Compound (6b) below was obtained by using appropriate starting compounds.

[Chem. 38]

(6b)

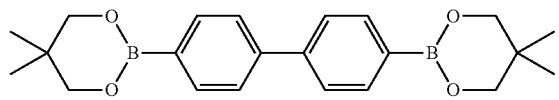

This compound is commercially available.

Synthesis Example 5

Production of Compound (6c) having Boronic Acid or Ester Thereof

To a 20-mL round-bottom flask containing a stirring bar were added 2,6-dibromonaphthalene (115.4 mg, 0.40 mmol), bis(neopentyl glycol)diboron (273.3 mg, 1.2 mmol), (1,1'-bis(diphenylphosphino)ferrocene)dichloropalladium (II) (10.3 mg, 13 μmol), and potassium acetate (KOAc) (244.8 mg; 2.5 mmol); and argon gas was introduced into the flask. Dry dimethylsulfoxide (2 mL) was added thereto, and the resulting mixture was reacted at 80° C. for 21 hours while stirring. The mixture (reaction product) in the flask was then cooled to room temperature and passed through silica gel. After the solvent was distilled off from the filtrate under reduced pressure using an evaporator, the residue (concentrate) was recrystallized from hexane to yield a white solid (47.8 mg). This white solid was identified by nuclear magnetic resonance ($^1$H NMR) analysis and mass spectrometry as a compound represented by the following Formula (6c):

[Chem. 39]

(6c)

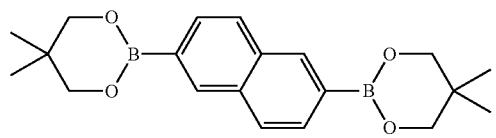

The yield of this compound was 31%.
$^1$H NMR (400 MHz, CDCl$_3$) δ 1.06 (s, 12H), 3.83 (s, 8H), 7.83 (s, 4H), 8.33 (s, 2H). LRMS (EI) m/z calcd for C$_{20}$H$_{26}$B$_2$O$_4$ [M]$^+$: 352, found 352.

Synthesis Example 6

Production of Compound (7a-1) (Part 1)

To a 200-mL round-bottom flask containing a stirring bar were added cesium fluoride (400 mg, 2.6 mmol), Compound (5b) (2.07 g, 4 mmol) obtained in Synthesis Example 2, Compound (6a) (151.2 mg, 0.5 mmol) obtained in Synthesis Example 3, and [Pd(PPh$_3$)$_4$] (30.1 mg, 0.026 mmol); and argon gas was introduced into the flask. Dry THF (60 mL) was added thereto, and the resulting mixture was reacted at 65° C. for 26 hours while stirring. The mixture (reaction liquid) in the flask was then cooled to room temperature, and passed through Celite. After the solvent was distilled off from the filtrate under reduced pressure using an evaporator, the residue (concentrate) was purified by silica gel chromatography (hexane/EtOAc) to yield a white solid (319.9 mg). This white solid was identified by nuclear magnetic resonance ($^1$H NMR, $^{13}$C NMR) analysis and mass spectrometry as a compound represented by the following Formula (7a-1):

[Chem. 40]

(7a-1)

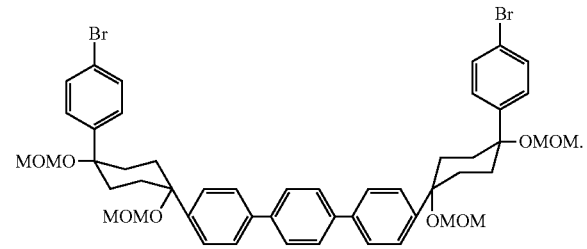

The yield of this compound was 68%.
$^1$H NMR (400 MHz, CDCl$_3$) δ 2.11 (brs, 8H), 2.30-2.40 (brm, 8H), 3.42 (s, 6H), 3.43 (s, 6H), 4.44 (s, 4H), 4.48 (s, 4H), 7.33 (d, J=9 Hz, 4H), 7.45 (d, J=9 Hz, 4H), 7.51 (d, J=9 Hz, 4H), 7.60 (d, J=9 Hz, 4H), 7.65 (s, 4H); $^{13}$C NMR (100 MHz, CDCl$_3$) δ 33.0 (CH$_2$), 56.0 (CH$_3$), 77.9 (4°), 78.1 (4°), 92.2 (CH$_2$), 92.3 (CH$_2$), 121.7 (4°), 126.9 (CH), 127.4 (CH), 128.7 (4°), 131.5 (CH), 139.5 (4°), 139.8 (4°); HRMS (FAB) m/z calcd for C$_{50}$H$_{56}$Br$_2$O$_8$Na [M$^+$Na]$^+$: 965.2240, found 965.2195; mp: 184.7-186.4° C.

Synthesis Example 7

Production of Compound (7a-2)

To a 50-mL round-bottom flask containing a stirring bar were added cesium fluoride (165 mg, 1.1 mmol), Compound (5b) (521.3 mg, 1 mmol) obtained in Synthesis Example 2, Compound (6b) (75.5 mg, 0.2 mmol) obtained above, and [Pd(PPh$_3$)$_4$] (6.8 mg, 6 μmol); and argon gas was introduced into the flask. Dry THF (60 mL) was added thereto, and the resulting mixture was reacted at 65° C. for 26 hours while stirring. The mixture (reaction liquid) in the flask was then cooled to room temperature and passed through Celite. After the solvent was distilled off from the filtrate under reduced pressure using an evaporator, the residue (concentrate) was purified by silica gel chromatography (hexane/EtOAc) to yield a white solid (126.5 mg). This white solid was identified by nuclear magnetic resonance ($^1$H NMR, $^{13}$C NMR) analysis and mass spectrometry as a compound represented by the following Formula (7a-2):

[Chem. 41]

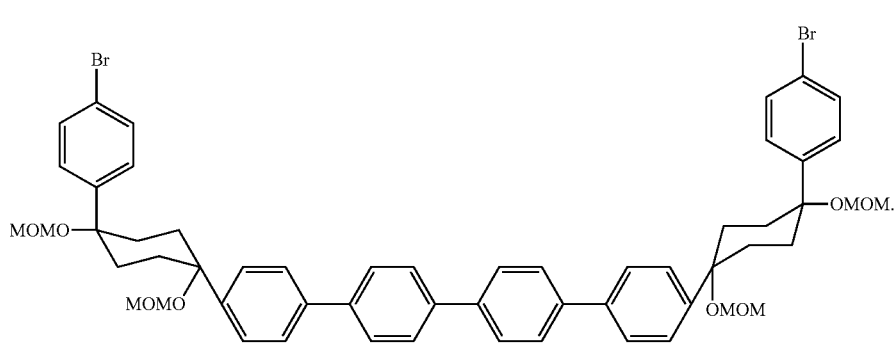

(7a-2)

The yield of this compound was 62%.
$^1$H NMR (400 MHz, CDCl$_3$) δ 2.11 (brs, 8H), 2.34-2.37 (brm, 8H), 3.41 (s, 6H), 3.43 (s, 6H), 4.44 (s, 4H), 4.48 (s, 4H), 7.33 (d, J=9 Hz, 4H), 7.45 (d, J=9 Hz, 4H), 7.51 (d, J=9 Hz, 4H), 7.60 (d, J=9 Hz, 4H), 7.65 (s, 4H); $^{13}$C NMR (100 MHz, CDCl$_3$) δ 33.0 (CH$_2$), 56.0 (CH$_3$), 77.2 (4°), 77.9 (4°), 78.1 (4°), 92.2 (CH$_2$), 92.3 (CH$_2$), 1.2-1.7 (4°), 126.9 (CH), 127.4 (CH), 128.7 (4°), 131.5 (CH), 139.5 (4°), 139.8 (4°); HRMS (FAB) m/z calcd for C$_{56}$H$_{60}$Br$_2$O$_8$Na [M$^+$Na]$^+$: 1041.2553, found 1041.2532.

Synthesis Example 8

Production of Compound (7a-3) (Part 1)

To a 50-mL round-bottom flask containing a stirring bar were added cesium fluoride (80.2 mg, 0.53 mmol), Compound (5b) (349.7 mg, 0.68 mmol) obtained in Synthesis Example 2, Compound (6c) (32.0 mg, 84 µmol) obtained in Synthesis Example 5, and [Pd(PPh$_3$)$_4$] (4.7 mg, 4 µmol); and argon gas was introduced into the flask. Dry THF (60 mL) was added thereto, and the resulting mixture was reacted at 60° C. for 24 hours while stirring. The mixture (reaction liquid) in the flask was then cooled to room temperature and passed through Celite. After the solvent was distilled off from the filtrate under reduced pressure using an evaporator, the residue (concentrate) was purified by silica gel chromatography (hexane/EtOAc) to yield a white solid (66.1 mg). This white solid was identified by nuclear magnetic resonance ($^1$H NMR) analysis and mass spectrometry as a compound represented by the following Formula (7a-3):

[Chem. 42]

7.33 (d, J=8.3 Hz, 4H), 7.45 (d, J=8.5 Hz, 4H), 7.54 (d, J=8.3 Hz, 4H) 7.71 (d, J=8.3 Hz, 4H), 7.74 (d, J=8.6 Hz, 4H), 7.94 (d, J=8.3 Hz, 2H), 8.03 (s, 2H). LRMS (FAB) m/z calcd for C$_{54}$H$_{58}$Br$_2$O$_8$ [M]$^+$: 994.2478, found 994.

Synthesis Example 9

Production of Compound (8a) (Borylated Product)

To a 50-mL round-bottom flask containing a stirring bar were added Compound (7a-1) (285.4 mg, 0.30 mol) obtained in Synthesis Example 6 above or Synthesis Example 26 below, [Pd$_2$(dba)$_3$] (6.0 mg, 6.6 µmol), 2-(dicyclohexylphosphino)-2',4',6'-tri-isopropyl-1,1'-biphenyl (hereinafter also referred to as "X-Phos") (13.3 mg, 28 µmol), bis(pinacolate)diboron (227.5 mg, 0.9 mmol), and potassium acetate (KOAc) (180.1 mg, 1.8 mmol); and argon gas was introduced into the flask. Dry dioxane (1,4-dioxane) (15 mL) was added thereto, and the resulting mixture was reacted at 90° C. for 5 hours while stirring. The resulting mixture (reaction liquid) in the flask was cooled to room temperature and passed through silica gel. After the solvent was distilled off from the filtrate under reduced pressure using an evaporator, the residue (concentrate) was purified by gel permeation chromatography (chloroform) to yield a white solid (271.7 mg). This white solid was identified by

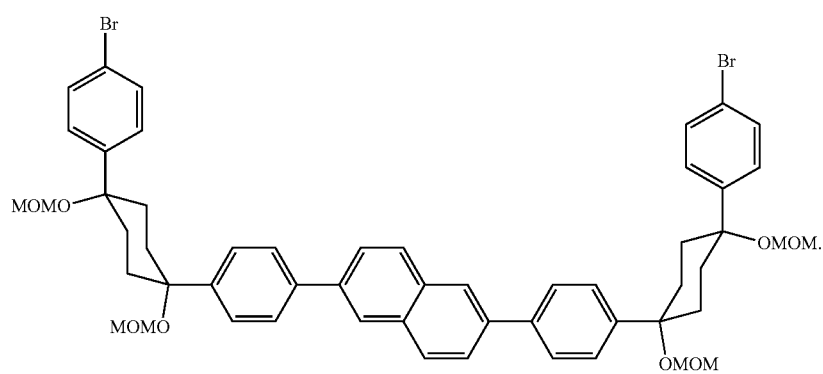

(7a-3)

The yield of this compound was 79%.
$^1$H NMR (400 MHz, CDCl$_3$) δ 2.13 (brs, 8H), 2.36 (brs, 8H), 3.42 (s, 6H), 3.44 (s, 6H), 4.44 (s, 4H), 4.50 (s, 4H), nuclear magnetic resonance ($^1$H NMR, $^{13}$C NMR) analysis and mass spectrometry as a compound represented by the following Formula (8a):

[Chem. 43]

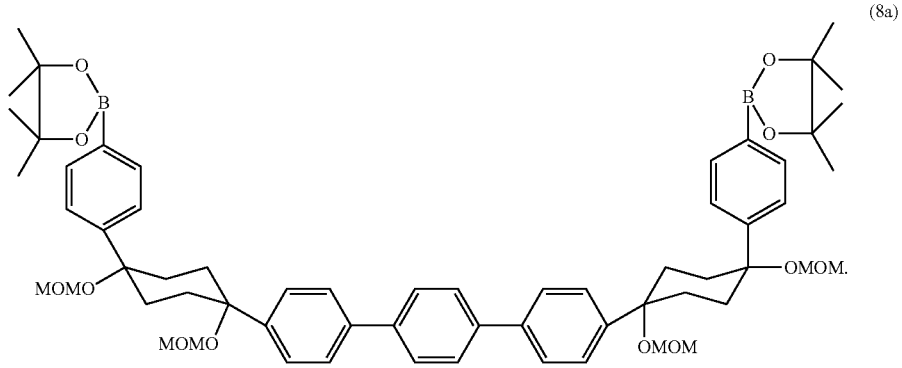

The yield of this compound was 87%.
$^1$H NMR (400 MHz, CDCl$_3$) δ 1.32 (s, 24H) 2.14 (brs, 8H), 2.36 (brs, 8H), 3.41 (s, 6H), 3.43 (s, 6H), 4.43 (s, 4H), 4.48 (s, 4H), 7.46 (d, J=8 Hz, 2H), 7.49 (d, J=9 Hz, 2H), 7.45 (δ, J=9 Hz, 4H), 7.51 (d, J=8 Hz, 4H), 7.60 (d, J=8.5 Hz, 4H), 7.65 (s, 4H); $^{13}$C NMR (100 MHz, CDCl$_3$) δ 24.9 (CH$_3$), 33.0 (CH$_2$), 56.0 (CH$_3$), 78.2 (4°), 78.3 (4°), 83.8 (4°), 92.2 (CH$_2$), 92.3 (CH$_2$), 126.2 (4°), 126.9 (CH), 127.4 (CH), 134.8 (4°), 134.9 (CH), 139.5 (4°), 139.7 (4°); HRMS (FAB) m/z calcd for C$_{62}$H$_{80}$B$_2$O$_{12}$Na [M$^+$Na]$^+$: 1061.5753, found 1061.5719; mp: 225.1-226.6° C.

Synthesis Example 10

Production of Compound (8b) (Borylated Product)

To a 50-mL round flask containing a stirring bar were added Compound (7a-2) (137 mg, 134 μmol) obtained in Synthesis Example 7, [Pd$_2$(dba)$_3$] (2.8 mg, 3.1 μmol), bis (pinacolate)diboron (106 mg, 419 μmol), and potassium acetate (KOAc) (75.7 mg, 771 μmol); and argon gas was introduced into the flask. Dry dioxane (1,4-dioxane) (5 mL) was added thereto, and the resulting mixture was reacted at 90° C. for 5 hours while stirring. The resulting mixture (reaction liquid) in the flask was cooled to room temperature and passed through silica gel (EtOAc). After the solvent was distilled off from the filtrate under reduced pressure using an evaporator, the residue (concentrate) was purified by gel permeation chromatography to yield a white solid (119 mg). This white solid was identified by nuclear magnetic resonance ($^1$H NMR, $^{13}$C NMR) analysis and mass spectrometry as a compound represented by the following Formula (8b):

[Chem. 44]

The yield of this compound was 87%.
$^1$H NMR (400 MHz, CDCl$_3$) δ 1.32 (s, 24H) 2.15 (brs, 8H), 2.37 (brs, 8H), 3.41 (s, 6H), 3.44 (s, 6H), 4.43 (s, 4H), 4.49 (s, 4H), 7.47 (d, J=8 Hz, 2H), 7.50 (d, J=8 Hz, 2H), 7.60 (δ, J=9 Hz, 4H), 7.70 (d, J=9 Hz, 4H), 7.60 (d, J=8.5 Hz, 4H), 7.78 (d, J=8 Hz, 2H); $^{13}$C NMR (100 MHz, CDCl$_3$) δ 24.9 (CH$_3$), 33.0 (CH$_2$), 33.1 (CH$_2$) 56.1 (CH$_3$), 77.1 (4°), 78.3 (4°), 78.4 (4°), 83.9 (4°), 92.3 (CH$_2$), 126.3 (CH), 127.0 (CH), 127.4 (CH), 127.5 (CH), 134.9 (CH), 139.6 (4°), 139.7 (4°), 139.8 (4°); HRMS (FAB) m/z calcd for C$_{56}$H$_{60}$Br$_2$O$_8$Na [M$^+$Na]$^+$: 1041.2553, found 1041.2532.

Synthesis Example 11

Production of Cyclic Compound (11a) Made of 14 Organic Rings

To a 50-mL round-bottom flask containing a stirring bar were added Compound (7a-1) (19.7 mg, 21 mol) obtained in Synthesis Example 6, Compound (8a) (29.1 mg, 28 μmol) obtained in Synthesis Example 9, [Pd(OAc)$_2$] (0.9 mg, 4.0 μmol), and X-Phos (2.0 mg, 4.2 μmol); and argon gas was introduced into the flask. Dry 1,4-dioxane (10 mL) and 10 M sodium hydroxide (NaOH) aqueous solution (18 mL, 0.18 mmol) were added thereto to obtain a mixture. The mixture was reacted at 80° C. for 24 hours while stirring. The mixture (reaction liquid) in the flask was then cooled to room temperature and passed through silica gel. After the solvent was distilled off from the filtrate under reduced pressure using an evaporator, the residue (concentrate) was purified by silica gel chromatography (CHCl$_3$/EtOAc=1/1) to yield a white solid (14.6 mg). This white solid was identified by nuclear magnetic resonance ($^1$H NMR) analysis and mass spectrometry as a cyclic compound in which 14 rings including phenylene groups and cyclohexylene derivative groups were continuously linked, the compound being represented by the following Formula (11a):

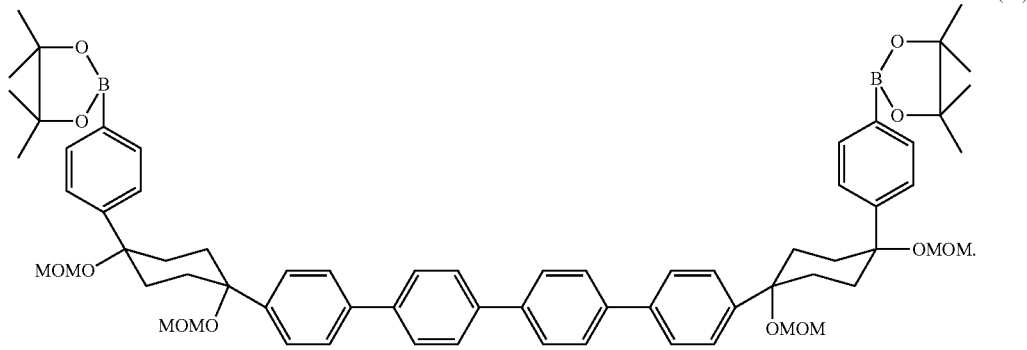

[Chem. 45]

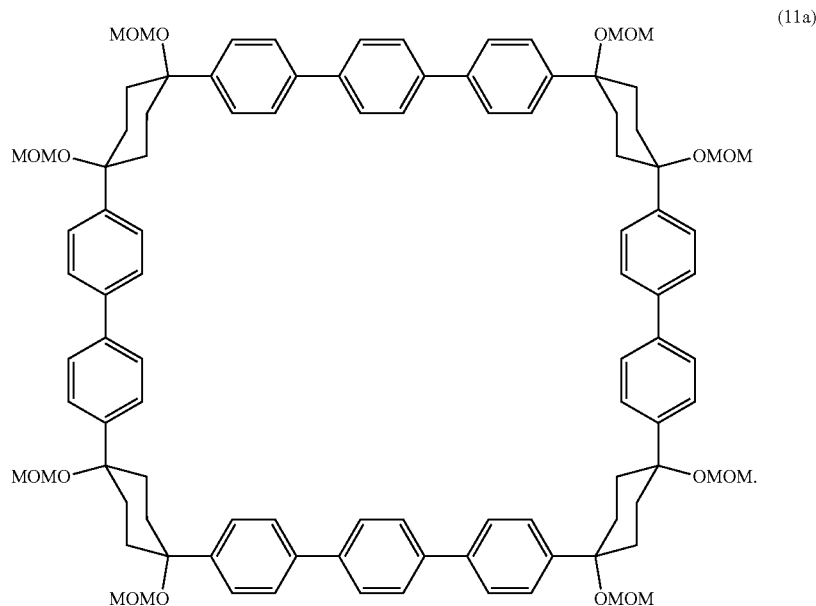

(11a)

The yield of this cyclic compound was 45%.

$^1$H NMR (600 MHz, CDCl$_3$) δ 2.18 (brs, 16H), 2.39 (brs, 16H), 3.42 (s, 12H), 3.43 (s, 12H), 4.46 (s, 8H), 4.48 (s, 8H), 7.57 (m, 40H). LRMS (FAB) m/z calcd for C$_{100}$H$_{112}$O$_{16}$ [M]$^+$: 1569.7984, found 1570.

Synthesis Example 12

Production of Carbon Nanoring (3a) Made of Cycloparaphenylene Containing 14 Benzene Rings (Part 1)

To a 2-mL glass vial containing a stirring bar were added Cyclic Compound (11a) (9.1 mg, 5.0 μmol) obtained in Synthesis Example 11, 0.1 M p-toluenesulfonic acid aqueous solution (50 μL, 5.0 μmol), and dry m-xylene (1 mL), thereby obtaining a mixture. This vial was placed in a microwave reactor (Initiator Synthesis System, produced by Biotage), and a reaction was carried out at 150° C. for 30 minutes while stirring. Subsequently, the mixture (reaction liquid) in the vial was cooled to room temperature and passed through silica gel. After the solvent was distilled off from the filtrate under reduced pressure using an evaporator, the residue (concentrate) was purified by silica gel chromatography (CH$_2$Cl$_2$/hexane) to yield a white solid (1.1 mg). This white solid was identified by nuclear magnetic resonance ($^1$H NMR) analysis and mass spectrometry as [14]cycloparaphenylene (amorphous) made of 14 benzene rings, represented by the following Formula (3a):

[Chem. 46]

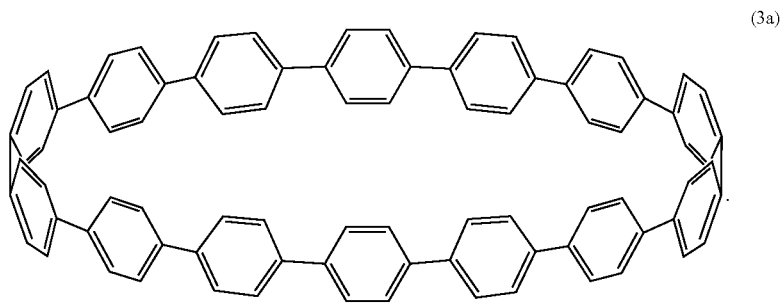

(3a)

The yield of [14]cycloparaphenylene was 20%.

$^1$H NMR (600 MHz CDCl$_3$) δ 7.65 (s, 56H). MS (MALDI-TOF) m/z calcd for C$_{84}$H$_{56}$ [M]$^+$: 1064.4382, found 1064.424.

Synthesis Example 13

Production of Carbon Nanoring (3a) Made of Cycloparaphenylene Containing 14 Benzene Rings (Part 2)

To a 20-mL Schlenk flask containing a stirring bar were added Cyclic Compound (11a) (7.9 mg, 5.0 μmol) obtained in Synthesis Example 11, sodium hydrogen sulfate monohydrate (15.4 mg, 11.3 μmol), dry m-xylene (1 mL), and dry dimethylsulfoxide (DMSO) (1 mL), thereby obtaining a mixture. The resulting mixture was reacted at 150° C. for 48 hours while stirring. Subsequently, the mixture (reaction liquid) in the Schlenk flask was cooled to room temperature and extracted with CHCl$_3$. After the organic phase from the extraction was dried over Na$_2$SO$_4$, the solvent was distilled off under reduced pressure to yield a crude product. The crude product was purified by silica gel preparative thin-layer chromatography (CH$_2$Cl$_2$/hexane) to yield a white solid (2.0 mg). This white solid was identified by nuclear magnetic resonance ($^1$H NMR, $^{13}$C NMR) analysis and mass spectrometry as [14]cycloparaphenylene (amorphous) made of 14 benzene rings, represented by Formula (3a) above. The yield of [14]cycloparaphenylene was 37%.

$^1$H NMR (600 MHz, CDCl$_3$) δ 7.65 (s, 56H); $^{13}$C NMR (98.5 MHz, CDCl$_3$) δ 127.4 (CH), 138.8 (4°); HRMS (MALDI-TOF) m/z calcd for C$_{84}$H$_{56}$ [M]$^+$: 1064.4382, found 1064.438.

Synthesis Example 14

Production of Cyclic Compound (11b) Containing 15 Organic Rings

To a 50-mL round-bottom flask containing a stirring bar were added Compound (7a-2) (20.0 mg, 20 μmol) obtained in Synthesis Example 7, Compound (8a) (285.4 mg, 29 μmol) obtained in Synthesis Example 9, [Pd(OAc)$_2$] (1.0 mg, 4.4 μmol), and X-Phos (2.2 mg, 4.6 μmol); and argon gas was introduced into the flask. Dry 1,4-dioxane (20 mL) and 10 M NaOH aqueous solution (19 mL, 0.19 mmol) were added thereto, and the resulting mixture was reacted at 80° C. for 24 hours while stirring. The mixture (reaction liquid) in the flask was then cooled to room temperature and passed through silica gel. After the solvent was distilled off from the filtrate under reduced pressure using an evaporator, the residue (concentrate) was purified by silica gel chromatography (CHCl$_3$/EtOAc=1/1) to yield a white solid (10.4 mg). This white solid was identified by nuclear magnetic resonance ($^1$H NMR) analysis and mass spectrometry as a cyclic compound in which 15 rings including phenylene groups and cyclohexylene derivative groups were continuously linked, the compound being represented by the following Formula (11b):

[Chem. 47]

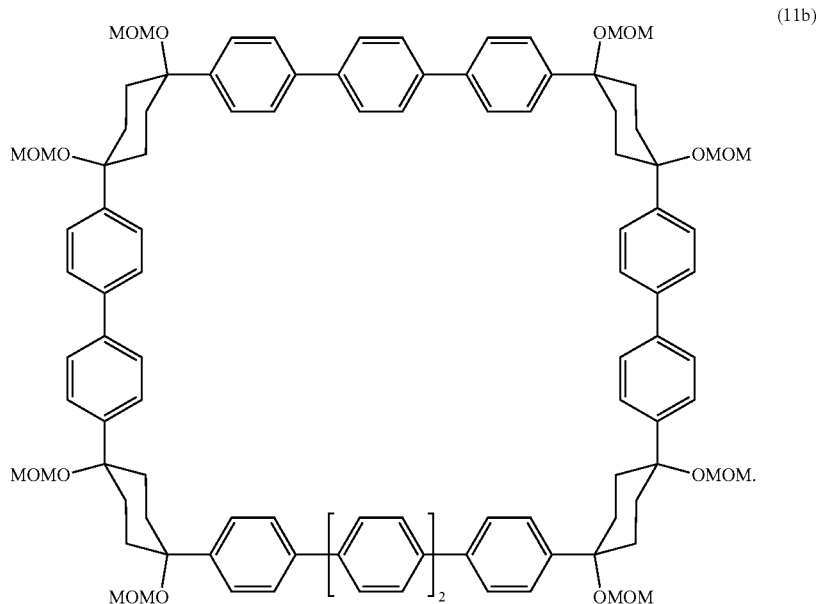

(11b)

The yield of this cyclic compound was 32%.

$^1$H NMR (400 MHz, CDCl$_3$) δ 2.18 (brs, 16H), 2.39 (brs, 16H), 3.44 (m, 24H), 4.48 (m, 16H), 7.57 (m, 44H). HRMS (FAB) m/z calcd for C$_{106}$H$_{116}$O$_{16}$ [M]$^+$: 1645.8297, found 1646.

Synthesis Example 15

Production of Carbon Nanoring (3b) Made of Cycloparaphenylene Containing 15 Benzene Rings (Part 1)

To a 2-mL glass vial containing a stirring bar were added Cyclic Compound (11b) (9.8 mg, 6.0 μmol) obtained in Synthesis Example 14, 0.1 M p-toluenesulfonic acid aqueous solution (120 μL, 12 μmol), and dry m-xylene (1 mL). The vial containing the resulting mixture was placed in a microwave reactor as in Synthesis Example 12, and a reaction was carried out at 150° C. for 30 minutes while stirring. Subsequently, the mixture (reaction liquid) in the vial was cooled to room temperature and passed through silica gel. After the solvent was distilled off from the filtrate under reduced pressure using an evaporator, the residue (concentrate) was purified by silica gel chromatography ($CH_2Cl_2$/hexane), thereby yielding a white solid (0.5 mg). This white solid was identified by nuclear magnetic resonance ($^1$H NMR) analysis and mass spectrometry as [15]cycloparaphenylene (amorphous) made of 15 benzene rings, represented by the following Formula (3b):

[Chem. 48]

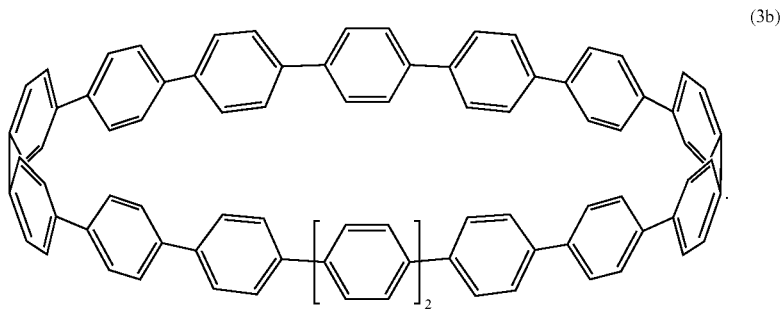

(3b)

The yield of [15]cycloparaphenylene was 7%.
$^1$H NMR (400 MHz CDCl$_3$) δ 7.67 (s, 60H). MS (MALDI-TOF) m/z calcd for $C_{90}H_{60}$ [M]$^+$: 1140.4695, found 1140.513.

Synthesis Example 16

Production of Carbon Nanoring (3b) Made of Cycloparaphenylene Containing 15 Benzene Rings (Part 2)

To a 20-mL Schlenk flask containing a stirring bar were added Cyclic Compound (11b) (7.4 mg, 4.5 μmol) obtained in Synthesis Example 14, sodium hydrogen sulfate monohydrate (14.7 mg, 10.6 mmol), dry m-xylene (1 mL), and dry dimethylsulfoxide (DMSO) (1 mL). The resulting mixture was reacted at 150° C. for 48 hours while stirring. Subsequently, the mixture (reaction liquid) in the Schlenk flask was cooled to room temperature and extracted with CHCl$_3$. After the organic phase from the extraction was dried over Na$_2$SO$_4$, the solvent was distilled off under reduced pressure to yield a crude product. The crude product was purified by silica gel preparative thin-layer chromatography ($CH_2Cl_2$/hexane) to yield a white solid (2.2 mg). This white solid was identified by nuclear magnetic resonance ($^1$H NMR, $^{13}$C NMR) analysis and mass spectrometry as [15]cycloparaphenylene (amorphous) made of 15 benzene rings, represented by Formula (3b) above. The yield of [15]cycloparaphenylene was 43%.

$^1$H NMR (600 MHz, CDCl$_3$) δ 7.67 (s, 60H); $^{13}$C NMR (150 MHz, CDCl$_3$) δ 127.3 (CH), 138.8 (4°); HRMS (MALDI-TOF) m/z calcd for $C_{90}H_{60}$ [M]$^+$: 1140.4695, found 1140.469.

Synthesis Example 17

Production of Cyclic Compound (11c) Containing 16 Organic Rings

To a 50-mL round flask containing a stirring bar were added Compound (7a-2) (42.8 mg, 38.0 μmol) obtained in Synthesis Example 7, Compound (8b) (26.7 mg, 26.2 μmol) obtained in Synthesis Example 10, [Pd(OAc)$_2$] (1.3 mg, 5.7 μmol), and X-Phos (6.9 mg, 14.4 μmol); and argon gas was introduced into the flask. Dry 1,4-dioxane (13.5 mL) and 10 M NaOH aqueous solution (27.0 μL, 270 μmol) were added thereto, and the resulting mixture was reacted at 80° C. for 24 hours while stirring. Subsequently, the mixture (reaction liquid) in the flask was cooled to room temperature and passed through silica gel (EtOAc). After the solvent was distilled off from the filtrate under reduced pressure using an evaporator, the residue (concentrate) was purified by silica gel preparative thin-layer chromatography (CHCl$_3$: EtOAc=1:1) to yield a white solid (15.5 mg). This white solid was identified by nuclear magnetic resonance ($^1$H NMR, $^{13}$C NMR) analysis and mass spectrometry as a cyclic compound in which 16 rings including phenylene groups and cyclohexylene derivative groups were continuously linked, the compound being represented by the following Formula (11c):

[Chem. 49]

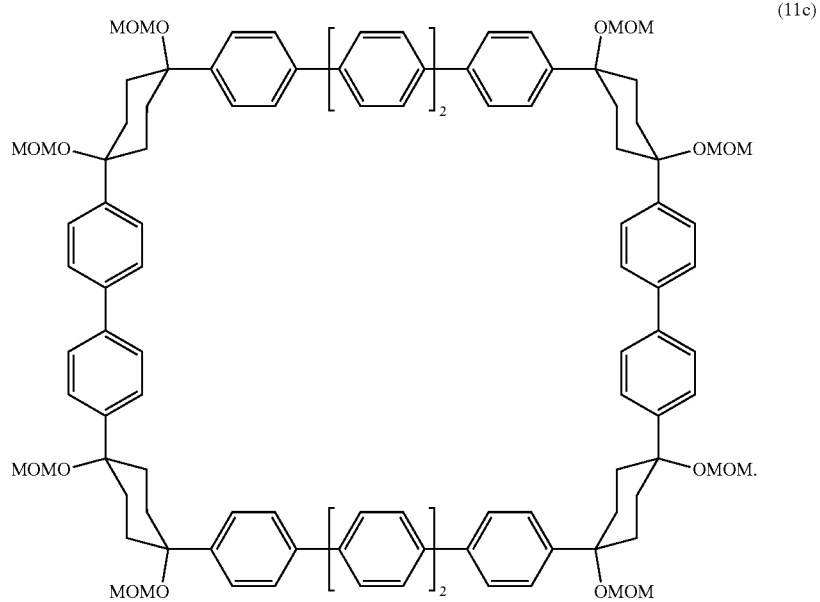

(11c)

The yield of this cyclic compound was 32%.

$^{1}$H NMR (270 MHz, CDCl$_{3}$) δ 2.19 (brs, 16H), 2.40 (brs, 16H), 3.43 (s, 12H), 3.45 (s, 12H), 4.48 (s, 8H), 4.50 (s, 8H), 7.50-7.70 (m, 48H); $^{13}$C NMR (98.5 MHz, CDCl$_{3}$) δ 33.1 (CH$_{2}$), 56.1 (CH$_{3}$), 78.2 (4°), 92.3 (CH$_{2}$), 126.9 (CH), 127.4 (CH), 127.5 (CH), 139.6 (CH), 139.8 (4°); HRMS (FAB) m/z calcd for C$_{112}$H$_{120}$O$_{16}$Na [M$^{+}$Na]$^{+}$: 1743.8474, found 1743.8496.

Synthesis Example 18

Production of Carbon Nanoring (3c) Made of Cycloparaphenylene Containing 16 Benzene Rings To a 20-mL Schlenk flask containing a stirring bar were added Cyclic Compound (11c) (12.5 mg, 7.26 μmol) obtained in Synthesis Example 17, sodium hydrogen sulfate monohydrate (20.0 mg, 145 μmol), dry m-xylene (1.2 mL), and dry dimethylsulfoxide (DMSO) (1.2 mL). The resulting mixture was reacted at 160° C. for 48 hours while stirring. Subsequently, the mixture (reaction liquid) in the Schlenk flask was cooled to room temperature and extracted with CHCl$_{3}$. After the organic phase from the extraction was dried over Na$_{2}$SO$_{4}$, the solvent was distilled off under reduced pressure to yield a crude product. The crude product was purified by silica gel preparative thin-layer chromatography (CH$_{2}$Cl$_{2}$/hexane) to yield a white solid (2.5 mg). This white solid was identified by nuclear magnetic resonance ($^{1}$H NMR, $^{13}$C NMR) analysis and mass spectrometry as [16]cycloparaphenylene (amorphous) made of 16 benzene rings, represented by the following Formula (3c):

[Chem. 50]

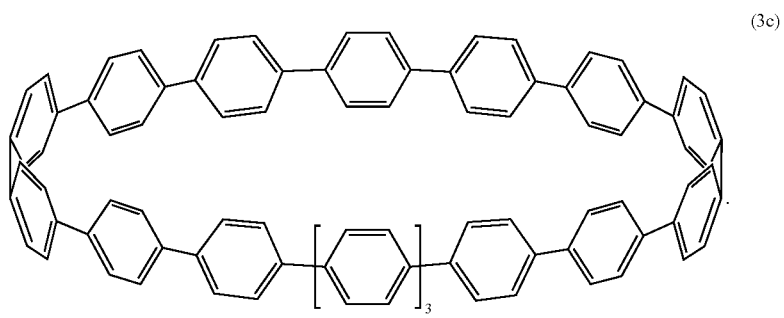

(3c)

The yield of [16]cycloparaphenylene was 28%.

$^1$H NMR (600 MHz, CDCl$_3$) δ 7.68 (s, 64H); $^{13}$C NMR (98.5 MHz, CDCl$_3$) δ 127.3 (CH), 138.9 (4°); HRMS (MALDI-TOF) m/z calcd for C$_{96}$H$_{64}$ [M]$^+$: 1216.5008, found 121.

Synthesis Example 19

Production of Cyclic Compound (11d) Made of 14 Organic Rings Including a Naphthylene Ring (Part 1)

To a 50-mL round-bottom flask containing a stirring bar were added Compound (7a-3) (20.0 mg, 20 μmol) obtained in Synthesis Example 8, Compound (8a) (29.4 mg, 28 mmol) obtained in Synthesis Example 9, [Pd(OAc)$_2$] (0.9 mg, 4.0 μmol), and X-Phos (2.0 mg, 4.2 μmol), and argon gas was introduced into the flask. Dry 1,4-dioxane (10 mL) and 10 M sodium hydroxide (NaOH) aqueous solution (10 μL, 0.10 mmol) were added thereto, and the resulting mixture was reacted at 80° C. for 24 hours while stirring. The mixture (reaction liquid) in the flask was then cooled to room temperature and passed through silica gel. After the solvent was distilled off from the filtrate under reduced pressure using an evaporator, the residue (concentrate) was purified by silica gel chromatography (CHCl$_3$/EtOAc=1/1) to yield a white solid (4.0 mg). This white solid was identified by nuclear magnetic resonance ($^1$H NMR) analysis and mass spectrometry as a cyclic compound in which 14 organic rings including phenylene groups, a naphthylene group, and cyclohexylene derivative groups were continuously linked, the compound being represented by the following Formula (11d):

$^1$H NMR (270 MHz, CDCl$_3$) δ 2.14 (brs, 16H), 2.38 (brs, 16H), 3.43 (m, 24H), 4.48 (m, 16H), 7.60 (m, 38H), 7.91 (d, J=8.6 Hz, 2H), 8.01 (s, 2H). LRMS (FAB) m/z calcd for C$_{104}$H$_{140}$O$_{16}$ [M]$^+$: 1619.8140, found 1620.

Synthesis Example 20

Production of Compound (7a-3) (Part 2)

To a 100-mL round-bottom flask containing a stirring bar were added Compound (5b) (2.49 g, 4.84 mmol) obtained in Synthesis Example 2, Compound (6c) (190 mg, 500 μmol) obtained in Synthesis Example 5, Pd(PPh$_3$)$_4$ (15.0 mg, 13.0 μmol), sodium carbonate (Na$_2$CO$_3$) (268 mg, 2.53 mmol), tetra-n-butylammonium bromide (n-Bu$_4$NBr) (555 mg, 499 mmol), dry THF (20 mL), and argon-bubbled water (5 mL). The resulting mixture was reacted at 60° C. for 24 hours while stirring. The mixture (reaction liquid) in the flask was then cooled to room temperature and filtered under reduced pressure. The residue (concentrate) was extracted with EtOAc, dried over Na$_2$SO$_4$, and filtered under reduced pressure. The crude product was purified by silica gel chromatography (hexane/EtOAc=8:1 to 2:1) to yield a white solid (359 mg). This white solid was identified by nuclear magnetic resonance ($^1$H NMR, $^{13}$C NMR) analysis and mass spectrometry as a compound represented by the following Formula (7a-3):

[Chem. 51]

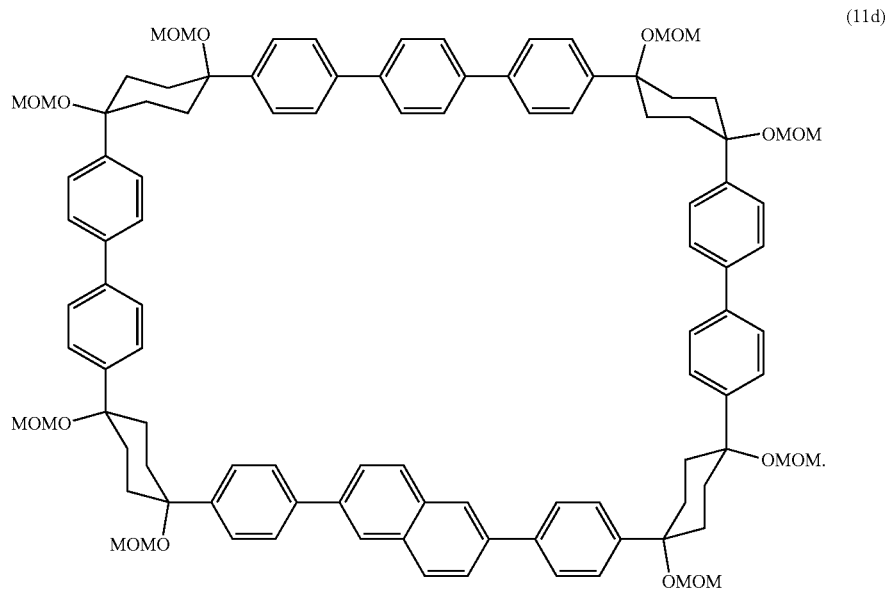

(11d)

The yield of this cyclic compound was 12%.

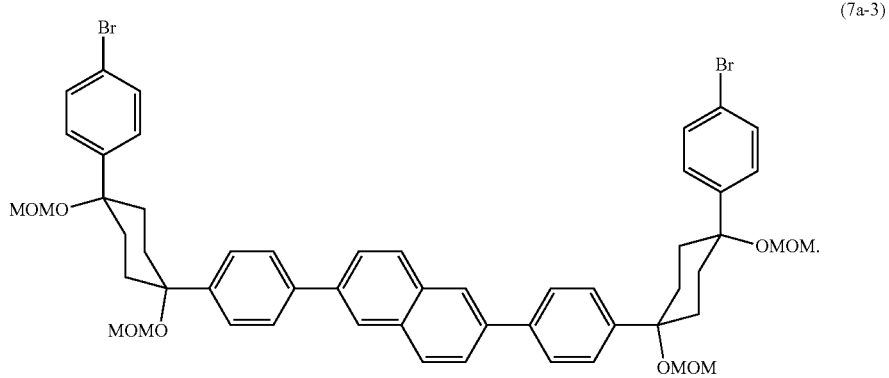

(7a-3)

The yield of this compound was 72%.

$^1$H NMR (400 MHz, CDCl$_3$) δ 2.12 (brs, 8H), 2.27-2.48 (brm, 8H), 3.42 (s, 6H), 3.44 (s, 6H), 4.44 (s, 4H), 4.50 (s, 4H), 7.33 (d, J=8 Hz, 4H), 7.45 (d, J=8 Hz, 4H), 7.55 (d, J=8 Hz, 4H), 7.70 (d, J=8 Hz, 4H), 7.75 (dd, J=8 Hz, 1 Hz, 4H), 7.94 (d, J=8 Hz, 2H), 8.04 (d, J=1 Hz, 2H); $^{13}$C NMR (100 MHz, CDCl$_3$) δ 33.0 (CH$_2$), 56.1 (CH$_3$), 77.2 (4°), 77.9 (4°), 78.1 (4°), 92.2 (CH$_2$), 92.3 (CH$_2$), 121.7 (4°), 126.9 (CH), 127.4 (CH), 128.7 (4°), 131.5 (CH), 139.5 (4°), 139.8 (4°); HRMS (FAB) m/z calcd for C$_{54}$H$_{58}$Br$_2$O$_8$Na [M$^+$Na]$^+$: 1015.2396, found 1015.2394; mp: 193.6-194.4° C.

Synthesis Example 21

Production of Cyclic Compound (11d) Made of 14 Organic Rings Including a Naphthylene Ring (Part 2)

To a 50-mL Schlenk flask containing a stirring bar were added Compound (7a-3) (40.1 mg, 40.3 μmol) obtained in Synthesis Example 20, Compound (8a) (50.2 mg, 48.3 μmol) obtained in Synthesis Example 9, Pd$_2$(dba)$_3$ (3.6 mg, 3.9 μmol), X-Phos (3.7 mg, 7.8 μmol), and K$_3$PO$_4$ (85.0 mg, 400 μmol). The flask was then evacuated and backfilled with argon gas three times. Argon-bubbled 1,4-dioxane (20 mL) and argon-bubbled water (80 μL) were added to this flask under a flow of argon. After stirring at 80° C. for 24 hours, the resulting mixture was filtered through a silica gel layer to remove the solvent (EtOAc). Thereafter, the solvent was distilled off under reduced pressure to obtain a crude product. The crude product was purified by gel permeation chromatography and preparative thin-layer chromatography (CHCl$_3$/EtOAc=1:1) to yield a white solid (22.6 mg). This white solid was identified by nuclear magnetic resonance ($^1$H NMR, $^{13}$C NMR) analysis and mass spectrometry as a cyclic compound represented by the following Formula (11d):

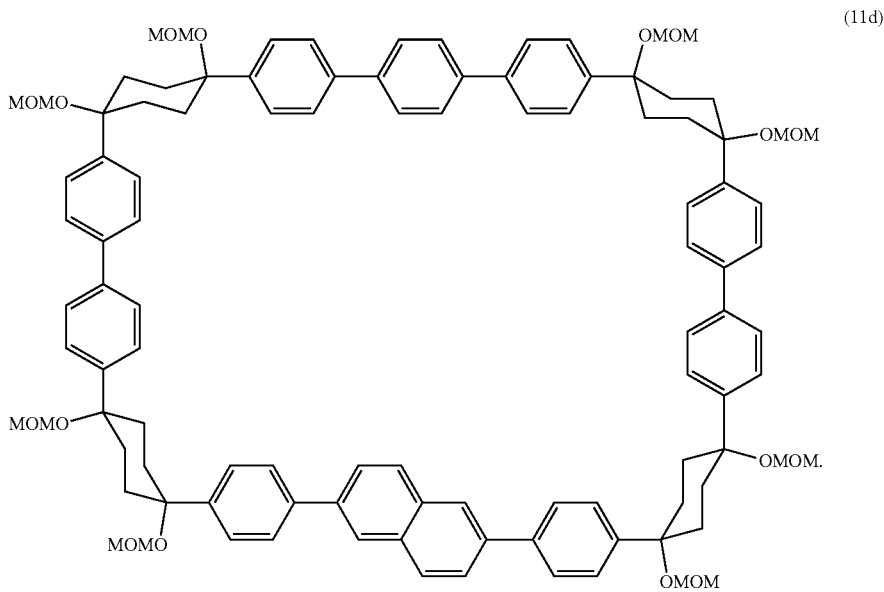

(11d)

The yield of this cyclic compound was 35%.

$^1$H NMR (400 MHz, CDCl$_3$) δ 1.80-2.66 (brm, 32H), 3.42 (s, 6H), 3.44 (s, 18H), 4.45 (s, 4H), 4.46 (s, 4H), 4.49 (s, 4H), 4.53 (s, 4H), 7.40-7.66 (m, 32H), 7.69 (d, J=8 Hz, 4H), 7.73 (d, J=9 Hz, 2H), 7.92 (d, J=9 Hz, 2H), 8.02 (s, 2H); $^{13}$C NMR (100 MHz, CDCl$_3$) δ 33.0 (CH$_2$), 55.9 (CH$_3$), 56.1 (CH$_3$), 77.94 (4°), 78.00 (4°), 78.1 (4°), 78.2 (4°), 92.1 (CH$_2$), 92.2 (CH$_2$), 125.4 (CH), 125.8 (CH), 126.8 (CH), 127.2 (CH), 127.3 (CH), 128.3 (CH), 128.7 (CH), 137.9 (4°), 139.4 (4°) 139.5 (4°), 139.6 (4°) 139.7 (4°), 140.1 (4°) 141.6 (br, 4°); HRMS (FAB) m/z calcd for C$_{104}$H$_{114}$O$_{16}$Na [M$^+$Na]$^+$: 1641.8005, found 1641.8009; mp: 235.0-240.0° C. (dec.).

Synthesis Example 22

Production of Carbon Nanoring (3d) Made of 14 Organic Rings Including a Naphthylene Ring To a 20-mL Schlenk flask containing a stirring bar and a condenser were added Cyclic Compound (11d) (16.2 mg, 10.0 μmol) obtained in Synthesis Example 19 or 21, sodium hydrogen sulfate monohydrate (NaHSO$_4$.H$_2$O) (27.2 mg, 197 mmol), dry DMSO (1 mL), and m-xylene (2.0 mL). The mixture was heated at 150° C. for 24 hours while stirring under air atmosphere. The mixture was cooled to room temperature and filtered through a silica gel layer to remove the solvent (CHCl$_3$). Thereafter, the solvent was distilled off under reduced pressure to obtain a crude product. The crude product was purified by thin-layer chromatography (CH$_2$Cl$_2$/hexane) to yield a light yellow solid (2.8 mg). This light yellow solid was identified by nuclear magnetic resonance ($^1$H NMR, $^{13}$C NMR) analysis and mass spectrometry as a carbon nanoring made of 14 organic rings including a naphthylene ring, the carbon nanoring being represented by the following Formula (3d):

[Chem. 54]

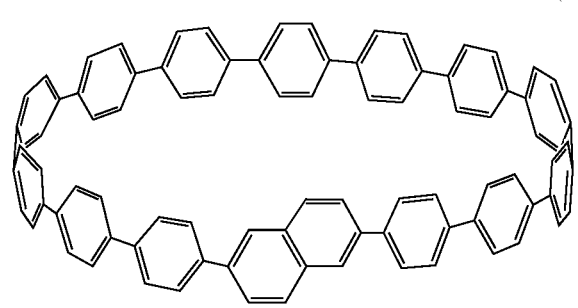

(3d)

The yield of this carbon nanoring was 25%.

$^1$H NMR (600 MHz, CDCl$_3$) δ 7.657 (brs, 44H), 7.670 (d, J=8 Hz, 4H), 7.74 (d, J=8 Hz, 4H), 7.77 (d, J=9 Hz, 2H), 7.87 (d, J=9 Hz, 2H), 8.01 (s, 2H); $^{13}$C NMR (150 MHz, CDCl$_3$) δ 125.5 (CH), 125.7 (CH), 127.3 (CH), 127.4 (CH), 127.5 (CH), 127.6 (CH), 128.7 (CH), 133.1 (4°), 137.3 (4°), 138.7 (4°), 138.78 (4°), 138.82 (4°), 138.84 (4°), 138.9 (4°), 139.1 (4°); HRMS (MALDI-TOF) m/z calcd for C$_{84}$H$_{56}$ [M]$^+$: 1114.4543, found 1114.4539.

Synthesis Example 23

Production of [9]cycloparaphenylene and [12]cycloparaphenylene (1) Production of Cyclic Compounds (12a) and (12b-1)

To a 200-mL round-bottom glass flask containing a stirring bar were added bis(1,5-cyclooctadiene)nickel(0) (452 mg, 1.64 mmol), Compound (5b) (423 mg, 823 μmol) obtained in Synthesis Example 2, and 2,2'-bipyridyl (257 mg, 1.65 mmol). THF (166 mL) was added thereto via syringe. The resulting mixture was stirred at reflux for 24 hours. After the reaction mixture was cooled to room temperature, the mixture was passed through a silica gel layer and washed with a mixed solvent of EtOAc/CHCl$_3$. Thereafter, the solvent was removed under reduced pressure. The crude product was purified by silica gel column chromatography (hexane/EtOAc) to yield a cyclic tetramer (68.1 mg) represented by the following Formula (12a):

[Chem. 55]

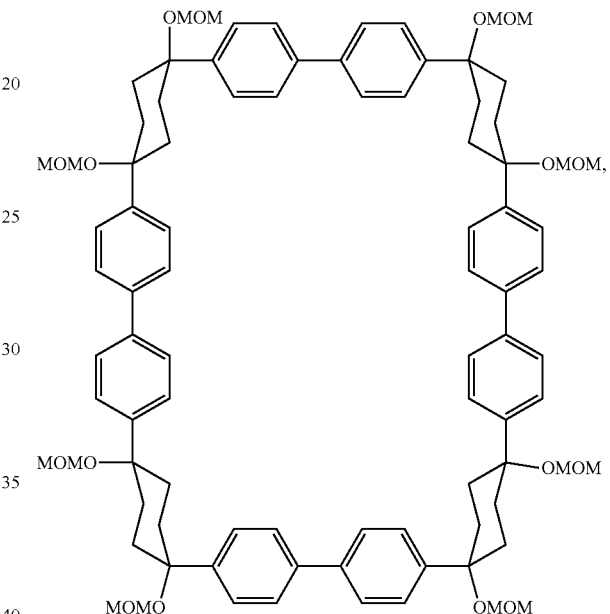

(12a)

and a cyclic trimer (95.5 mg) represented by the following Formula (12b-1):

[Chem. 56]

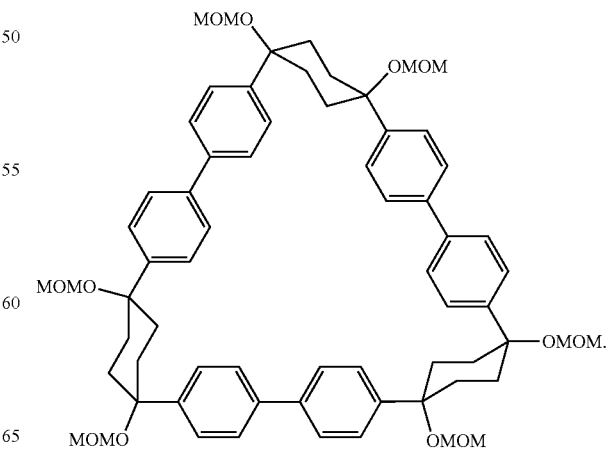

(12b-1)

The yields of the cyclic tetramer and the cyclic trimer were 23% and 32%, respectively. These substances were analyzed by $^1$H NMR and $^{13}$H-NMR.

Cyclic Tetramer (12a):

$^1$H NMR (400 MHz CDCl$_3$) δ 2.16 (brs, 16H), 2.37 (brs, 16H), 3.42 (s, 16H), 4.45 (s, 16H), 7.50 (s, 32H).

Cyclic Trimer (12b-1):

$^1$H NMR (600 MHz, 50° C., CDCl$_3$) δ 2.07 (brs, 12H), 2.28-2.34 (m, 12H), 3.43 (s, 18H), 4.58 (s, 12H), 7.40 (d, J=8 Hz, 12H), 7.46 (d, J=8 Hz, 12H); $^{13}$C NMR (150 MHz, 50° C., CDCl$_3$) δ 33.3 (CH$_2$), 55.9 (CH$_3$), 78.1 (4°), 92.4 (CH$_2$), 126.8 (CH), 127.3 (CH), 139.4 (4°), 141.2 (4°); HRMS (FAB) m/z calcd for C$_{66}$H$_{78}$NaO$_{12}$ [M•Na]$^+$: 1085.5391, found: 1085.538; mp: 182.3-187.0° C.

(2) Production of [9]cycloparaphenylene (4b)

To a 20-mL Schlenk flask containing a stirring bar and a condenser were added the cyclic trimer (26.6 mg, 25 µmol) represented by Formula (12b-1) above or Compound (12b-1) (26.6 mg, 25 µmol) obtained in Synthesis Example 30 below, sodium hydrogen sulfate monohydrate (69.1 mg, 400 µmol), dry dimethylsulfoxide (1.5 mL), and dry m-xylene (5 mL). The flask was heated at 150° C. for 48 hours while stirring. After cooled to room temperature, the mixture (reaction liquid) was extracted with CHCl$_3$ and dried over Na$_2$SO$_4$. The solvent was then distilled off under reduced pressure to yield a crude product. Thereafter, TLC (CH$_2$Cl$_2$/hexane) was performed to isolate a yellow solid (4.2 mg). This substance was identified by $^1$H NMR and $^{13}$C NMR analysis as [9]cycloparaphenylene (amorphous) made of nine p-phenylene groups, represented by Formula (4b):

[Chem. 57]

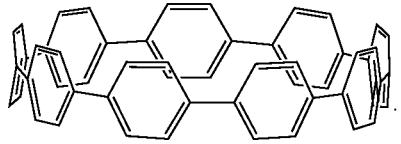

(4b)

The yield was 24%.

[9]Cycloparaphenylene (amorphous) and THF were placed in a reactor to obtain a saturated solution. The reactor was left open to allow it to stand in pentane vapor (10° C., 24 hours), thereby obtaining crystals of [9]cycloparaphenylene. According to X-ray structural analysis of the crystals, the crystal ring of [9]cycloparaphenylene contained THF. The crystals of [9]cycloparaphenylene were regularly arranged such that the adjacent crystals were maintained at an angle of 5 to 45 degrees relative to each other, and such that the crystal rings are in a tube-like shape formed from a large number of rings due to the arrangement thereof.

$^1$H NMR (600 MHz, CDCl$_3$) δ 7.52 (s, 36H); $^{13}$C NMR (150 MHz, CDCl$_3$) δ 127.3 (CH), 137.9 (4°); HRMS (MALDI-TOF) m/z calcd for C$_{54}$H$_{36}$ [M•]$^+$: 684.2817, found: 684.2834.

(3) Production of [12]cycloparaphenylene (4a)

Compound (12a) obtained in (1) above was treated as in (2) above, thereby yielding [12]cycloparaphenylene ([12]CPP) made of twelve p-phenylene groups, represented by the following Formula (4a):

[Chem. 58]

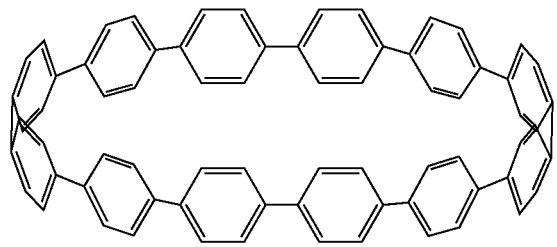

(4a)

$^1$H NMR (400 MHz CDCl$_3$) δ 7.61 (s, 48H); $^{13}$C NMR (100 MHz, CDCl$_3$) δ 127.33, 138.52.

Synthesis Example 24

Production of Compound (Ib-1)

[Chem. 59]

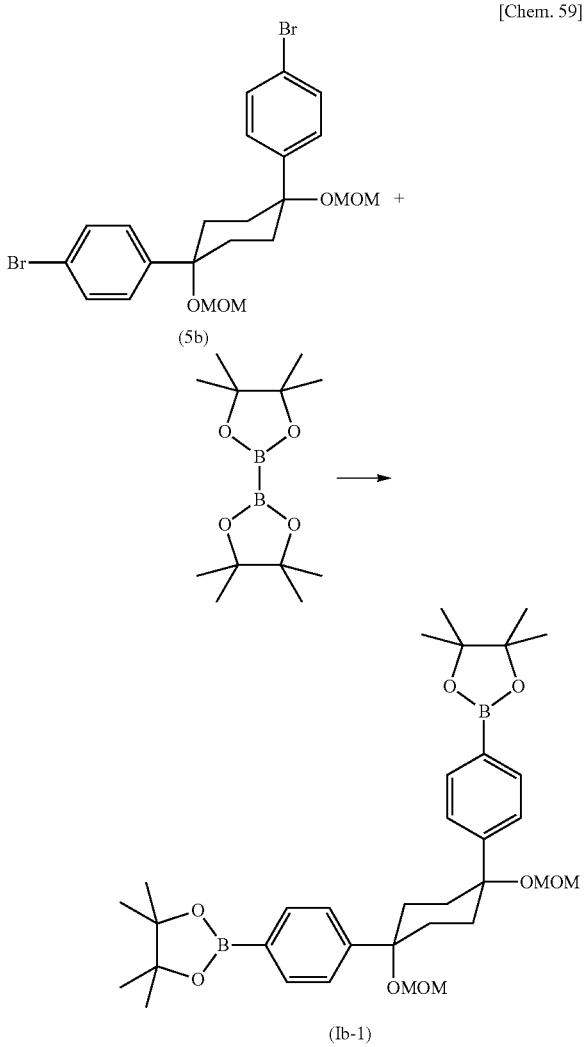

(Ib-1)

To a 50-ml Schlenk flask containing a stirring bar were added Compound (5b) (518 mg, 1.0 mmol) obtained in Synthesis Example 2, bis(pinacolate)diboron (636 mg, 2.5 mmol), 1,1'-bis(diphenylphosphino) ferrocene-palladium (II) dichloride dichloromethane complex (PdCl$_2$(dppf)·CH$_2$Cl$_2$) (23.2 mg, 30 μmol), potassium acetate (KOAc) (624 mg, 6.35 mmol), and dry dimethylsulfoxide (DMSO) (20 mL). The Schlenk flask was heated at 80° C. for 17 hours while stirring. After cooled to room temperature, the reaction mixture was quenched with water. The resulting product was extracted with ethyl acetate (EtOAc), and the organic phase was dried over Na$_2$SO$_4$ and concentrated under reduced pressure. The crude product was purified by recycling preparative gel permeation chromatography (chloroform) to yield the target compound as a white solid (390 mg) (yield: 64%).

$^1$H NMR (600 MHz, CDCl$_3$) δ 1.33 (s, 24H), 2.09 (br, 4H), 2.31 (br, 4H), 3.40 (s, 6H), 4.41 (s, 4H), 7.43 (d, J=8 Hz, 4H), 7.76 (d, J=8 Hz, 4H); $^{13}$C NMR (150 MHz, CDCl$_3$) δ 24.9 (CH$_3$), 32.9 (CH$_2$), 56.0 (C$_3$), 78.3 (4°), 83.8 (4°), 92.2 (CH$_2$), 126.2 (CH), 128.1 (4°), 134.8 (CH); HRMS (FAB) m/z calcd for C$_{34}$H$_{50}$B$_2$NaO$_8$ [M•Na]$^+$: 631.3584, found 631.3605.

The same reaction was performed by using a compound having iodine atoms at both ends, in place of Compound (5b) having bromine atoms at both ends, under the same conditions (provided that the amounts of bis(pinacolate) diboron, PdCl$_2$(dppf)·CH$_2$Cl$_2$, and KOAc were changed to 2.7 mmol, 32 μmol, and 9.0 mmol, respectively). It was possible to thereby improve the yield to 83%.

Synthesis Example 25

Production of Compound (14-1)

[Chem. 60]

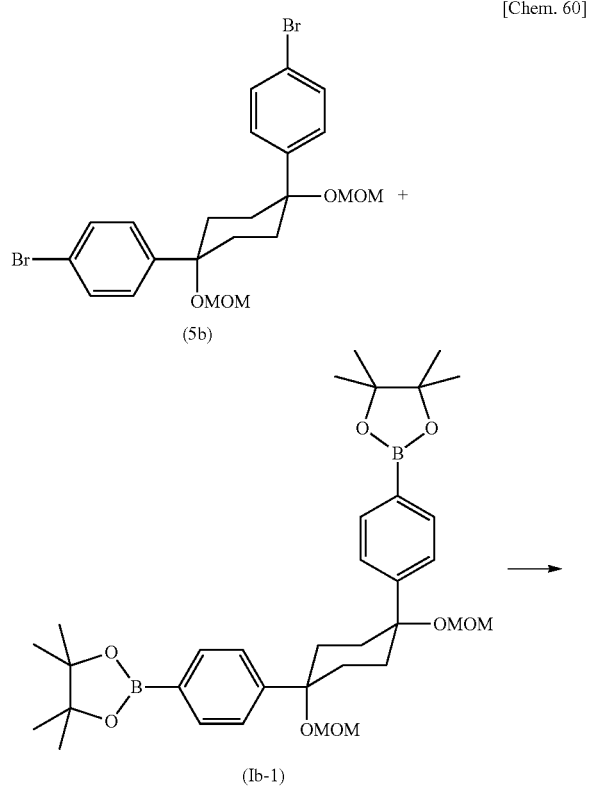

(5b)

(Ib-1)

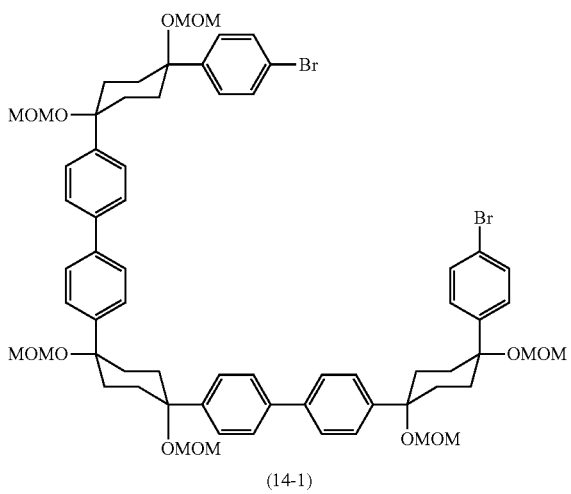

(14-1)

To a 200-mL round-bottom glass flask containing a stirring bar were added Compound (5b) (5.58 g, 10.9 mmol) obtained in Synthesis Example 2, Compound (Ib-1) (608 mg, 1.00 mmol) obtained in Synthesis Example 24, tetrakis (triphenylphosphine)palladium(0) (Pd(PPh$_3$)$_4$) (114 mg, 98.2 μmol), silver carbonate (Ag$_2$CO$_3$) (983 mg, 3.57 mmol), and dry THF (100 mL). The resulting mixture was reacted under reflux for 38 hours while stirring. After cooled to room temperature, the reaction mixture was quenched with water. The resulting product was extracted with ethyl acetate (EtOAc), and the organic phase was dried over Na$_2$SO$_4$ and concentrated under reduced pressure. The crude product was purified by silica gel column chromatography (hexane/EtOAc=5/1 to 1/1) to yield the target compound as a colorless solid (789 mg) (yield: 65%).

$^1$H NMR (600 MHz, CDCl$_3$) δ 2.11 (brs, 12H), 2.28-2.43 (m, 12H), 3.40 (s, 6H), 3.42 (s, 6H), 3.43 (s, 6H), 4.43 (s, 4H), 4.46 (s, 4H), 4.48 (s, 4H), 7.31 (d, J=8 Hz, 4H), 7.43 (d, J=8 Hz, 4H), 7.47-7.57 (m, 16H); $^{13}$C NMR (150 MHz, CDCl$_3$) δ 32.8 (CH$_2$), 55.9 (CH$_3$), 77.8 (4°), 77.9 (4°), 78.0 (4°), 92.0 (CH$_2$), 92.1 (CH$_2$), 121.5 (4°), 126.8 (CH), 126.8 (CH), 127.2 (CH), 128.6 (CH), 131.4 (CH), 139.4 (4°), 139.5 (4°), 141.5 (br, 4°); HRMS (FAB) m/z calcd for C$_{66}$H$_{78}$Br$_2$NaO$_{12}$ [M•Na]$^+$: 1243.3752, found: 1243.3760.

The yield was 59% when the same procedure was performed, except that the reaction conditions were changed to 60° C. and 24 hours.

Synthesis Example 26

Production of Compound (7a-1) (Part 2)

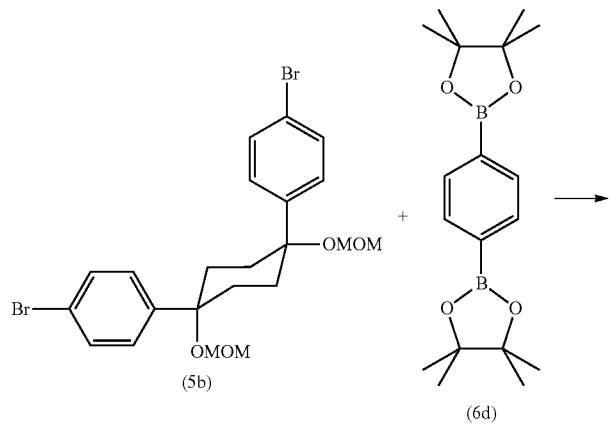

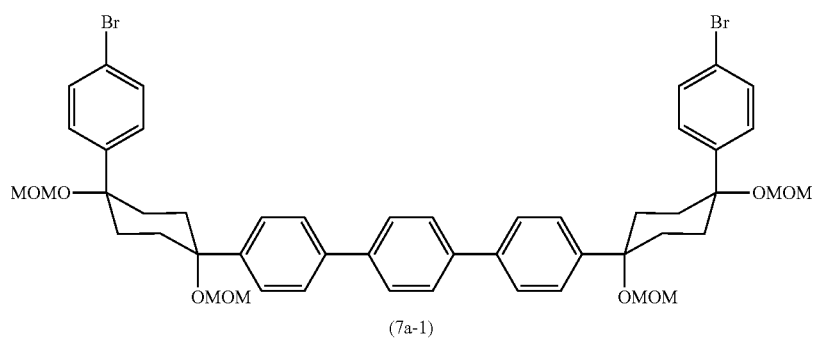

To a 200-mL round-bottom flask containing a stirring bar were added cesium fluoride (400 mg, 2.6 mmol), Compound (5b) (2.07 g, 4 mmol) obtained in Synthesis Example 2, Compound (6d) (1,4-benzenediboron acid bis(pinacol) ester) (151.2 mg, 0.5 mmol), and tetrakis(triphenylphosphine)palladium(0) (Pd(PPh$_3$)$_4$) (30.1 mg, 0.026 mmol); and argon gas was introduced into the flask. Dry THF (60 mL) was added thereto, and the resulting mixture was reacted at 65° C. for 26 hours while stirring. The mixture (reaction liquid) in the flask was then cooled to room temperature and passed through Celite. After the solvent was distilled off from the filtrate under reduced pressure using an evaporator, the residue (concentrate) was purified by silica gel chromatography (hexane/EtOAc) to yield the target compound as a white solid (319.9 mg) (yield: 68%).

$^1$H NMR (400 MHz, CDCl$_3$) δ 2.11 (brs, 8H), 2.30-2.40 (brm, 8H), 3.42 (s, 6H), 3.43 (s, 6H), 4.44 (s, 4H), 4.48 (s, 4H), 7.33 (d, J=9 Hz, 4H), 7.45 (d, J=9 Hz, 4H), 7.51 (d, J=9 Hz, 4H), 7.60 (d, J=9 Hz, 4H), 7.65 (s, 4H); $^{13}$C NMR (100 MHz, CDCl$_3$) δ 33.0 (CH$_2$), 56.0 (CH$_3$), 77.9 (4°), 78.1 (4°), 92.2 (CH$_2$), 92.3 (CH$_2$), 121.7 (4°), 126.9 (CH), 127.4 (CH), 128.7 (4°), 131.5 (CH), 139.5 (4°), 139.8 (4°); HRMS (FAB) m/z calcd for C$_{50}$H$_{56}$Br$_2$O$_8$Na [M$^+$Na]$^+$: 965.2240, found 965.2195; mp: 184.7-186.4° C.

Synthesis Example 27

Production of Compound (16a)

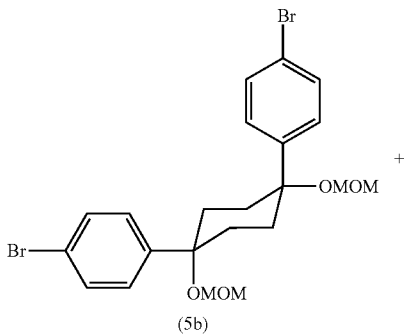

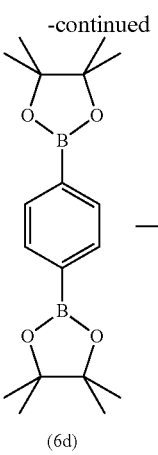

To a 100-mL flask containing a stirring bar were added Compound (5b) (366 mg, 712 μmol) obtained in Synthesis Example 2, Compound (6d) (1,4-benzenediboron acid bis (pinacol) ester) (1.99 g, 6.03 mmol), tetrakis(triphenylphosphine)palladium(0) (Pd(PPh$_3$)$_4$) (70.6 mg, 61.1 μmol), silver carbonate (Ag$_2$CO$_3$) (284 mg, 1.03 mmol), and dry THF (30 mL). The mixture was reacted at 65° C. for 24 hours while stirring and then quenched with water. The resulting product was extracted with ethyl acetate (EtOAc), the organic phase was dried over Na$_2$SO$_4$ and concentrated under reduced pressure. The crude product was purified by silica gel column chromatography (hexane/EtOAc=10/1 to 5/1) to yield the target compound as a colorless solid (290 mg) (yield: 54%).

$^1$H NMR (600 MHz, CDCl$_3$) δ 1.35 (s, 24H), 2.17 (br, 4H), 2.38 (br, 4H), 3.44 (s, 6H), 4.48 (s, 4H), 7.52 (d, J=8 Hz, 4H), 7.58 (d, J=8 Hz, 4H), 7.58 (d, J=8 Hz, 4H), 7.86 (d, J=8 Hz, 4H); $^{13}$C NMR (150 MHz, CDCl$_3$) δ 24.9 (CH$_3$), 33.1 (CH$_2$), 56.0 (CH$_3$), 78.2 (4°), 83.8 (4°), 92.3 (CH$_2$), 126.3 (CH), 127.1 (CH), 127.3 (br, CH), 135.3 (CH), 140.1 (4°), 143.2 (4°); HRMS (FAB) m/z calcd for C$_{34}$H$_{50}$B$_2$NaO$_8$ [M•Na]$^+$: 783.4210, found 783.4240.

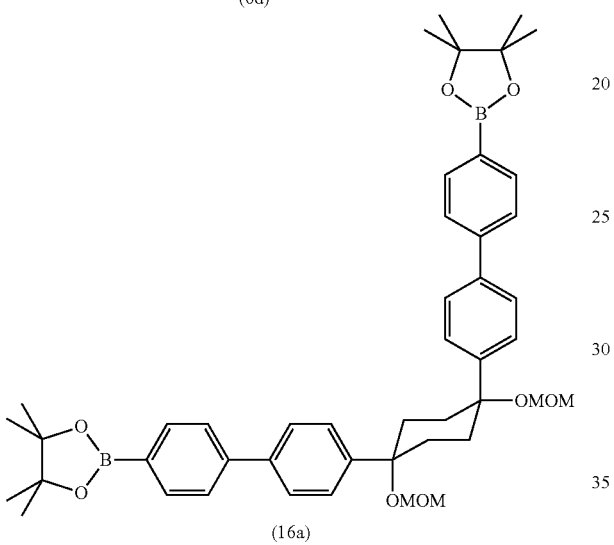

Synthesis Example 28

Production of Compound (21)

[Chem. 63]

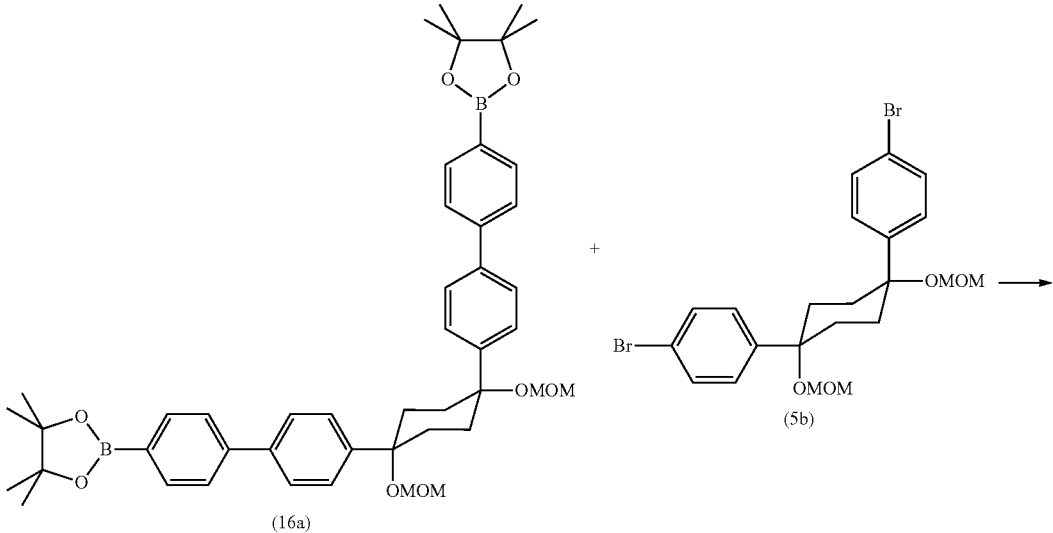

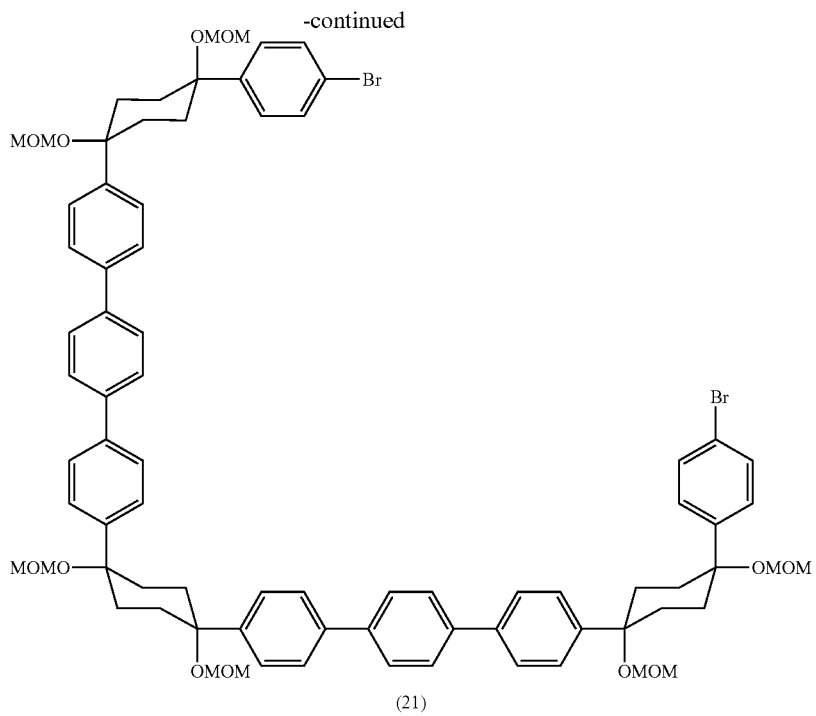

To a 100-mL flask containing a stirring bar were added Compound (16a) (155 mg, 204 μmol) obtained by Synthesis Example 27, Compound (5b) (1.22 g, 2.37 mmol) obtained in Synthesis Example 2, tetrakis(triphenylphosphine)palladium(0) (Pd(PPh$_3$)$_4$) (25.4 mg, 22.0 mmol), sodium carbonate (Na$_2$CO$_3$) (107 mg, 1.01 mmol), dry toluene (12 mL), and dry ethyl acetate (EtOAc) (3 mL). The resulting mixture was reacted at 70° C. for 24 hours while stirring. After cooled to room temperature, the mixture was concentrated under reduced pressure. The resulting product was extracted with ethyl acetate (EtOAc), dried over Na$_2$SO$_4$, and concentrated under reduced pressure. The crude product was purified by silica gel column chromatography (hexane/EtOAc=6/1 to 1/1) to yield the target compound as a colorless solid (239 mg) (yield: 44%).

$^1$H NMR (600 MHz, CDCl$_3$) δ 2.10 (br, 12H), 2.27-2.49 (m, 12H), 3.41 (s, 6H), 3.43 (s, 6H), 3.45 (s, 6H), 4.43 (s, 4H), 4.47 (s, 4H), 4.50 (s, 4H), 7.32 (d, J=8 Hz, 4H), 7.44 (d, J=8 Hz, 4H), 7.50 (d, J=8 Hz, 4H), 7.54 (d, J=8 Hz, 4H), 7.59 (d, J=8 Hz, 4H), 7.60 (d, J=8 Hz, 4H), 7.64 (s, 8H); $^{13}$C NMR (1.50 MHz, CDCl$_3$) δ 33.0 (CH$_2$), 56.0 (CH$_3$), 77.9 (4°), 78.1 (4°), 78.2 (4°), 92.2 (CH$_2$), 92.3 (CH$_2$), 121.7 (4°), 126.9 (CH), 126.9 (CH), 127.4 (CH), 127.4 (CH), 128.7 (CH), 131.5 (CH), 139.4 (4°), 139.5 (4°), 139.7 (4°), 139.8 (4°), 141.6 (br, 4°); HRMS (FAB) m/z calcd for C$_{76}$H$_{86}$Br$_2$NaO$_8$ [M•Na]$^+$: 1395.4378, found 1395.4364.

Synthesis Example 29

Production of Compound (15a)

[Chem. 64]

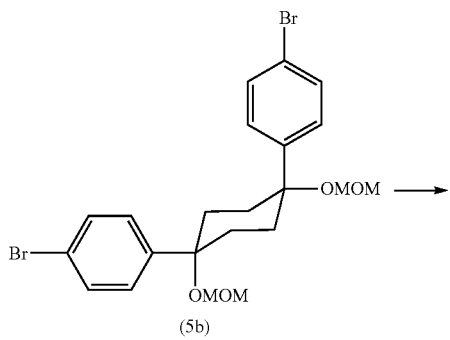
(5b)

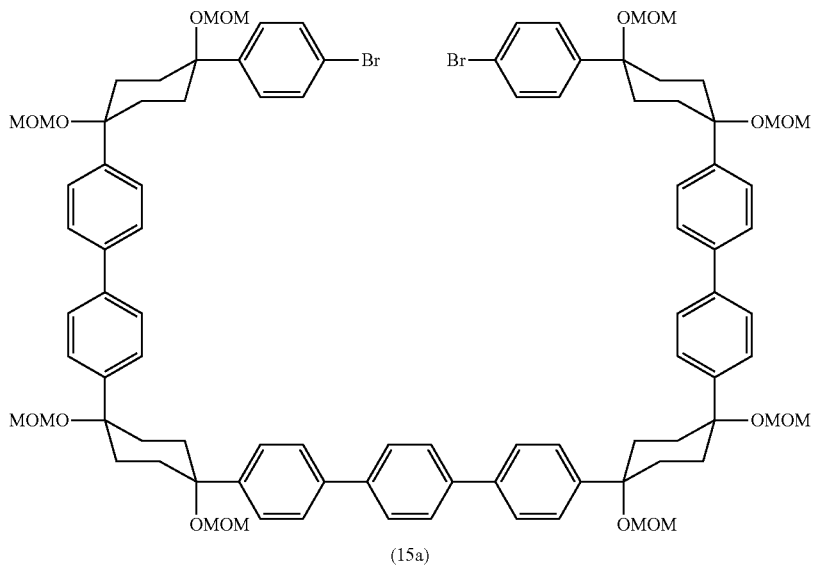
(15a)

To a 50-mL round-bottom glass flask containing a stirring bar were added Compound (8a) (102 mg, 98.2 μmol) obtained in Synthesis Example 9, Compound (5b) (500 mg, 972 μmol) obtained in Synthesis Example 2, tetrakis(triphenylphosphine)palladium(0) (Pd(PPh$_3$)$_4$) (11.1 mg, 9.60 mmol), silver carbonate (Ag$_3$CO$_3$) (108 mg, 355 μmol), and dry THF (10 mL). The resulting mixture was reacted at 60° C. for 19 hours while stirring. After cooled to room temperature, the reaction mixture was quenched with water. Subsequently, extraction was performed with ethyl acetate (EtOAc), and the organic phase was dried over Na$_2$SO$_4$ and concentrated under reduced pressure. The crude product was purified by silica gel column chromatography (hexane/EtOAc=3/1 to 2/3) to yield the target compound as a colorless solid (93.9 mg) (yield: 58%).

$^1$H NMR (600 MHz, CDCl$_3$) δ 2.15 (br, 16H), 2.27-2.42 (m, 16H), 3.40 (s, 6H), 3.41 (s, 6H), 3.43 (s, 6H), 3.44 (s, 6H), 4.43 (s, 4H), 4.45 (s, 4H), 4.47 (s, 4H), 4.49 (s, 4H), 7.31 (d, J=8 Hz, 4H), 7.43 (d, J=8 Hz, 4H), 7.45-7.56 (m, 20H), 7.59 (d, J=8 Hz, 4H), 7.63 (s, 4H); HRMS (FAB) m/z calcd for C$_{94}$H$_{108}$Br$_2$NaO$_{16}$ [M•Na]$^+$: 1673.5896, found 1673.5862.

Synthesis Example 30

Production of Cyclic Compound (12b-1) (Part 2)

[Chem. 65]

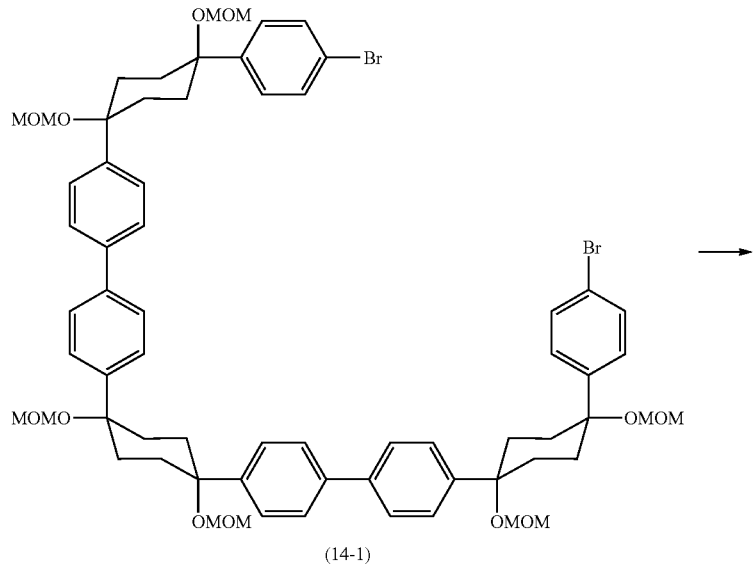

(14-1)

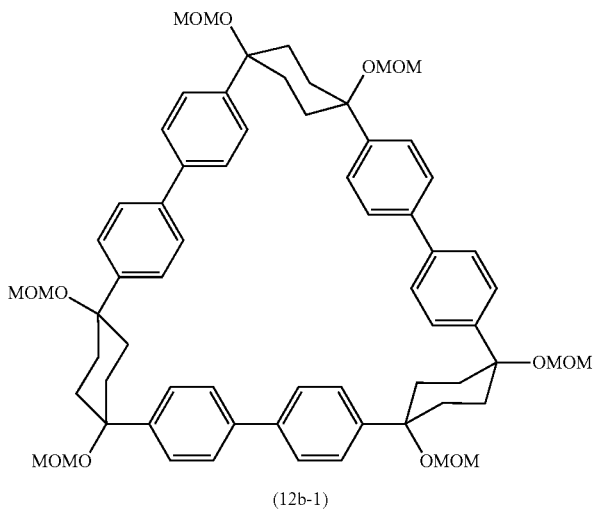

(12b-1)

To a 50-mL round-bottom glass flask containing a stirring bar were added bis(1,5-cyclooctadiene)nickel(0) (Ni(cod)$_2$) (14.5 mg, 52.7 µmol), Compound (14-1) (30.6 mg, 25.0 µmol) obtained in Synthesis Example 25, and 2,2'-bipyridyl (7.82 mg, 50.1 µmol). Dry THF (15.5 mL) was then further added thereto. The resulting mixture was reacted under reflux for 24 hours while stirring. After cooled to room temperature, the reaction mixture was filtered through silica gel and washed with ethyl acetate (EtOAc), and the solvent was then removed under reduced pressure. The crude product was purified by silica gel column chromatography (hexane/EtOAc) to yield the target compound as a colorless solid (12.2 mg) (yield: 46%).

Synthesis Example 31
Production of Cyclic Compound (20a-1) (Part 1)
[Chem. 66]
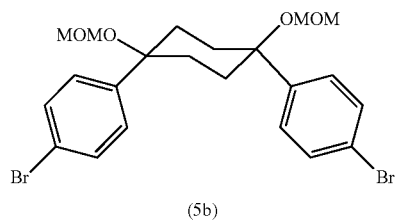
(5b)
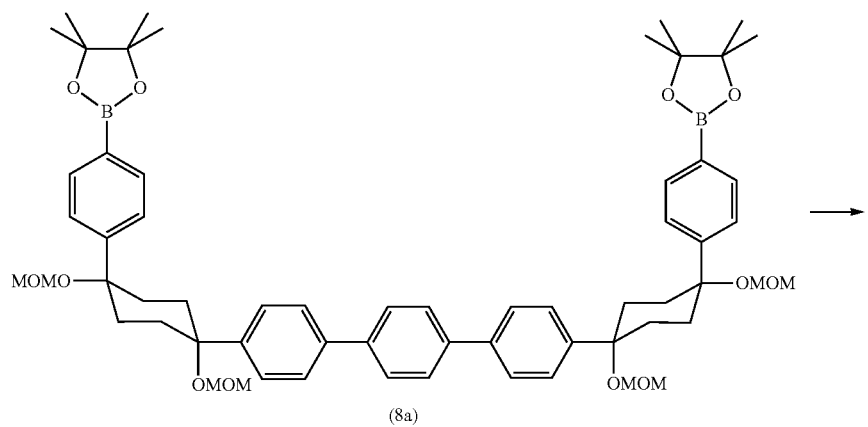
(8a)
→
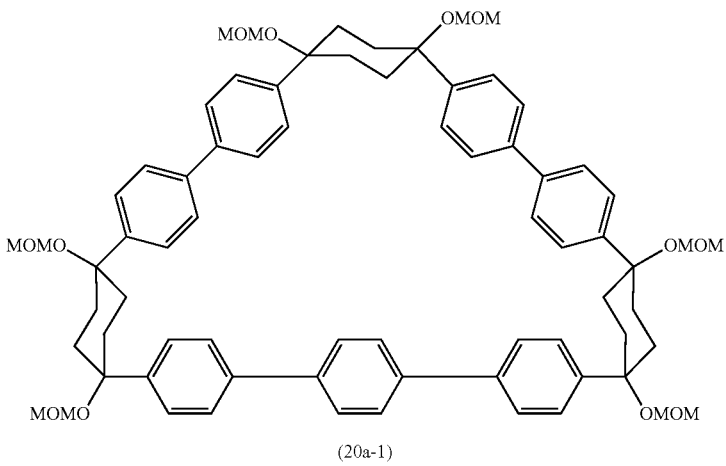
(20a-1)

To a 50-mL round-bottom glass flask containing a stirring bar were added Compound (5b) (21.0 mg, 40.9 μmol) obtained in Synthesis Example 2, Compound (8a) (49.4 mg, 47.6 μmol) obtained in Synthesis Example 9, tris(dibenzylideneacetone)dipalladium(0) (Pd$_2$(dba)$_3$) (3.8 mg, 8.0 μmol), potassium phosphate (K$_3$PO$_4$) (84.9 mg, 405 μmol), 1,4-dioxane (20 mL), and water (80 μL). The resulting mixture was reacted at 80° C. for 24 hours while stirring. After cooled to room temperature, the reaction mixture was filtered through silica gel and washed with ethyl acetate (EtOAc). The solvent was then removed under reduced pressure. The crude product was purified by silica gel column chromatography (chloroform) and preparative thin-layer chromatography (CHCl$_3$/EtOAc=1/1) to yield the target compound as a colorless solid (9.3 mg) (yield: 20%).

$^1$H NMR (600 MHz, CD$_2$Cl$_2$, 35° C.) δ 1.67 (s, 4H), 1.93-2.53 (m, 20H), 2.31 (br, 4H), 3.36 (s, 6H), 3.37 (s, 6H), 3.45 (s, 6H), 4.48 (s, 4H), 4.55 (s, 4H), 4.58 (s, 4H), 7.29 (d, J=8 Hz, 4H), 7.40-7.47 (m, 12H), 7.60 (d, J=8 Hz, 4H), 7.66 (d, J=8 Hz, 4H), 7.68 (s, 4H); $^{13}$C NMR (150 MHz, CDCl$_3$, 50° C.) δ 32.8 (CH$_2$), 33.2 (CH$_2$), 34.0 (CH$_2$), 55.5 (CH$_3$), 55.9 (CH$_3$), 56.2 (CH$_3$), 77.9 (4°), 78.3 (4°), 78.4 (4°), 92.2 (CH$_2$), 92.3 (CH$_2$), 92.6 (CH$_2$), 126.6 (CH), 126.8 (CH), 126.8 (CH), 127.2 (CH), 127.3 (CH), 128.3 (CH), 139.3 (4°), 139.3 (4°), 139.5 (4°), 139.5 (4°); HRMS (FAB) m/z calcd for C$_{34}$H$_{50}$B$_2$NaO$_8$ [M•Na]$^+$: 631.3584, found 631.3605.

Synthesis Example 32

Production of Compound (20a-1) (Part 2)

[Chem. 67]

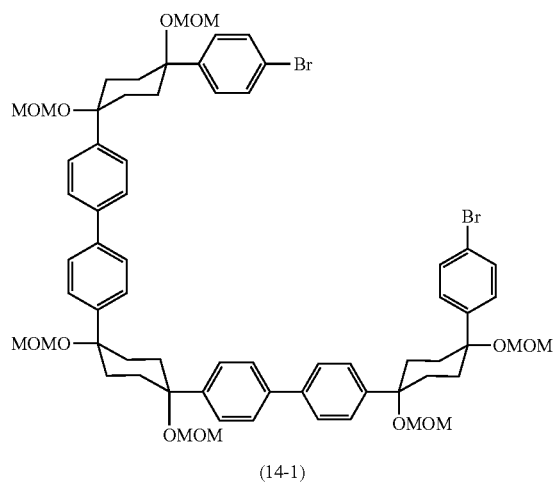

+

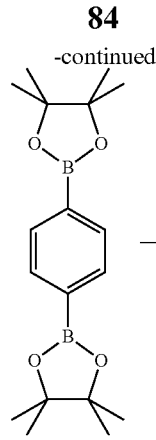

-continued

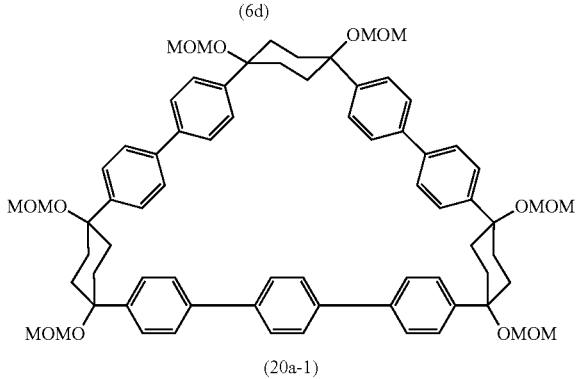

To a 50-mL Schlenk flask containing a stirring bar were added Compound (14-1) (29.5 mg, 24.1 μmol) obtained in Synthesis Example 25, Compound (6d) (1,4-benzenediboron acid bis(pinacol)ester) (11.1 mg, 33.6 mmol), palladium acetate (II) (Pd(OAc)$_2$) (2.15 mg, 9.58 μmol), 2-(dicyclohexylphosphino)-2',4',6'-triisopropyl-1,1'-biphenyl (X-Phos) (4.57 mg, 9.59 μmol), 10 M NaOH aqueous solution (20.0 mL, 200 μmol), and 1,4-dioxane (20 mL). The resulting mixture was reacted at 80° C. for 17 hours while stirring. Water was further added thereto, and extraction was performed with ethyl acetate (EtOAc). The organic phase was dried over Na$_2$SO$_4$ and concentrated under reduced pressure. The crude product was purified by silica gel column chromatography (chloroform) and preparative thin-layer chromatography (CHCl$_3$/EtOAc=1/1) to yield the target compound as a colorless solid (5.04 mg) (yield: 18%).

$^1$H NMR (600 MHz, CD$_2$Cl$_2$, 35° C.) δ 1.67 (s, 4H), 1.93-2.53 (m, 20H), 2.31 (br, 4H), 3.36 (s, 6H), 3.37 (s, 6H), 3.45 (s, 6H), 4.48 (s, 4H), 4.55 (s, 4H), 4.58 (s, 4H), 7.29 (d, J=8 Hz, 4H), 7.40-7.47 (m, 12H), 7.60 (d, J=8 Hz, 4H), 7.66 (d, J=8 Hz, 4H), 7.68 (s, 4H); $^{13}$C NMR (150 MHz, CDCl$_3$, 50° C.) δ 32.8 (CH$_2$), 33.2 (CH$_2$), 34.0 (CH$_2$), 55.5 (CH$_3$), 55.9 (CH$_3$), 56.2 (CH$_3$), 77.9 (4°), 78.3 (4°), 78.4 (4°), 92.2 (CH$_2$), 92.3 (CH$_2$), 92.6 (CH$_2$), 126.6 (CH), 126.8 (CH), 126.8 (CH), 127.2 (CH), 127.3 (CH), 128.3 (CH), 139.3 (4°), 139.3 (4°), 139.5 (4°), 139.5 (4°); HRMS (FAB) m/z calcd for C$_{34}$H$_{50}$B$_2$NaO$_8$ [M•Na]$^+$: 631.3584, found 631.3605.

Synthesis Example 33

Production of Compound (19a)

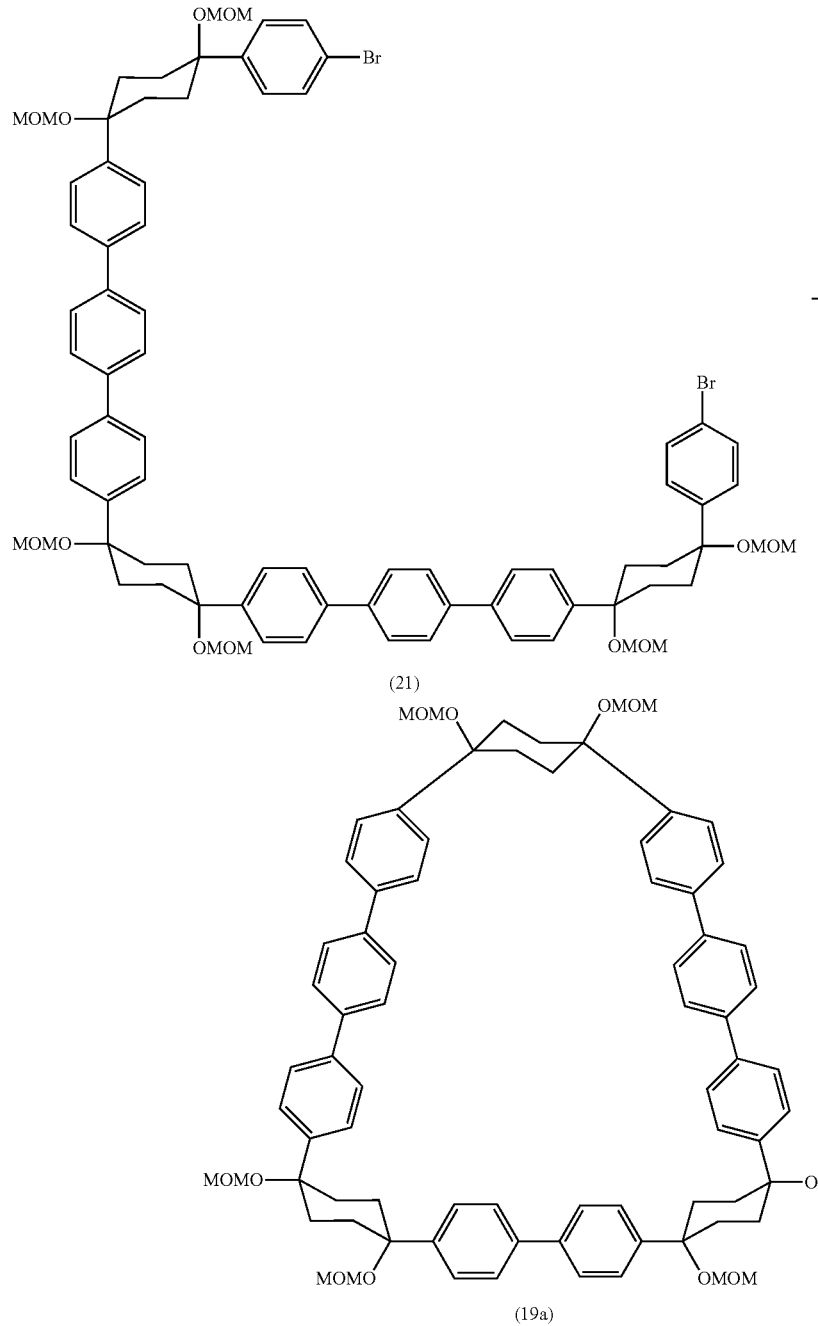

To a 20-mL J-Young Schlenk flask containing a stirring bar were added Compound (21) (70.0 mg, 50.9 µmol) obtained in Synthesis Example 28, bis(1,5-cyclooctadiene)nickel(0) (Ni(cod)$_2$) (48.2 mg, 1.7.5 mmol), 2,2'-bipyridyl (27.1 mg, 17.3 µmol), and dry 1,4-dioxane (2 mL). The resulting mixture was reacted at 80° C. for 24 hours while stirring. After cooled to room temperature, the mixture was concentrated under reduced pressure. The resulting product was extracted with ethyl acetate (EtOAc), dried over Na$_2$SO$_4$, and concentrated under reduced pressure. The crude product was purified by silica gel column chromatography (CHCl$_3$/EtOAc=2/1) to yield the target compound as a colorless solid (26.1 mg) (yield: 42%).

$^1$H NMR (600 MHz, CDCl$_3$, 50° C.) δ 1.86 (br, 4H), 2.08 (br, 4H), 2.21-2.47 (m, 16H), 3.39 (s, 6H), 3.44 (s, 6H), 3.44 (s, 6H), 4.52 (s, 4H), 4.54 (s, 4H), 4.62 (s, 4H), 7.35 (d, J=8

Hz, 4H), 7.42 (d, J=8 Hz, 4H), 7.44 (d, J=8 Hz, 4H), 7.54 (d, J=8 Hz, 8H), 7.56-7.62 (m, 16H); $^{13}$C NMR (150 MHz, CDCl$_3$, 50° C.) δ 32.8 (CH$_2$), 33.4 (CH$_2$), 33.7 (CH$_2$), 55.7 (CH$_3$), 55.8 (CH$_3$), 56.2 (CH$_3$), 77.9 (4°), 78.0 (4°), 78.3 (4°), 92.2 (CH$_2$), 92.4 (CH$_2$), 92.5 (CH$_2$), 126.8 (CH), 126.8 (CH), 126.8 (CH), 126.9 (CH), 127.2 (CH), 127.3 (CH), 127.5 (CH), 127.9 (CH), 139.2 (4°), 139.3 (4°), 139.4 (4°), 139.5 (4°), 139.6 (4°); HRMS (FAB) m/z calcd for C$_{76}$H$_{86}$NaO$_8$ [M•Na]$^+$: 1237.6011, found 1237.6014.

Synthesis Example 34

Production of Compound (18a)

obtained in Synthesis Example 29, bis(1,5-cyclooctadiene) nickel (0) (Ni(cod)$_2$) (13.8 mg, 50.2 μmol), and 2,2'-bi-pyridyl. Dry THF (12.5 mL) was added thereto, and the resulting mixture was reacted under reflux for 24 hours while stirring. After cooled to room temperature, the reaction mixture was filtered through silica gel and washed with ethyl acetate (EtOAc). The solvent was then removed under reduced pressure. The crude product was purified by silica gel column chromatography (hexane/EtOAc) to yield the target compound as a colorless solid (19.0 mg) (yield: 51%).

$^1$H NMR (600 MHz, CDCl$_3$, 50° C.) δ 1.90-2.46 (m, 32H), 3.38 (s, 6H), 3.40 (s, 6H), 3.40 (s, 6H), 3.45 (s, 6H), 4.40 (s, 4H), 4.42 (s, 4H), 4.50 (s, 4H), 4.52 (s, 4H), 7.42 (d, J=8 Hz, 4H), 7.45-7.52 (m, 20H), 7.55 (d, J=8 Hz, 4H), 7.59

[Chem. 69]

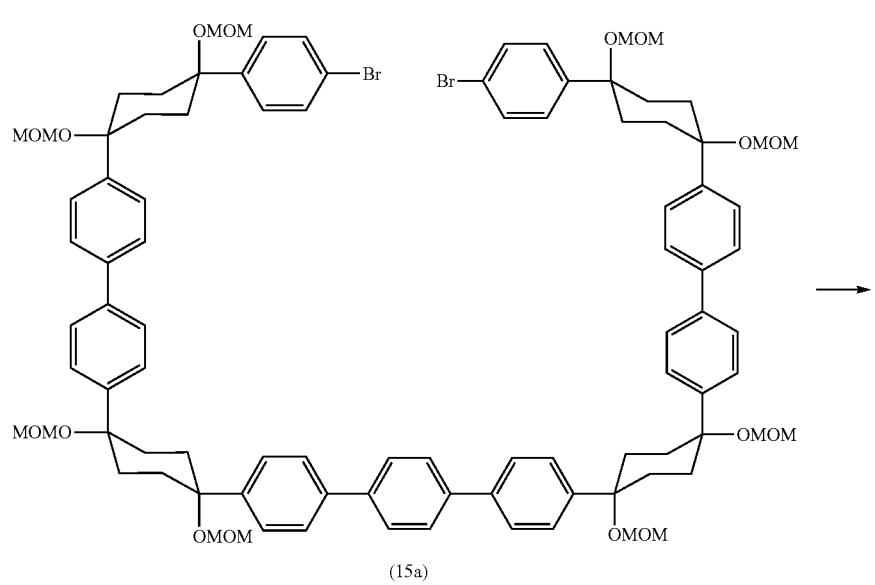

(15a)

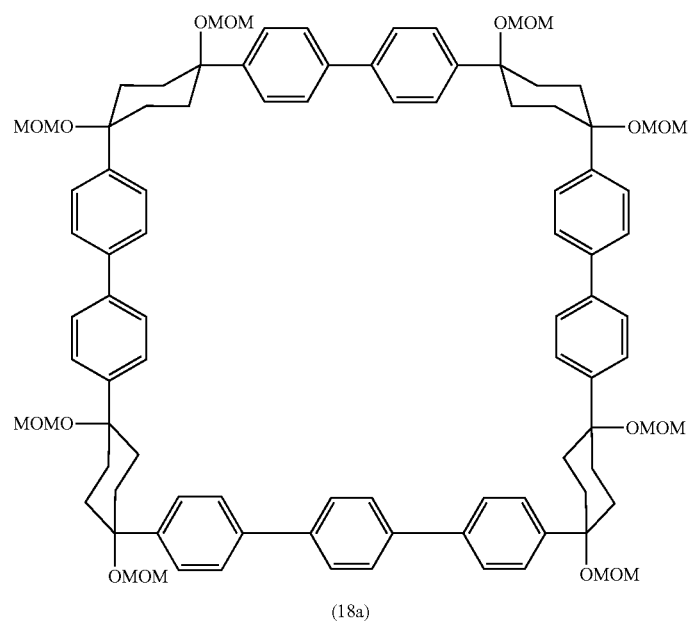

(18a)

To a 50-mL round-bottom glass flask containing a stirring bar were added Compound (15a) (41.3 mg, 25.0 μmol) (d, J=8 Hz, 4H), 7.63 (s, 4H); HRMS (FAB) m/z calcd for C$_{94}$H$_{108}$NaO$_8$ [M•Na]$^+$: 1515.7535, found 1515.7530.

Synthesis Example 35

Production of [10]cycloaraphenylene (13a)

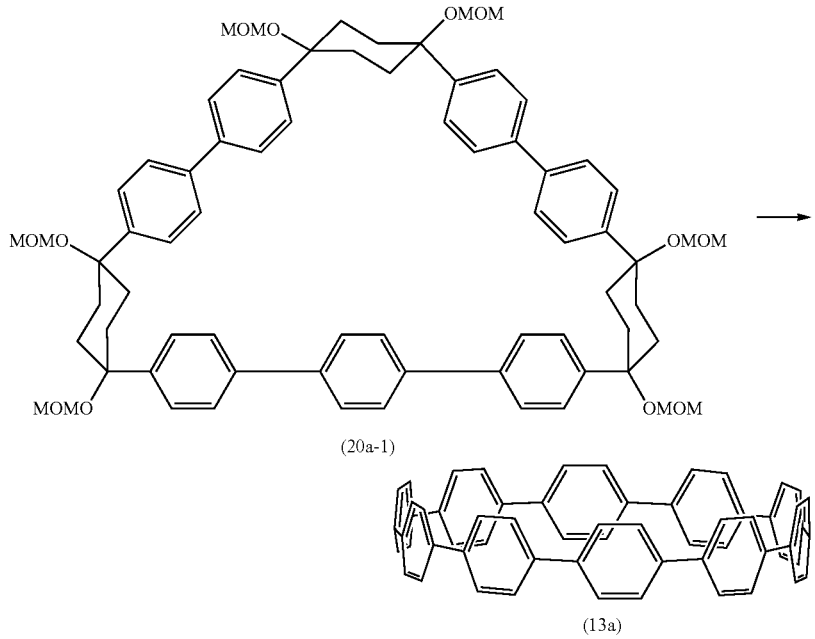

To a 20-mL Schlenk flask containing a stirring bar and a condenser were added Compound (20a-1) (9.3 mg, 8.2 μmol) obtained in Synthesis Example 31 or 32, sodium hydrogen sulfate monohydrate ($NaHSO_4 \cdot H_2O$) (28 mg, 20 μmol), dry dimethylsulfoxide (DMSO) (1.5 mL), and dry m-xylene (5 mL), and the flask was heated at 150° C. for 72 hours while stirring. After cooled to room temperature, the resulting mixture was quenched with a saturated sodium hydrogen carbonate ($NaHCO_3$) aqueous solution. Filtration was then performed through Celite using ethyl acetate (EtOAc) as a solvent, followed by extraction with ethyl acetate (EtOAc). The organic phase was dried over $Na_2SO_4$ and concentrated under reduced pressure. Thereafter, TLC (hexane/$CH_2Cl_2$=1/1) was performed to yield the target compound as a yellow solid (1.5 mg) (yield: 24%).

$^1$H NMR (600 MHz, $CDCl_3$) δ 7.56 (s, 40H); $^{13}$C NMR (150 MHz, $CDCl_3$) δ 127.4 (CH), 138.2 (4°); HRMS (MALDI) m/z calcd for $C_{60}H_{40}$ [M•]$^+$: 760.3125, found: 760.3153.

Synthesis Example 36

Production of [11]cycloparaphenylene (13b)

[Chem. 71]

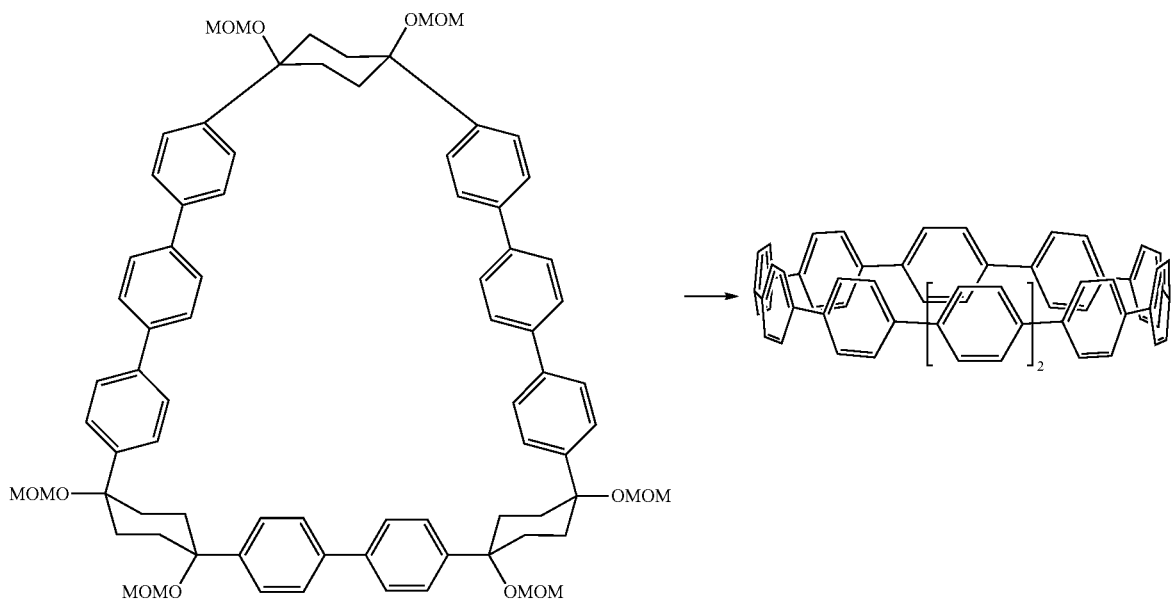

To a 20-mL Schlenk flask containing a stirring bar and a condenser were added Compound (19a) (20.7 mg, 17.0 µmol) obtained in Synthesis Example 33, sodium hydrogen sulfate monohydrate (NaHSO$_4$.H$_2$O) (51.6 mg, 37.4 µmol), o-chloranil (20.7 mg, 84.2 µmol), dry dimethylsulfoxide (DMSO) (1.5 mL), and dry m-xylene (4 mL). The flask was heated at 150° C. for 48 hours while stirring. After cooled to room temperature, the resulting mixture was quenched with a saturated sodium hydrogen carbonate (NaHCO$_3$) aqueous solution, and filtration was performed through Celite using ethyl acetate (EtOAc) as a solvent. The resulting product was extracted with ethyl acetate (EtOAc), and the organic phase was dried over Na$_2$SO$_4$ and concentrated under reduced pressure. Subsequently, TLC (hexane/CH$_2$Cl$_2$=1/1) was performed to yield the target compound as a yellow solid (4.6 mg) (yield: 32%).

$^1$H NMR (600 MHz, CDCl$_3$) δ 7.58 (s, 44H); $^{13}$C NMR (150 MHz, CDCl$_3$) δ 127.3 (CH), 138.4 (4°); HRMS (MALDI) m/z calcd for C$_{66}$H$_{44}$ [M•]$^+$: 836.3438, found: 836.3437.

Synthesis Example 37

Production of [13]cycloparaphenylene (13c)

To a 20-mL Schlenk flask containing a stirring bar and a condenser were added Compound (18a) (4.0 mg, 2.7 µmol) obtained in Synthesis Example 34, sodium hydrogen sulfate monohydrate (NaHSO$_4$.H$_2$O) (7.4 mg, 54 µmol), o-chloranil (3.3 mg, 13 µmol), dry dimethylsulfoxide (DMSO) (1.5 mL), and dry m-xylene (4 mL). The flask was heated at 150° C. for 48 hours while stirring. After cooled to room temperature, the resulting mixture was quenched with a saturated sodium hydrogen carbonate (NaHCO$_3$) aqueous solution, and filtration was performed through Celite using ethyl acetate (EtOAc) as a solvent. The resulting product was extracted with ethyl acetate (EtOAc), and the organic phase was dried over Na$_2$SO$_4$ and concentrated under reduced pressure. Subsequently, TLC (hexane/CH$_2$Cl$_2$=1/1) was performed to yield the target compound as a yellow solid (9.3 mg) (yield: 20%).

$^1$H NMR (600 MHz, CDCl$_3$) δ 7.64 (s, 52H); $^{13}$C NMR (150 MHz, CDCl$_3$) δ 127.4 (CH), 1.3-8.7 (4°); HRMS (MALDI) m/z calcd for C$_{78}$H$_{52}$ [M•]$^+$: 988.4064, found: 988.4086.

Example 1

[12]Cycloparaphenylene→CNT

A solution of [12]cycloparaphenylene ([12]CPP) (4a) obtained in Synthesis Example 23(3) in toluene (0.001 wt %) was applied to a sapphire single crystal substrate (C plane) by spin-coating. Spin-coating conditions are as follows: Rotation speed: 4000 rpm; and Rotation time: 60 sec.

The [12]CPP-coated sapphire single crystal substrate was placed at an edge portion of a quartz reaction tube, and a vacuum was drawn on the reaction tube (final ultimate pressure: about 0.01 torr (about 1.33 Pa)). Ethanol was then supplied into the reaction tube (pressure: 7 torr (933.25 Pa)) while the center of the tube was heated to 500° C. in an electric furnace. After the temperature and ethanol supply were stabilized, the [12]CPP-coated sapphire substrate was

[Chem. 72]

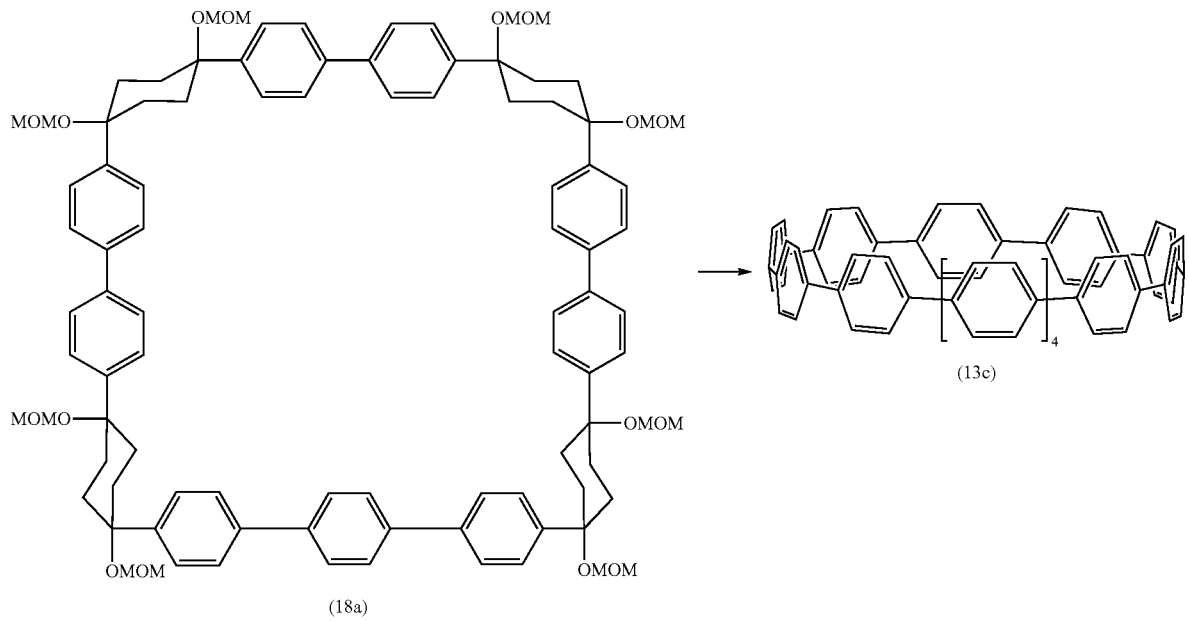

quickly moved to the center of the reaction tube to initiate the growth of the nanotube by chemical vapor deposition (CVD). Fifteen minutes after the initiation of the reaction, the sapphire single crystal substrate in the reaction tube was moved from the center at 500° C. to an edge portion at room temperature to stop the growth of the nanotube.

The formation and structure of the carbon nanotube was observed by transmission electron microscope (TEM) and evaluated by Raman spectroscopy. For a transmission electron microscope, JEM-2100 F/HR produced by JEOL Ltd. was used; and for a Raman spectrometer, LabRAM HR-800 produced by Horiba Jobin Yvon was used.

Figure 2:
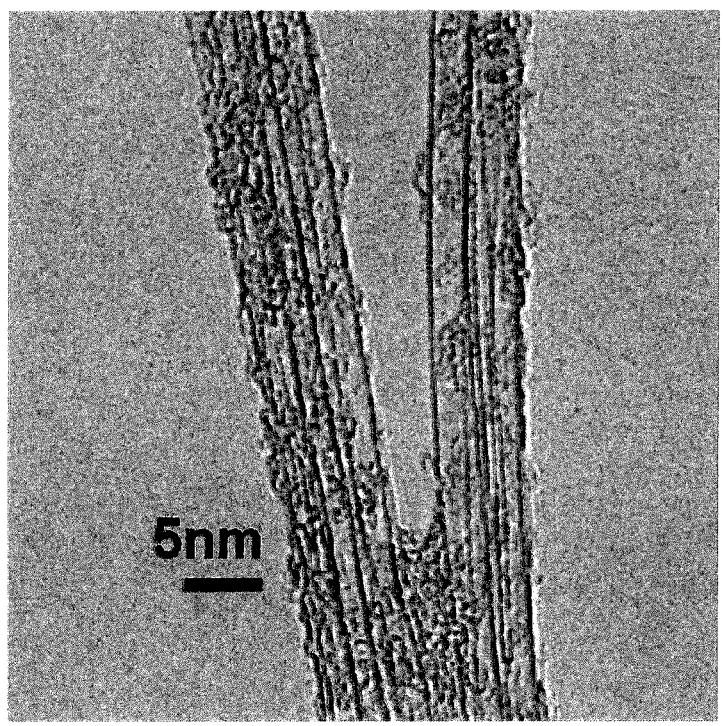
FIG. 2 is a transmission electron microscope image of CNT obtained in Example 1.
Figure 3:
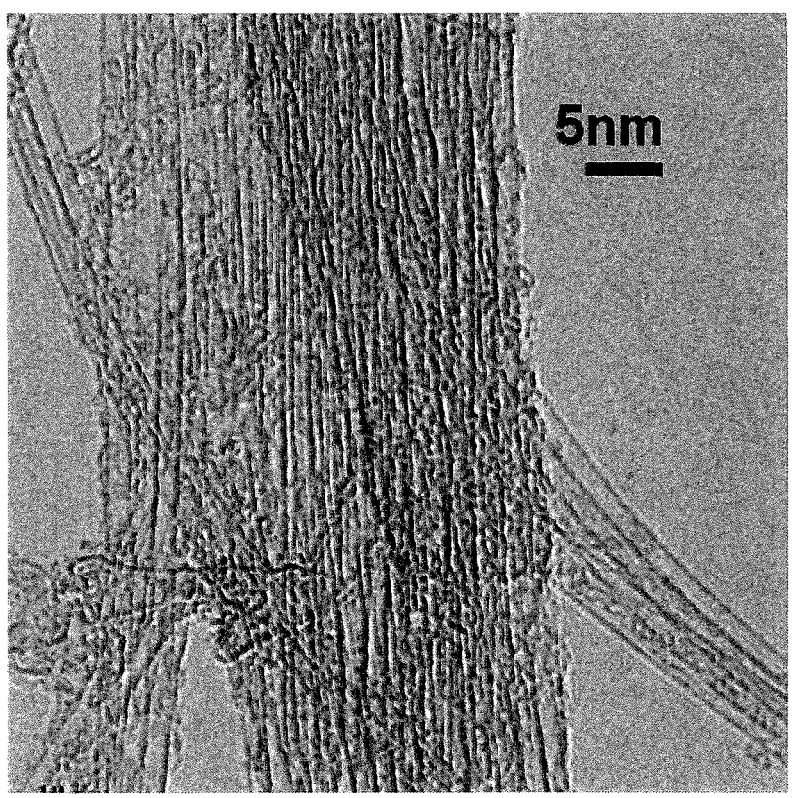
FIG. 3 is a transmission electron microscope image of CNT obtained in Example 1.

FIGS. 2 and 3 show the results observed with a transmission electron microscope. The diameter of the obtained CNT was measured using these figures; the CNTs each had a substantially uniform diameter (FIG. 4). FIG. 4 confirms that the use of [12]cycloparaphenylene as a starting material resulted in the selective formation of CNTs each having a diameter of 1.5 to 1.6 nm.

Figure 5:
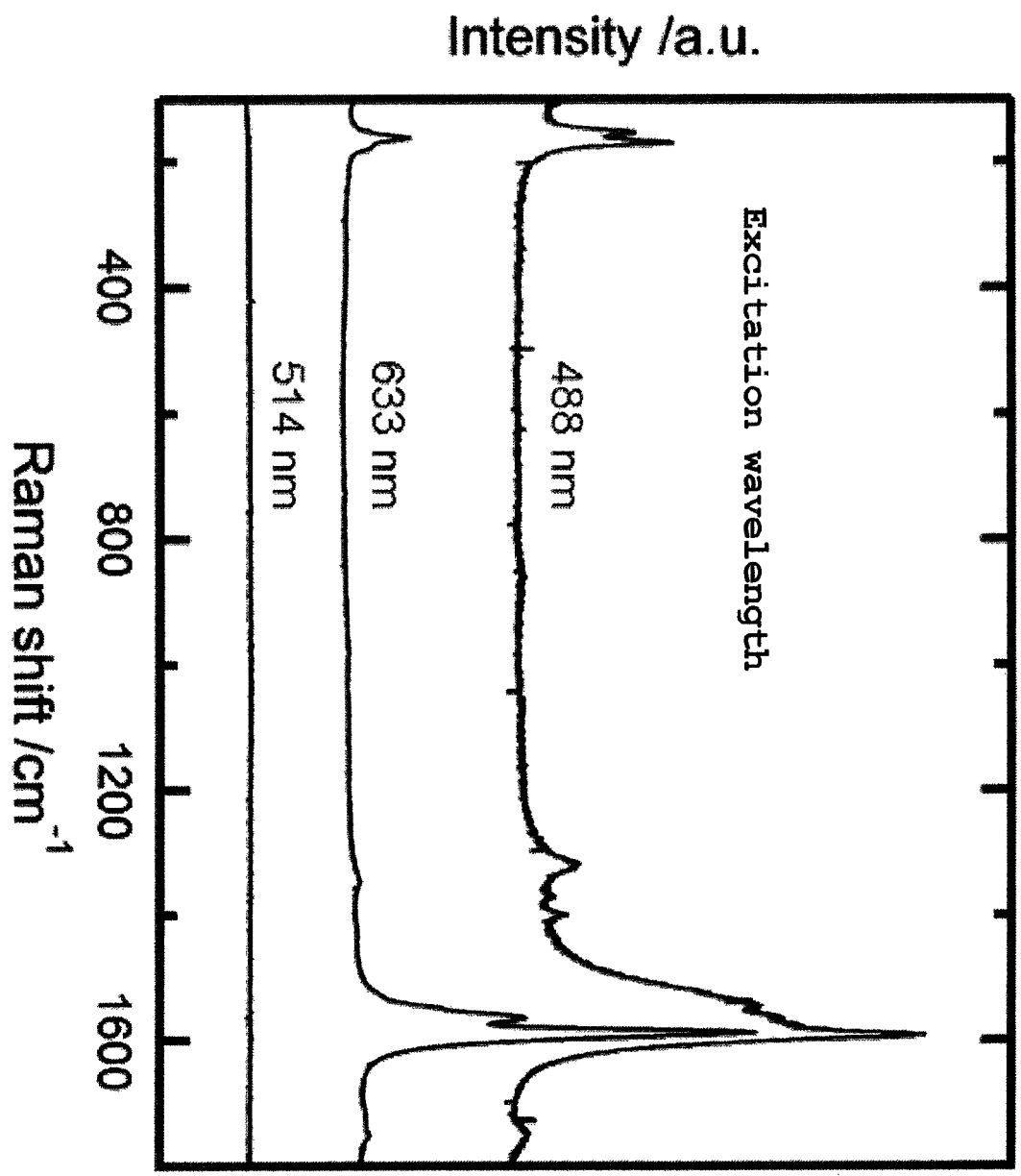
FIG. 5 shows the relationship between an excitation wavelength of laser and Raman spectrum according to Raman spectroscopy with regard to CNT obtained in Example 1.

The physical properties of the CNTs were measured by Raman spectroscopy. In Raman spectroscopy, a different laser excitation wavelength detects a different CNT. FIG. 5 shows the results obtained by evaluating the CNTs using laser with excitation wavelength of 488, 514, or 633 nm. The synthesized CNTs each had a diameter of about 1.6 nm. Semiconducting CNTs were detected at excitation wavelengths of 488 and 514 nm. Metallic CNTs were detected at an excitation wavelength of 633 nm. As shown in FIG. 5, Raman bands specific to CNTs were observed at excitation wavelengths of 488 and 633 nm. Specifically, the CNTs obtained herein had a semiconducting property in combination with a metallic property.

Example 2

[9]Cycloparaphenylene→CNT

A solution of [9]cycloparaphenylene ([9]CPP) (4b) obtained in Synthesis Example 23(2) in toluene (0.001 wt %) was applied to a sapphire single crystal substrate (C plane) by spin-coating. Spin-coating conditions are as follows: Rotation speed: 4000 rpm; and Rotation time: 60 sec.

The [9]CPP-coated sapphire single crystal substrate was placed at an edge portion of a quartz reaction tube, and a vacuum was drawn on the reaction tube (final ultimate pressure: about 0.01 torr (about 1.33 Pa)). Ethanol was then supplied into the reaction tube (pressure: 7 torr (933.25 Pa)) while the center of the tube was heated to 500° C. in an electric furnace. After the temperature and ethanol supply were stabilized, the [9]CPP-coated sapphire substrate was quickly moved to the center of the reaction tube to initiate the growth of the nanotube by chemical vapor deposition (CVD). Fifteen minutes after the initiation of the reaction, the sapphire single crystal substrate in the reaction tube was moved from the center at 500° C. to an edge portion at room temperature to stop the growth of the nanotube.

The formation and the structure of the carbon nanotube were evaluated by Raman spectroscopy. For Raman spectrometer, LabRAM HR-800 produced by Horiba Jobin Yvon was used.

Figure 6:
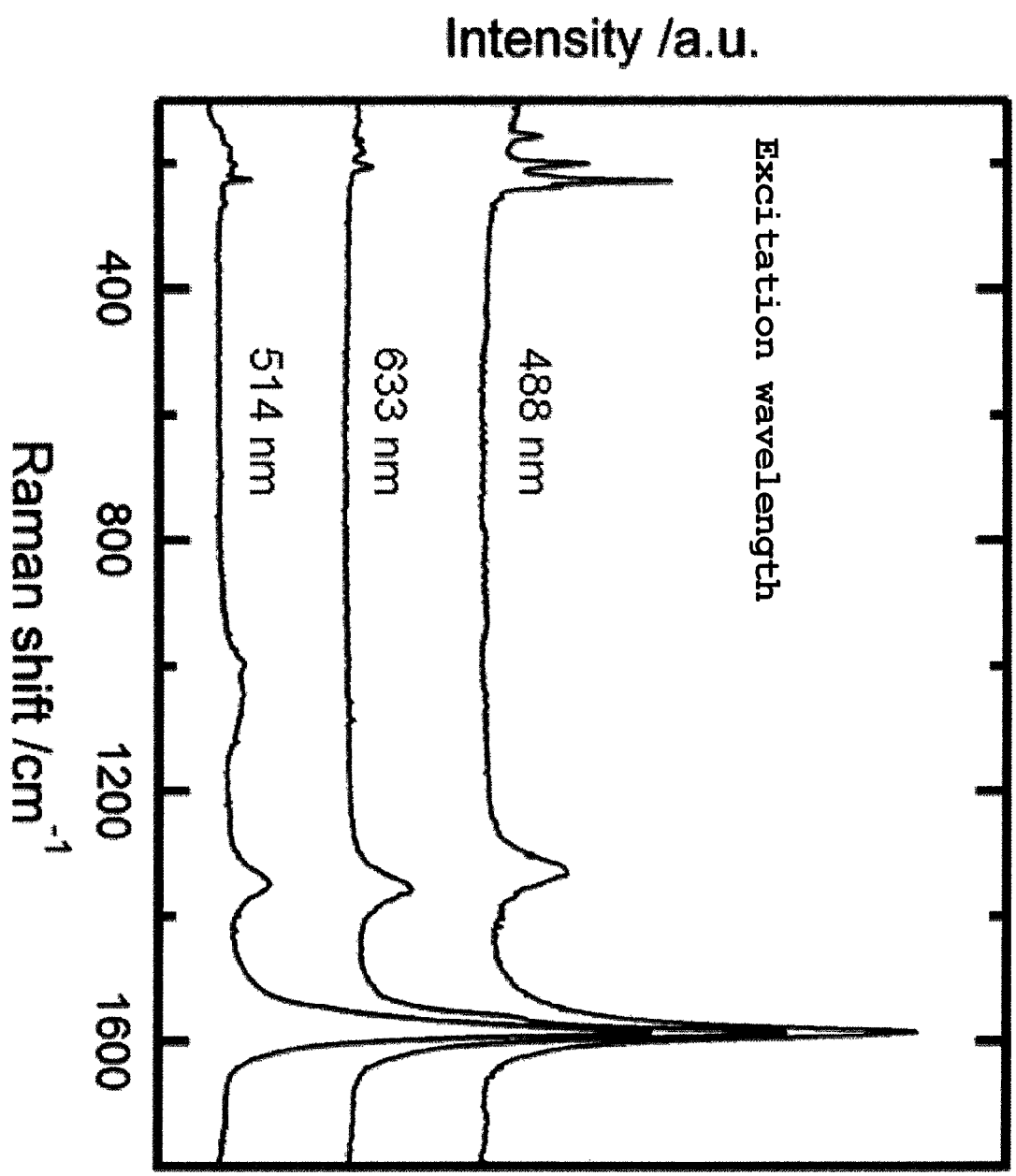
FIG. 6 shows the relationship between an excitation wavelength of laser and Raman spectrum according to Raman spectroscopy with regard to CNT obtained in Example 2.

The physical properties of the CNTs were measured by Raman spectroscopy. FIG. 6 shows the results obtained by evaluating the CNTs using laser with excitation wavelength of 488 nm, 514 nm, or 633 nm. The CNTs each had a diameter of about 1.0 to 1.2 nm. Semiconducting CNTs were detected at excitation wavelengths of 488 and 514 nm, and metallic CNTs were detected at an excitation wavelength of 633 nm. As shown in FIG. 6, Raman bands specific to CNTs were observed at excitation wavelengths of 488, 514, and 633 nm.

Example 3

[14]Cycloparaphenylene→CNT

CNTs were treated as in Example 1 except that [14] cycloparaphenylene (3a) obtained in Synthesis Example 12 or 13 was used.

Example 4

[15]Cycloparaphenylene→CNT

CNTs were treated as in Example 1 except that [15] cycloparaphenylene (3b) obtained in Synthesis Example 15 or 16 was used.

Example 5

[16]Cycloparaphenylene→CNT

CNTs were treated as in Example 1 except that [16] cycloparaphenylene (3c) obtained in Synthesis Example 18 was used.

Example 6

[14]Cycloparaphenylene Containing One Naphthylene→CNT

CNTs were treated as in Example 1 except that Compound (3d) obtained in Synthesis Example 22 was used.

Example 7

[10]Cycloparaphenylene→CNT

CNTs were treated as in Example 1 except that [10] cycloparaphenylene (13a) obtained in Synthesis Example 35 was used.

Example 8

[11]Cycloparaphenylene→CNT

CNTs were treated as in Example 1 except that [11] cycloparaphenylene (13b) obtained in Synthesis Example 36 was used.

Example 9

[13]Cycloparaphenylene→CNT

CNTs were treated as in Example 1 except that [13] cycloparaphenylene (13c) obtained in Synthesis Example 37 was used.

The invention claimed is:

1. A method for producing a carbon nanotube, comprising:
    reacting a carbon source with a cyclic compound in which multiple aromatic rings are continuously bonded, in the absence of a catalyst,
    wherein the carbon source is at least one member selected from the group consisting of hydrocarbon compounds, alcohol compounds, ether compounds and ester compounds, and
    the cyclic compound in which multiple aromatic rings are continuously bonded is a cycloparaphenylene compound represented by Formula (1):

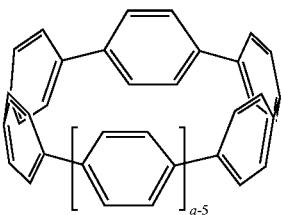

(1)

wherein a is an integer of 6 or more,
or a modified cycloparaphenylene compound in which at least one phenylene group of the cycloparaphenylene compound represented by Formula (1) is substituted with a group represented by Formula (2):

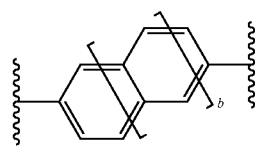

(2)

wherein b is an integer of 1 or more.

2. The method according to claim 1, wherein the reaction is performed by supplying a gaseous carbon source under reduced pressure and heating.

3. The method according to claim 1, wherein the cycloparaphenylene compound is a compound represented by Formula (1) wherein a is an integer of 6 to 100.

4. The method according to claim 1,
the cyclic compound in which multiple aromatic rings are continuously bonded is the cycloparaphenylene compound represented by Formula (1).

5. The method according to claim 1, wherein the cyclic compound in which multiple aromatic rings are continuously bonded is a cyclic compound represented by Formula (3):

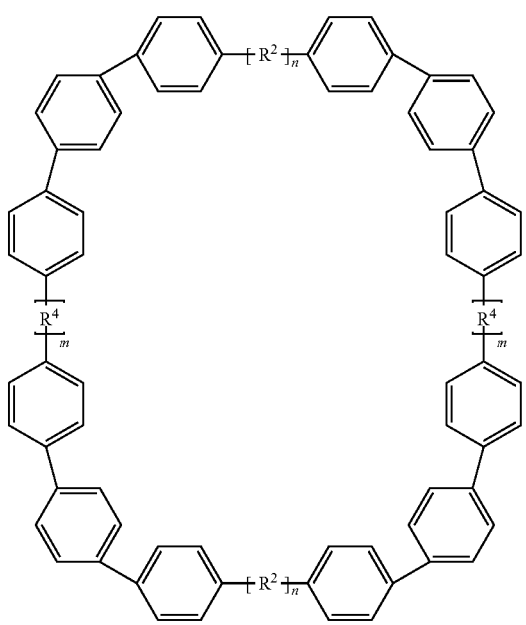

(3)

wherein $R^2$ is the same or different, and each represents a phenylene group or a bivalent condensed polycyclic aromatic hydrocarbon group; $R^4$ is the same or different, and each represents a phenylene group or a bivalent condensed polycyclic aromatic hydrocarbon group; m is the same or different, and each represents an integer of 0 or more; and n is the same or different, and each represents an integer of 1 or more,
a cyclic compound represented by Formula (4):

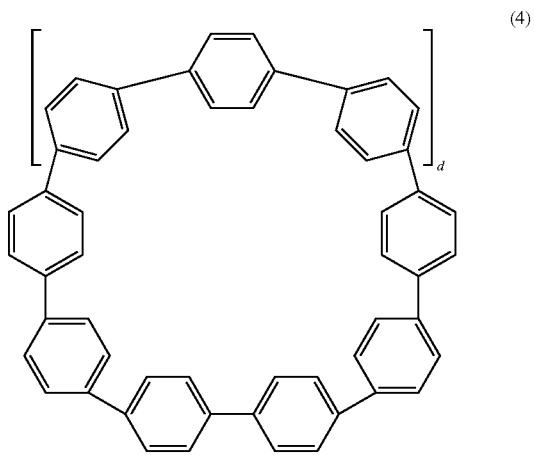

(4)

wherein d is an integer of 1 or more,
or a cyclic compound represented by Formula (13):

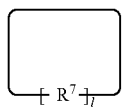

(13)

6. The method according to claim 1, wherein the reaction is performed by supplying a gaseous carbon source under a pressure of $10^{-4}$ to $10^5$ Pa with heating at 400 to 1200° C.

* * * * *